United States Patent [19]
Aramaki et al.

[11] Patent Number: 6,088,304
[45] Date of Patent: Jul. 11, 2000

[54] EDITING METHOD FOR DELETING PRESCRIBED SECTION OF A PROGRAM AND EDITING APPARATUS THEREOF

[75] Inventors: Junichi Aramaki, Chiba; Natsumi Saito, Tokyo, both of Japan

[73] Assignee: Sony Corporation, Tokyo, Japan

[21] Appl. No.: 08/937,237

[22] Filed: Sep. 16, 1997

[30] Foreign Application Priority Data

Sep. 25, 1996 [JP] Japan .................................. 8-272883

[51] Int. Cl.[7] .............................. G11B 7/00; G11B 27/00
[52] U.S. Cl. ................................................ 369/32; 369/48
[58] Field of Search .................................. 369/32, 48, 54, 369/58, 47, 124, 59; 360/72.2, 72.1; 235/454, 456

[56] References Cited

U.S. PATENT DOCUMENTS 5,706,262  1/1998  Yokota et al. ............................. 369/32
5,774,434  6/1998  Arataki et al. ............................ 369/47
5,790,484  8/1998  Maeda et al. ............................. 369/32
5,805,544  9/1998  Haneda ..................................... 369/48

*Primary Examiner*—Ali Neyzari
*Attorney, Agent, or Firm*—Limbach & Limbach LLP; Seong-Kun Oh

[57] ABSTRACT

The present invention carried out editing of a management region of a recording medium by carrying out an automatic erase operation as a result of simply designating the start point and end point of the section to be deleted and linking the programs preceding and proceeding the erased portion while carrying out a prescribed section delete function for erasing unnecessary portions of prescribed periods of data recorded on the recording medium. This therefore provides superior delete position designation because the position of the start and end points of the section to be deleted can be adjusted.

110 Claims, 38 Drawing Sheets

INNER SIDE ← → OUTER SIDE

DIVIDE

DIVIDE

DELETE

COMBINE

FIG. 5

| | 16bit | | 16bit | | |
|---|---|---|---|---|---|
| MSB LSB | MSB LSB | MSB LSB | MSB LSB | | |
| 00000000 | 11111111 | 11111111 | 11111111 | 0 | HEADER |
| 11111111 | 11111111 | 11111111 | 11111111 | 1 | |
| 11111111 | 11111111 | 11111111 | 00000000 | 2 | |
| Cluster H | Cluster L | Sector(00h) | MODE(02h) | 3 | CORRESPONDING TABLE PRESENTED DATA PART |
| 00000000 | 00000000 | 00000000 | 00000000 | 4 | |
| 00000000 | 00000000 | 00000000 | 00000000 | 5 | |
| 00000000 | 00000000 | 00000000 | 00000000 | 6 | |
| Maker code | Model code | First TNO | Last TNO | 7 | |
| 00000000 | 00000000 | 00000000 | Used Sectors | 8 | |
| 00000000 | 00000000 | 00000000 | 00000000 | 9 | |
| Disc | ID | 00000000 | Disc Serial No | 10 | |
| P-FRA | P-TNO1 | P-DFA | P-EMPTY | 11 | |
| P-TNO4 | P-TNO5 | P-TNO2 | P-TNO3 | 12 | |
| | | P-TNO6 | P-TNO7 | 13 | |
| P-TNO248 | P-TNO249 | P-TNO250 | P-TNO251 | 74 | |
| P-TNO252 | P-TNO253 | P-TNO254 | P-TNO255 | 75 | |
| 00000000 | 00000000 | 00000000 | 00000000 | 76 | |
| 00000000 | 00000000 | 00000000 | 00000000 | 77 | |
| (01h) START ADDRESS | | | TRACK MODE | 78 | MANAGEMENT TABLE PART (255 PARTS TABLE) |
| END ADDRESS | | | LINK INFORMATION | 79 | |
| (02h) START ADDRESS | | | TRACK MODE | 80 | |
| END ADDRESS | | | LINK INFORMATION | 81 | |
| (03h) START ADDRESS | | | TRACK MODE | 82 | |
| END ADDRESS | | | LINK INFORMATION | 83 | |
| (FCh) START ADDRESS | | | TRACK MODE | 580 | |
| END ADDRESS | | | LINK INFORMATION | 581 | |
| (FDh) START ADDRESS | | | TRACK MODE | 582 | |
| END ADDRESS | | | LINK INFORMATION | 583 | |
| (FEh) START ADDRESS | | | TRACK MODE | 584 | |
| END ADDRESS | | | LINK INFORMATION | 585 | |
| (FFh) START ADDRESS | | | TRACK MODE | 586 | |
| END ADDRESS | | | LINK INFORMATION | 587 | |

FIG. 10

CORRESPONDING TABLE
PRESENTED DATA PART (TABLE POINTER)

| P-DFA : – | P-EMPTY : 07h | P-FRA : 06h |
|---|---|---|
| P-TNO1 : 01h | P-TNO2 : 02h | P-TNO3 : 03h |
| P-TNO4 : 05h | P-TNO5 : – | P-TNO6 : – |
| P-TNO7 : – | P-TNO8 : – | P-TNO9 : – |
| P-TNO253 : – | P-TNO254 : – | P-TNO255 : – |

MANAGEMENT TABLE PART (255 PARTS TABLE)

| | START ADDRESS | END ADDRESS | TRACK MODE | LINK INFORMATION | |
|---|---|---|---|---|---|
| (01h) | $A_0$ | $A_1$ | | – | ($M_1$) |
| (02h) | $A_2$ | $A_3$ | | 04h | ($M_{2-1}$) |
| (03h) | $A_4$ | $A_5$ | | – | ($M_3$) |
| (04h) | $A_6$ | $A_7$ | | – | ($M_{2-2}$) |
| (05h) | $A_8$ | $A_9$ | | – | ($M_4$) |
| (06h) | $A_{10}$ | $A_{11}$ | | – | ($F_1$) |
| (07h) | – | – | | 08h | |
| (08h) | – | – | | 09h | |
| (09h) | – | – | | 0Ah | |
| (0Ah) | – | – | | 0Bh | |
| (0Bh) | – | – | | 0Ch | |
| (FEh) | – | – | | FFh | |
| (FFh) | – | – | | – | |

FIG. 11

CORRESPONDING TABLE PRESENTED
DATA PART (TABLE POINTER)

| P-DFA : – | P-EMPTY : 09h | P-FRA : 06h |
|---|---|---|
| P-TNO1 : 01h | P-TNO2 : 02h | P-TNO3 : 03h |
| P-TNO4 : 05h | P-TNO5 : – | P-TNO6 : – |
| P-TNO7 : – | P-TNO8 : – | P-TNO9 : – |
| P-TNO253 : – | P-TNO254 : – | P-TNO255 : – |

MANAGEMENT TABLE PART (255 PARTS TABLE)

| | START ADDRESS | END ADDRESS | TRACK MODE | LINK INFORMATION | |
|---|---|---|---|---|---|
| (01h) | A0 | A1 | | – | (M1) |
| (02h) | A2 | A3 | | 04h | (M2-1) |
| (03h) | A4 | A21 | | 08h | (M3-1) |
| (04h) | A6 | A7 | | – | (M2-2) |
| (05h) | A8 | A9 | | – | (M4) |
| (06h) | A10 | A11 | | 07h | (F1) |
| (07h) | A22 | A23 | | – | (F2) |
| (08h) | A24 | A5 | | – | (M3-2) |
| (09h) | – | – | | 0Ah | |
| (0Ah) | – | – | | 0Bh | |
| (0Bh) | – | – | | 0Ch | |
| (FEh) | – | – | | FFh | |
| (FFh) | – | – | | – | |

6,088,304

EDITING METHOD FOR DELETING PRESCRIBED SECTION OF A PROGRAM AND EDITING APPARATUS THEREOF

BACKGROUND OF THE INVENTION

The present invention relates to an editing apparatus for editing data recorded consecutively with respect to time on a recording medium such as a magneto-optical disc etc. recorded with management information for managing data recording and playback operations by updating this management information.

In recent years, various recording media and recording/playback apparatus have been disclosed, with, for example, typical "minidisc" (trademark) systems where a user freely records audio data etc. on a recording medium becoming widespread.

In the case of, for example, a minidisc system, management information known as a user TOC (hereinafter referred to as U-TOC) is recorded separately from the main data such as audio in order to data recorded regions of the disc that have been recorded by the user and un-used recordable regions that have not-yet been recorded (hereinafter referred to as "free areas"). The recording apparatus then determines recordable regions while referring to this U-TOC and the playback apparatus determines recorded regions while referring to the U-TOC.

Recorded Programs are managed at the U-TOC and start address and end address of the each program are managed at the U-TOC information. The start and end addresses of free areas that are not-yet recorded with anything are also listed to be used in the recording of data thereafter.

Editing of recording data such as linking between programs and partitioning a single program etc. can be carried out by updating management data on the U-TOC.

Editing processes such as, for example, a divide function for dividing one program into a plurality of programs, a combine function for linking a plurality of programs as one program, a move function for changing program numbers given in response to the playback program order and a delete function (referred to as an erase function) for deleting unnecessary programs can then be executed in a simple and rapid manner.

The user can then utilize these functions so as to edit one or a plurality of programs recorded once on the disc and gain enjoyment from making an individual original disc.

However, there were practical difficulties in related editing processing carried out basically using program units.

For example, in the case of recording original broadcasts, audio such as narrations or audio signals for commercials are recorded together before and after songs and there are cases where it is wished to erase these unnecessary narration and commercial portions. Further, there are also cases where when, for example, there is a program of an introduction, first part, second part, third part and ending, it may be wished to cut the third part to give the order of introduction, first part, second part ending.

Namely, there are many cases where just one part of a program is cut but at this time the editing operation is complicated.

FIG. 1A to FIG. 1F shows the operating procedure for the case where it is wished to erase a portion of a program.

A disc is considered where three songs of program TK1, TK2 and TK3 are already recorded as shown in FIG. 1A. This drawing is an image showing the data recording region of the disc taken as a belt shape along the radial direction.

Here, TK1, TK2, TK3 . . . correspond to program numbers given to the programs.

A description will now be given where the user wishes to erase a portion of the program TK2 given inclined lines in FIG. 1B.

In this case, as shown in FIG. 1C, divide processing is carried out at the start point of the section to be deleted and the program TK2 is divided into two items of a program TK2 and a program TK3. Thereafter, the program 3 up to this point is moved up and managed as program TK4.

Next, as shown in FIG. 1D, a divide edit is performed on the point at the end of the section to be erased and program TK3 is divided in two programs of the program TK3 and program TK4. The program TK4 up to this point is then moved down and managed as program TK5.

At this time just the section it is wished to erase is managed as the program TK3 and a delete edit is carried out for the program TK3 as shown in FIG. 1E so that the portion for the program TK3 is managed as a free area. The diagonal line portion of FIG. 1B is therefore erased. The programs TK4 and TK5 accompanying up to this point are then moved up and managed as program TK3 and program TK4.

Next, combine editing of program TK2 and program TK3 is carried out, as shown in FIG. 1F, i.e. program TK2 and program TK3 at the time shown in FIG. 1E are taken as the parts $TK2_{-1}$ and $TK2_{-2}$ comprising the program TK2 with management conditions being adopted where the parts $TK2_{-1}$ and $TK2_{-2}$ are played back consecutively at the time of playing back the program TK2 as shown by the playback operation $PB_{TK2}$ of the lower part.

At this time, the editing that was the initial object, i.e. editing where just the inclined portion of the program TK2 in FIG. 1B is cut, is complete.

As becomes clear from the above description, the operation for this kind of editing consists of two partitioning processes, a delete process and a link process, and is extremely complicated.

In order to take into consideration the aforementioned problems, it is the object of the present invention to achieve editing functions capable of performing accurate editing as desired by the user using simple operations when it is just wished to erase one portion of a program.

SUMMARY OF THE INVENTION

In order to resolve the above problems, an editing apparatus designating a prescribed section of program data as a recordable region, on a recording medium having a program region recorded with a prescribed program and a management region for managing a recorded program and a recordable region, comprises a (first) operation part for arbitrarily designating a start address and end address of a prescribed section of program data to be designated as the recordable region and an updating part for updating the management region in such a manner as to take a section defined by a start address and end address designated by the (first) operation part as a recordable region.

Further, the present invention is capable of accurately designating delete start and end positions by carrying out rehearsal playback for sections to be deleted based on a start address and end address designated by the operation part.

BRIEF DESCRIPTION OF THE DRAWINGS

FIG. 5 is a view illustrating the management configuration of a U-TOC sector 0 for managing the recording position etc. of programs recorded on the recording medium to which the present invention is applied;

FIG. 10 shows management information recorded at a U-TOC area of a management region of the recording medium for managing the recording conditions shown in FIG. 9A;

FIG. 11 shows management information recorded at a U-TOC area at a management region of the recording medium managing recording conditions after carrying out section delete processing as shown in FIG. 9B and FIG. 9C;

DETAILED DESCRIPTION OF THE PREFERRED EMBODIMENTS

First Embodiment

The following is a description of an embodiment of an editing operation of the present invention.

In the example of this embodiment, a magneto-optical disc (minidisc) is taken as a recording medium and a recording/playback apparatus equipped with an editing apparatus function is adopted.

The description will be given in the following order.
1. Configuration of recording/playback apparatus.
2. Cluster format.
3. U-TOC sector.
4. Management example employing U-TOC.
5. Section delete process.
6. Rehearsal function occurring in section delete processing.
7. Section delete process accompanying rehearsal operation.
   (a. Section delete operation example 1).
   (b. Section delete operation example 2).
   (c. Section delete operation example 3).
   (d. Section delete operation example 4).
   (e. Section delete operation example 5).
   (f. Section delete operation example 6).
   (g. Section delete operation example 7).
   (h. Section delete operation example 8).
8. Other section delete process examples.

1. Configuration of Recording/playback Apparatus.

Figure 1A:
FIG. 1A is a schematic view of a program recorded on a disc for illustrating the sequence during related deletion of portions.
Figure 1B:
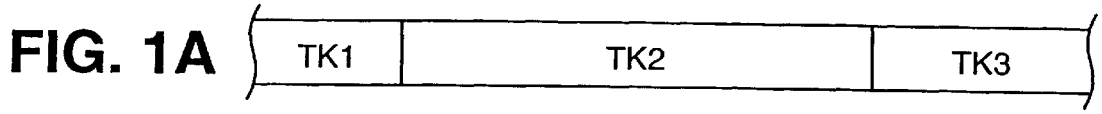
FIG. 1B is a schematic view showing places of portions (inclined line portions) to be erased during related deletion of portions.
Figure 1C:
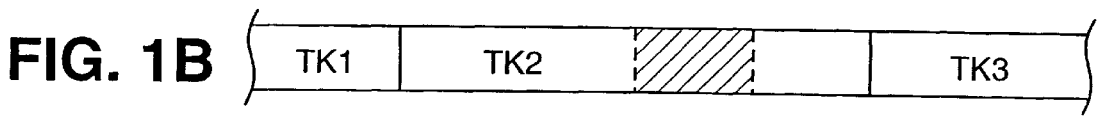
FIG. 1C is a schematic view for designating partitions at leading portions of places of portions to be deleted during related portion deletion.
Figure 1D:
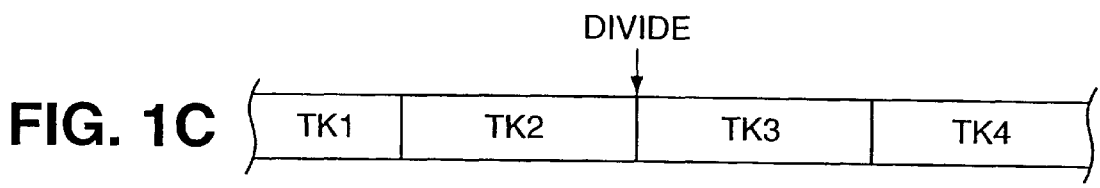
FIG. 1D is a schematic view designating final portions of places of portions to be deleted during related portion deletion.
Figure 1E:
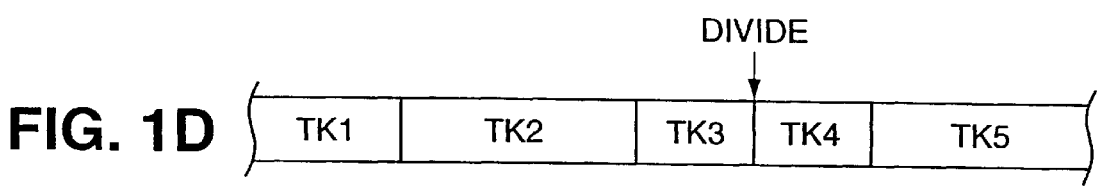
FIG. 1E is a schematic view of deletion designation for new programs generated in the two times partition process during related portion deletion.
Figure 1F:
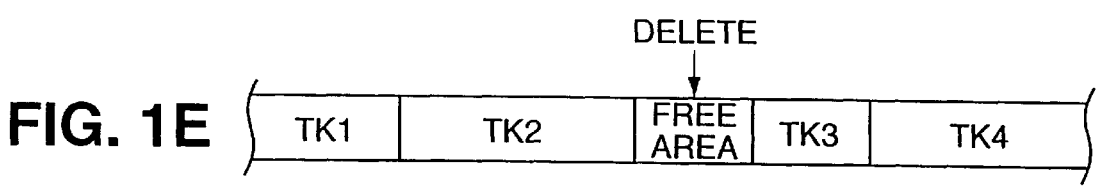
FIG. 1F is a schematic view showing linking of neighboring preceding and proceeding programs after deletion designation during related portion deletion.
Figure 2:
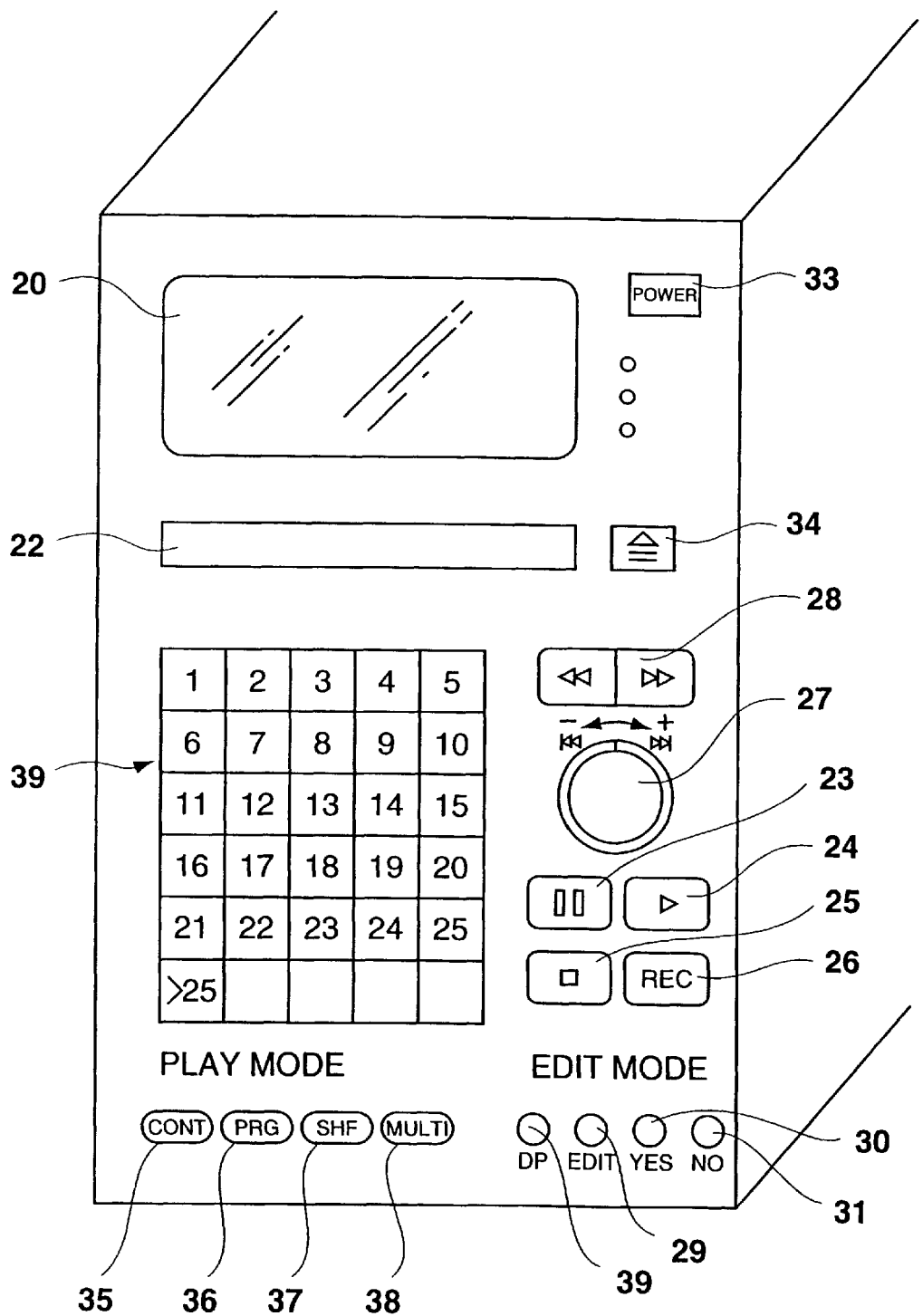
FIG. 2 is an external view of a recording/playback apparatus to which the present invention is applied.
Figure 3:
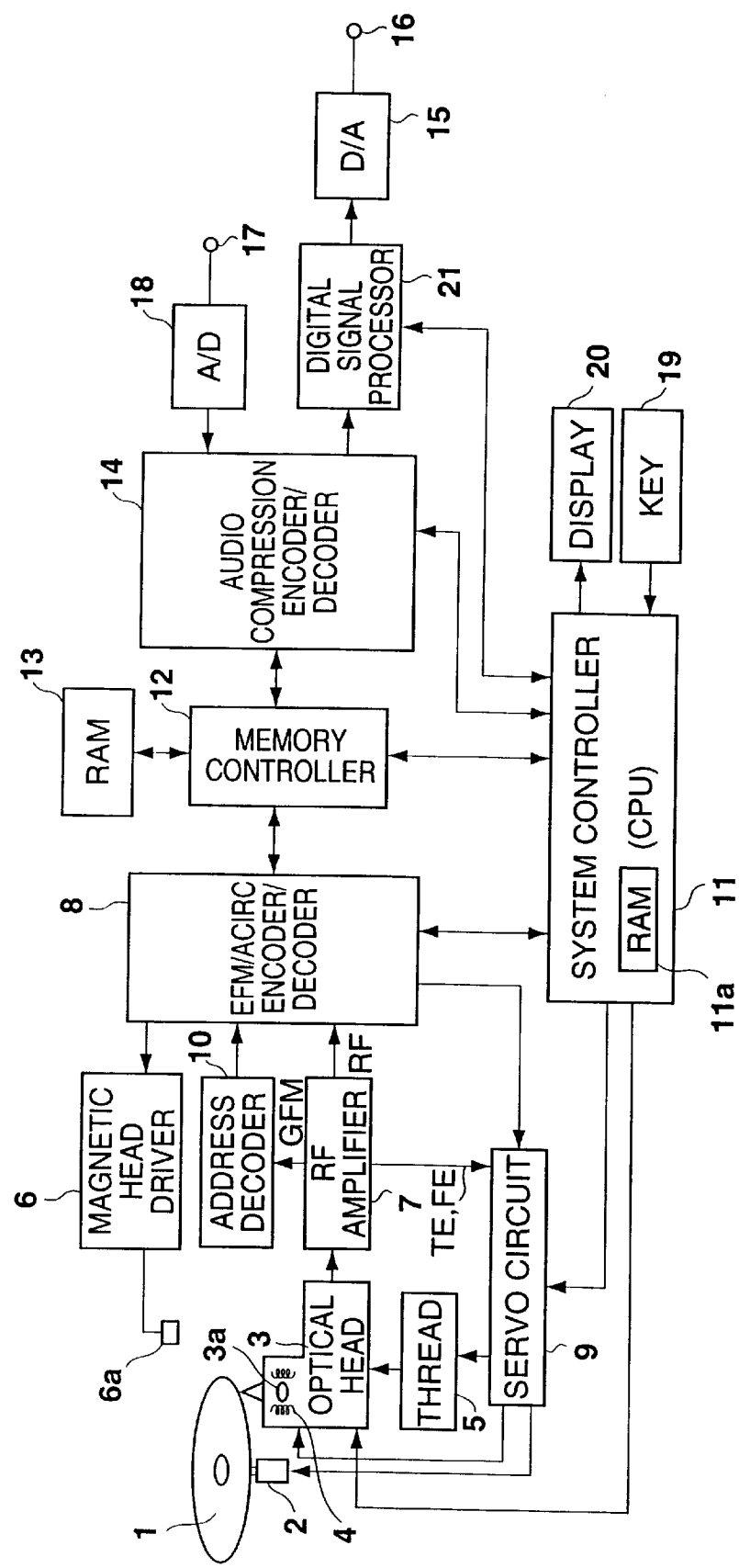
FIG. 3 is a block diagram of the whole of the present invention.

A description will now be given of the configuration of the minidisc recording/playback apparatus using FIG. 2 and FIG. 3. FIG. 2 is an external view of this recording/playback apparatus.

A display part 20 employing a liquid crystal display apparatus etc. is formed on a front panel of this recording/playback apparatus. This display part 20 displays the operating conditions of the disc that is being recorded or played back, the program number, the recording time or playback time, editing operation conditions and playback mode etc. Further, with a minidisc system, character information is recorded on the disc but the displaying of input characters while this character information is being inputted or the display of character information read from the disc is also possible.

A power supply key 33 is provided for turning the power supply of the recording/playback apparatus on and off.

A disc insertion part 22 into which discs are inserted and from which discs are ejected in response to operation of an eject key 34 is provided on the front panel of the recording/playback apparatus.

Each of the various operating means for carrying out operations relating to recording or playback are provided on this front panel, i.e. a playback key 24, pause key 23, stop key 25, record key 26, AMS (Automatic Music Sensor) operation dial 27 (hereinafter referred to as a "jog dial") for carrying out jogging access operations, and a search key 28, for carrying out high-speed playback operations. This key group constitutes the basic operation keys relating to recording or playback operations for audio signals.

The jog dial 27 is an operating part for designating AMS (Auto Music Sensor) using this rotational operation. However, in character input mode (or disc name input mode or program name input mode) which is one of the editing modes, the rotational operation of the jog dial 27 provides increments or decrements to aid character selection.

In the case of this example, a function known as a section delete function is prepared as one of the edit modes. However, in this section delete mode, this is used for a point adjustment operation during the operation of designating the start point and the end point of the section delete process, the details of which are described later.

The jog dial 27 can also be push operated, with this push operation functioning as the enter operation in disc name input mode, program name input mode, program setting mode and multi-access mode etc. The push operation of the jog dial 27 can also combine the playback operation in the same way as the operation for the playback key 24. The push operation of the jog dial 27 can also function as the enter operation for the designation operation for the start points and end points occurring in the section delete mode.

Numeric keys 39 are also provided in addition to these operation keys.

For example, key [1] to key [25], and a key [>25] for inputting numerals of 26 or more are provided as these numeric keys 39.

The numeric keys 39 can be used for directly selecting the number of the program to be played back or selecting the program number in program playback mode or multi-access playback mode.

An edit key 29, yes key 30 and cancel key 31 are provided as the keys for the edit mode operations.

The edit key 29 is used for the operations of summoning and ending each of the various edit modes and the yes key 30 and cancel key 31 are used for operations during editing. For example, the yes key 30 is used as an enter operation and the cancel key 31 is used as a cancel operation.

A program name input mode for inputting title characters such as song titles for each program, a disc name input mode for inputting characters such as names for discs, a name erase mode for erasing recorded character information, a divide mode for dividing one program into a plurality of programs, a combine mode for combining a plurality of programs into one program and an erase mode for erasing programs are provided as the edit modes.

In the case of this example, a section delete mode is further prepared and a section delete point designation key 39 (hereinafter referred to as "designation key") is provided for use in the operation of designating the start points and the end points in section delete mode.

In this example a description is given where the point designation operation is carried out using this designation key 39 but, for example, the function of the designation key 39 can be combined with the yes key 30 with a single operation of the yes key 30 functioning as a designation operation and the two operations function as an enter operation. The functions of other keys and the function of the designation key 39 at the operation part can of course be maintained.

A continuous playback key 35, program key 36, shuffle key 37 and multi-access key 38 are provided as keys for the playback mode operations.

One of continuous playback mode, program playback mode, shuffle playback mode or multi-access playback mode can then be set as the playback mode by operating these keys.

In this example, these operating means are described as being on the front panel of the recording/playback apparatus but these operation keys can also be provided on a remote control unit, with, for example, the recording/playback apparatus then being operated using this remote control unit via infra-red rays, etc.

The internal configuration of the minidisc recording and playback apparatus of FIG. 2 will now be described using FIG. 3.

A magneto-optical disc 1 recorded with compressed audio data is rotatably driven by a spindle motor 2. An optical head 3 then illuminates the magneto-optical disc 1 with laser light during recording and playback.

The optical head 3 provides a high-level laser output in order to heat a recording program to a Curie temperature during recording and provides a comparatively low level laser output to detect data from light reflected back due to the magnetic Kerr effect during playback.

To achieve this, the optical head 3 is provided with an optical system comprising a laser diode taken as the laser output means, and a polarized beam splitter and object lens, etc., together with a detector for detecting reflected light. The object lens 3a can be moved in the radial direction and towards and away from the disc and is kept in position by a twin-axial mechanism 4.

Further, a magnetic head 6a is provided at a position opposite the optical head 3 in such a manner as to sandwich the disc 1. The magnetic head 6a applies a magnetic field modulated by supplied data to the magneto-optical disc 1.

The whole of the optical head 3 and the magnetic head 6a can be moved in the radial direction of the disc by a thread mechanism 5.

Information detected from the disc 1 by the optical head 3 is supplied to an RF amplifier 7 as a result of the playback operation. The RF amplifier 7 then extracts an RF playback signal, programming error signal TE, focus error signal FE and group information (absolute position information recorded on the magneto-optical disc 1 as pregrooves (wobbling grooves)) GFM etc. by arithmetically processing the supplied information.

The extracted RF playback signal is supplied to an encoder and decoder 8. The programming error signal TE and focus error signal FE are supplied to a servo circuit 9 and the group information GFM is supplied to an address decoder 10.

The servo circuit 9 generates each of the various servo driving signals using the programming error signal TE, focus error signal FE, program jump and access instructions from a system controller 11 comprising a microcomputer and rotational velocity information for the spindle motor 2, controls the twin-axial mechanism 4 and thread mechanism 5 and carries out focus and programming control, as well as controlling the spindle motor 2 to be at a Constant Linear Velocity (CLV).

The address decoder 10 decodes the supplied group information GFM and extracts address information. This address information is supplied to the system controller 11 and used in each of the various control operations.

The RF playback signal undergoes decode processing such as Eight-Fourteen Demodulation and Cross Interleaved Reed Solomon Coding (CIRC) etc. at the encoder and decoder 8 and at this time the address and subcode data etc. is also extracted and supplied to the system controller 11.

Audio data (Sector data) that has been EFM demodulated and CIRC processed etc. at the encoder and decoder 8 is written to a temporary buffer memory 13 by the memory controller 12. Reading of data from the disc 1 by the optical head 3 and transmission of playback data from the optical head 3 to the buffer memory 13 is at 1.41 Mbits/sec but is carried out intermittently.

Data written to the buffer memory 13 is read out at such a timing that the transmission of the playback data is at 0.3 Mbits/sec and supplied to an encoder and decoder 14. This compressed audio data then undergoes expansion and playback signal processing and is put into the form of a 16-bit quantized digital audio signal sampled at 44.1 KHz.

The digital audio signal is then put into the form of an analog signal by a Digital to Analog (D/A) converter 15 after adjustment processing such as equalization, reverberation and gain etc. has been carried out at a digital signal processor 21, supplied to prescribed amplifier circuitry from an output terminal 16, played back and outputted as, for example, left and right audio signals.

The digital signal processing circuit is formed from a so-called DSP (Digital Signal Processor) and can carry out various kinds of processing. This is not just equalization processing at the audio settings for each of the various modes but can also be, for example, processing such as fade-in or fade-out processing where the gain (output volume level) is gradually changed.

These kinds of processing parts can also be provided after the D/A converter 15 and be carried out as analog processing.

A recording signal (analog audio signal) supplied to the input terminal 17 is put into the form of digital data by an A/D converter 18 while a recording operation is being executed for the magneto-optical disc 1. This data is then supplied to the encoder and decoder 14 and is audio compressed.

It is also possible to provide a digital interface part, not shown in the drawings, for inputting and outputting digital audio data.

Recording data compressed by the encoder and decoder 14 is written to the temporary buffer memory 13 by the memory controller 12 and then read out at a prescribed timing and sent to the encoder and decoder 8. This data is then sent to a magnetic head driving circuit 6 after undergoing encoding such as CIRC encoding and EFM modulation etc. at the encoder and decoder 8.

The magnetic head driving circuit 6 supplies a magnetic head drive signal to the magnetic head 6a in response to the encode-processed recording data, i.e. a north or south magnetic field is applied to the magneto-optical disc 1 by the magnetic head 6a. A control signal is supplied to the optical head at this time by the system controller 11 so that recording level laser light is outputted.

An operation part 19 shows the parts supplied for user operations corresponding to each of the various operation keys and dials described in FIG. 2. Operation information from these operation keys and dials is supplied to the system controller 11, which then executes operation control in response to this operation information.

The display part 20 is provided on a body as shown in FIG. 2 with the display operation being controlled by the system controller 11.

The system controller 11 is taken to be a microcomputer equipped with a CPU, program ROM, work RAM and interface etc. However, in the operation for the section delete mode of this example, a work RAM 11a shown in the drawings is used to store addresses of points (designated positions) while the operation for designating these start points and end points is being carried out.

Here, it is necessary to read management information recorded on the disc 1, i.e. P-TOCs (pre-mastered TOCs) and U-TOCs (user TOCs) while the recording or playback operation is being carried out. The system controller 11 can then identify between area addresses to be recorded on the disc 1 and area addresses to be played back, in accordance with this management information.

This management information is held in the temporary buffer 13.

The system controller 11 then reads this management information by executing a playback operation for the innermost periphery of the disc recorded with the management information while the disc 1 is being installed. This information is then stored in the buffer memory 13 and referred to during recording ro playback or editting operation of the disc 1.

The U-TOC can be edited and re-written in response to the recording and erasing of data. However, the system controller 11 carries out these editing processes for recording or editing operations with respect to the TOC information stored in the buffer memory 13 and the U-TOC area of the disc 1 can be re-written at a prescribed timing in response to this re-writing operation.

2. Cluster Format

Here, a description will be given of a unit known as a cluster.

Figure 4:
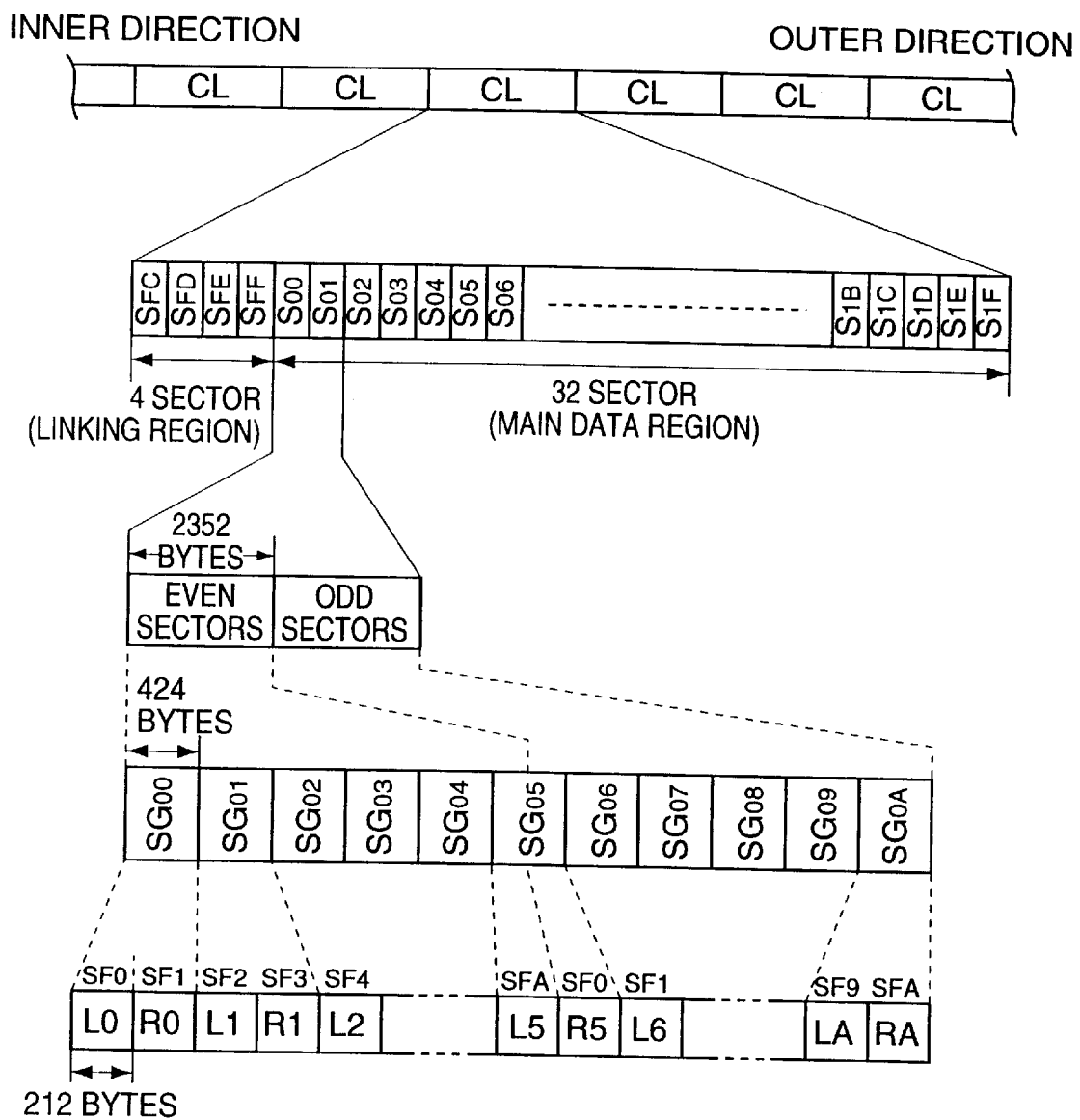
FIG. 4 is a schematic view showing the data format for recording on the recording medium to which the present invention is applied.

The format for clusters comprising recording operation units occurring in a minidisc system is shown in FIG. 4.

Clusters CL are successively formed as recording programs as shown in FIG. 4 in a minidisc system, with one cluster being the minimum unit during recording. One cluster is a program portion corresponding to two or three revolutions, with this number being different for the inner and outer peripheries.

One cluster CL comprises a linking region of four sectors of sector $S_{FC}$ to $S_{FF}$ and a 32 sector main data region shown as sectors $S_{00}$ to $S_{1F}$.

One sector is a data unit formed from 2352 bytes.

The four sectors of $S_{FC}$ to $S_{FF}$ can be used in sub-data recording and as a linking area, with recording of TOC data and audio data etc., being carried out at a 32 sector main data region.

An address is recorded every one sector.

The sectors are then further divided into units known as sound groups, with two sectors being divided into 11 sound groups.

As shown in the drawings, sound groups $SG_{00}$ to $SG_{0A}$ are included in two consecutive sectors of an even sector such as sector $S_{00}$ and an odd sector such as $S_{01}$. One sound group comprises 424 bytes and is an amount of audio data corresponding to 11.61 msecs.

Data is recorded within one sound group SG so as to be divided across an left channel and an right channel. For example, sound group $SG_{00}$ comprises left channel data L0 and right channel data R0, with sound group $SG_{01}$ comprising left channel data L1 and right channel data R1.

Here 212 bytes comprising a left channel and a right channel data region are referred to as a sound frame.

3. U-TOC Sector

In the above, the system controller 11 reads and then refers to the P-TOC and U-TOC (user TOC) recorded on the disc 1 as management information while recording or playback operation is carried out to and from the disc 1.

Here, a description will be given of the U-TOC sector for managing recording or playback operations for the programs on the disc 1.

U-TOCs and P-TOCs are provided here as the TOC information of the disc 1 and as the P-TOC is formed on the pit area at the inner periphery of the disc 1, this P-TOC is read-only information. The management of the position etc. of the recordable areas (recordable user areas), read-out areas and U-TOC areas of the disc can then be carried out using the P-TOC. With minidisc systems, playback-dedicated optical discs where all of the data is recorded using pit shapes can be used but in the case of playback-dedicated discs a U-TOC is not formed because management of songs recorded in ROM can be carried out by the P-TOC.

A detailed description of the P-TOC will be omitted and here a U-TOC provided on a recordable magneto-optical disc will be described.

FIG. 5 shows the format of a U-TOC sector 0.

Sector 0 to sector 7 can be provided as the U-TOC sector, with sector 1 to sector 4 being areas recorded with character information and sector 2 being an area recorded with the recording time.

First, a description will be given of the U-TOC sector 0 that is always required in recording or playback operations for the disc 1.

The U-TOC sector 0 is a data region recorded with management information mainly for programs recorded by the user or free areas that can be recorded with new programs.

For example, while a certain program is being recorded on the disc 1, the system controller 11 searches the U-TOC sector 0 for free areas on the disc and records audio data at these retrieved areas. Further, during playback, areas recorded with programs to be played back are determined from the U-TOC sector 0, these areas are accessed and a playback operation is carried out.

The leading position of data regions (2352 bytes of four bytes×588) for the U-TOC sector 0 is recorded with a synchronization pattern that is one byte of data lined-up as all zeros or all ones.

This is followed by an address comprising a cluster address (Cluster H) (Cluster L) and a sector address (Sector), four bytes of mode information (MODE) is added, and the header is provided thereafter.

A sector is a 2352 byte data unit, with 36 sectors comprising one cluster. The synchronization pattern and addresses are by no means limited to this U-TOC sector 0, with it also being possible to record these units at a P-TOC sector or data sector recorded with actual audio data.

The cluster address is two bytes of an upper address (Cluster H) and a lower address (Cluster L), and the sector address (Sector) is one byte.

The subsequent data of the maker code, model code, first program number (First TN0), last program number (Last TN0), used sectors (Used sectors), disc serial number and disc ID etc. is then recorded at prescribed byte positions.

Regions recorded with various table pointers (P-DFA, PEMPTY, P-FRA, P-TN01 to P-TN0255) are therefore prepared as corresponding table designation parts in order to make recording regions for programs recorded by the user or recordable regions etc. correspond with a management table part to be described later.

Here, 255 parts tables are provided from (01h) to (FFh) as management table parts corresponding to the table pointers (P-DFA to P-TN0255). A respective parts table is then recorded with the start address from which a certain part starts, an end address that is the end point, and parts mode information (program mode). Further, as there are cases where parts shown in each of the parts tables are linked to other parts, link information showing a parts table recorded with the start address and end address of the linked parts is also recorded.

In this specification, numerical values appended with [h] are shown to be in hexadecimal. Further, "parts" refers to program portions where data continuous with respect to time is recorded in a physically continuous manner within one program.

With the above recording/playback apparatus, erroneous playback operations are avoided by accessing data for one program recorded in a discontinuous manner i.e. recorded across a plurality of parts by accessing between these parts and making these parts continuous within memory. Program are recorded across a plurality of parts so that the user can use the recordable area to the utmost efficiency.

Link information is provided in order to link discretely recorded parts, with, for example, parts tables being linked by, for example, designating parts tables to be linked using numbers (01h) to (FFh) given to each parts table.

At a management table occurring at the U-TOC sector 0, one parts table expresses one part and management of the position of a program comprising, for example, three parts linked together is carried out using three parts tables linked by link information.

In reality, link information is expressed by numerical values taken as byte positions within U-TOC sectors obtained from prescribed arithmetic processing, i.e. designated by a parts table taken as 304+(link information)×8 (byte number).

Each of the parts tables from (01h) to (FFh) occurring in the management table for the U-TOC sector 0 express the contents of the parts as follows using the table pointers (Pointer for Defective Area (P-DFA), Pointer for Empty Slot (P-EMPTY), Pointer for Free Area (P-FRA), P-TN01 to P-TN0255) occurring in the corresponding table designation parts.

The table pointer P-DFA shows the defective regions on the magneto-optical disc 1 and designates the leading parts table within one or a plurality of parts tables expressing parts comprising defective regions that have occurred due to flaws etc. Namely, when a defective part exists, one of (01h) to (FFh) is recorded at the table pointer P-DFA, with the start and end addresses of the defective part then being shown at the corresponding parts table. When anther defective part exists, another parts table is designated as link information occurring in this parts table with the defective part also being indicated in this other parts table. When there are no further defective parts, the link information is taken to be, for example, [(00h)] and there are taken to be no links thereafter.

The table pointer P-EMPTY indicates the leading parts table of one or a plurality of un-used parts tables occurring in the management table part. When un-used parts tables exist, one of (01h) to (FFh) is recorded as the table pointer P-EMPTY. When a plurality of un-used parts tables exist, parts tables are designated sequentially using link information from the parts tables designated by the table pointer P-EMPTY with all of the un-used parts tables being linked on the management table part.

The table pointer P-FRA indicates parts tables for recordable areas that can be written with data on the magneto-optical disc 1 and designates the leading parts table of one or a plurality of parts tables. Namely, when a free area exists, one of (01h) to (FFh) is recorded at the table pointer P-FRA, with the start and end addresses of the free area parts being indicated at the corresponding parts table. When there is a plurality of these parts, sequential designation is carried out until the parts table for which the link information is [(00h)] is reached using the link information.

Figure 6:
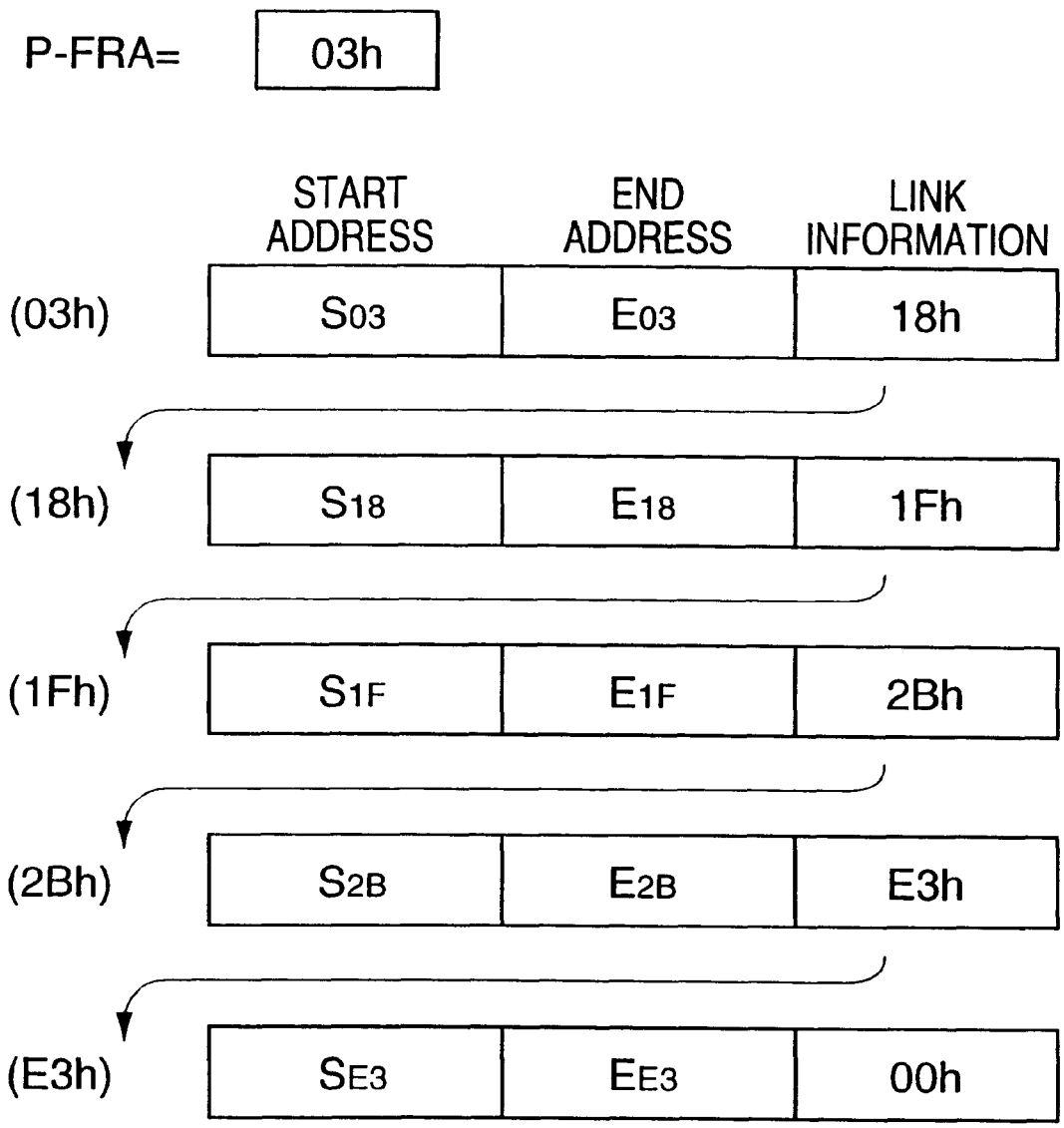
FIG. 6 is a schematic view where the free area expressed by the recordable region is spread over a plurality of parts on the recording medium to which the present invention is applied.

FIG. 6 schematically shows the management conditions for parts comprising the free area using the parts tables. When the parts (03h) (18h) (1Fh) (2Bh) (E3h) are taken as free areas, these conditions are shown as the conditions expressed by the links for the parts tables (03h) (18h) (1Fh) (2Bh) (E3h) continuing on from the corresponding table designation data P-FRA. The same is also the case for the management conditions for defective regions and unused parts tables.

If the magneto-optical disc is not recorded with any programs and has no defects, parts table (01h) is designated by the table pointer P-FRA so that all of the recordable user area of the disc is shown to be a free area. As, in this case, the remaining parts tables (02h) to (FFh) are not used, the parts table (02h) is designated by the table pointer P-EMPTY and parts table (03h) is designated as the link information for the parts table (02h) . . . so as to link as far as the parts table (FFh). The link information for the parts table (FFh) is thereafter taken to be [(00h)] indicating no link.

The start address of the recordable user area is recorded as the start address at the parts table (01h) and the address directly before the lead-out start address is recorded as the end address.

The table pointers P-TN01 to P-TN0255 indicate programs the user has recorded on the magneto-optical disc 1 with, for example, the parts table showing the part that is the leading part with respect to time of one or a plurality of parts recorded with the data for the first program being designated at P-TN01.

For example, when the program taken as the first program is not divided on the disc across a plurality of parts, i.e. when the program is configured as one part, the recording region for this first program is recorded as start and end addresses occurring in the parts table shown by the table pointer P-TN01.

When, for example, the program taken as the second program is recorded on the disc as a plurality of discrete parts, the recording position of each of the parts comprising this second program is sequentially allotted to each parts table. Namely, other parts tables are designated from the parts table designated at the table pointer P-TN02 using the link information so as to link as far as the parts table of link information of [00h] (the above is the same situation as for FIG. 6).

Therefore, by, for example, sequentially designating and recording all of the parts recorded with the data comprising the second program, the optical head 3 and magnetic head driving circuit 6 can be accessed, audio information comprising discrete linked parts can be captured and recording can be carried out so as to use the recording area in an efficient manner while playback of the second program or over-writing to the region on which the second program is recorded is being carried out using the data for the U-TOC sector 0.

With regards to the re-writable magneto-optical disc 1, the area management on the disc is carried out by the P-TOC and the songs recorded in the recordable user area and the free area etc. are managed by the U-TOC.

Figure 7:
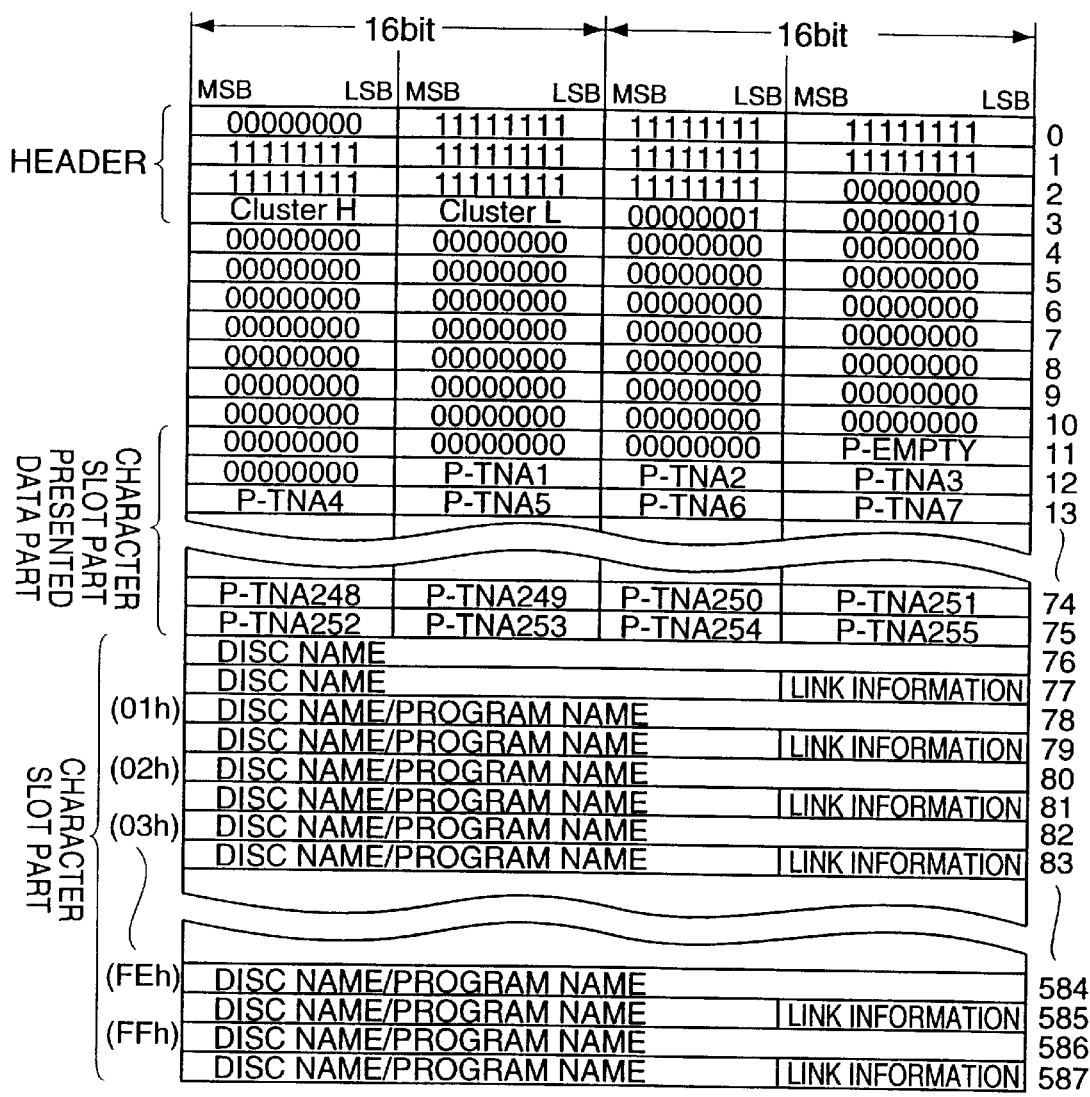
FIG. 7 is a view showing the management configuration of a U-TOC sector 1 for managing titles etc. of programs recorded on a recording medium to which the present invention is applied.

Next, the format of the U-TOC sector 1 is shown in FIG. 7. This sector 1 is for giving program names to each of the recorded programs and when a disc title is given, this is taken as a data region recorded with inputted character information.

Slot pointers P-TNA1 to P-TNA255 are prepared at the U-TOC sector 1 as character slot designation parts corresponding to each of the recorded programs and 255-unit slots (01h) to (FFh) where one unit is eight bytes are prepared as character slot parts designated by the slot pointers P-TNA1 to P-TNA255, with the character data being managed under almost the same conditions as for the aforementioned U-TOC sector 0.

Character information is recorded using ASCCI code as the disc title and program name etc. at the slots (01h) to (FFh). The eight bytes preceding the slot (01h) are taken to be a dedicated area for the disc name.

Characters inputted by the user corresponding to the first program are then, for example, recorded at the slot designated by the slot pointer P-TNA1. Further, character input corresponding to one program can therefore be made to correspond to more than 7 bytes (7 characters) by linking the slots using link information.

This U-TOC sector 1 also manages parts tables where the slot pointer P-EMPTY is not used.

Figure 8:
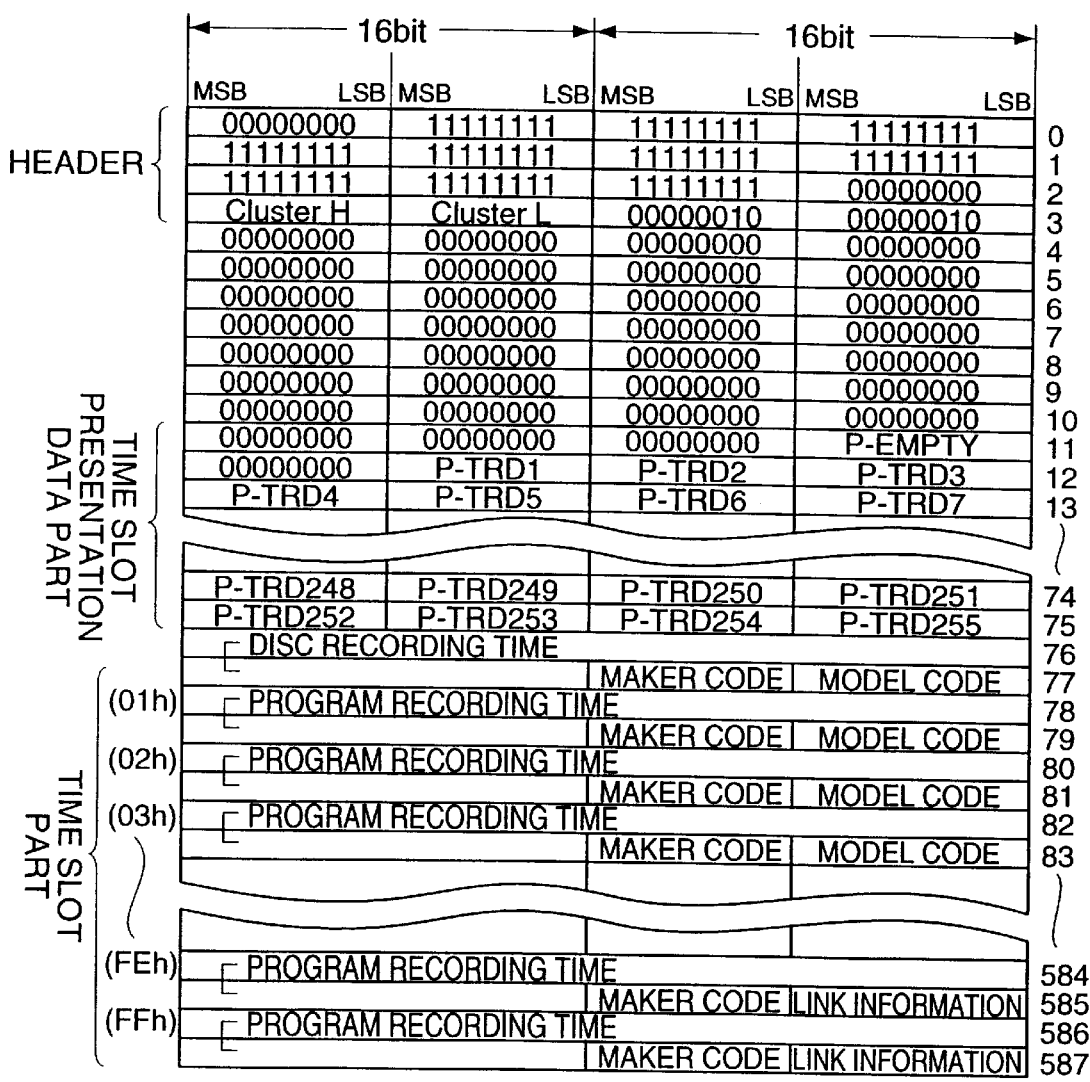
FIG. 8 is a view showing the management configuration of a U-TOC sector 2 for managing the recording time etc. of programs recorded on the recording medium to which the present invention is applied.

FIG. 8 shows the format of a U-TOC sector 2. This sector 2 is taken as a data region mainly for recording the recording time of programs that have been recorded.

Slot pointers P-TRD1 to P-TRD255 are prepared at this U-TOC sector 2 as time slot designation data parts corresponding to each of the recorded programs, as are time slot parts designated by these slot pointers P-TRD1 to P-TRD255. Slots (01h) to (FFh) for 255-units are also formed at the time slot part with 8 bytes being one unit, with the time data being managed under approximately the same conditions as the aforementioned U-TOC sector 0.

The recording time of programs is recorded using 6 bytes at the slots (01h) to (FFh). Each one byte is recorded with a numerical value corresponding to the year, month, day, hour, minute and second. The remaining two bytes are taken for the manufacturers code and the model code and are recorded with code data showing the manufacturer of the recording apparatus used for recording the program and code data showing the type of recording apparatus recorded.

The 8 byte slot preceding the slot (01h) is taken as an area for recording time data for the disc.

When, for example, a program is recorded on the disc as a first program, the recording time and the maker code and model code of the recording apparatus are recorded at the slot designated by the slot pointer P-TRD1. The recording time data is then automatically recorded by the system controller 11 referring to the internal clock 11a.

The slot pointer P-EMPTY also manages slots that are not being used at this U-TOC sector 2. Link information is recorded in place of the model code for slots that are not being used and the slot pointer P-EMPTY links each of the un-used slots using the link information so that these slots are managed.

The U-TOC sector 4 gives program names to programs recorded by the user in the same way as the aforementioned sector 1 and, when a disc title is given, is taken as a data region for recording inputted character information, with the format being omitted from the drawings as the format is almost the same as for FIG. 7.

This sector is actually recorded with code data corresponding to Chinese or European characters and in addition to the data for sector 1 of FIG. 7, is recorded with attributes for character codes used as character code at prescribed positions.

The management of the character information for the U-TOC sector 4 is carried out using 255-unit slots (01h) to (FFh) designated by the slot pointers P-TNA1 to P-TNA255 and slot pointers P-TNA1 to P-TNA255 taken as character slot designation parts in the same way as for sector 1.

4. Management Example Employing U-TOC.

Here, the area structure of the magneto-optical disc 1 is described and an example of the recording conditions managed by the P-TOC and U-TOC is given.

Figures 9A, 9B, 9C:
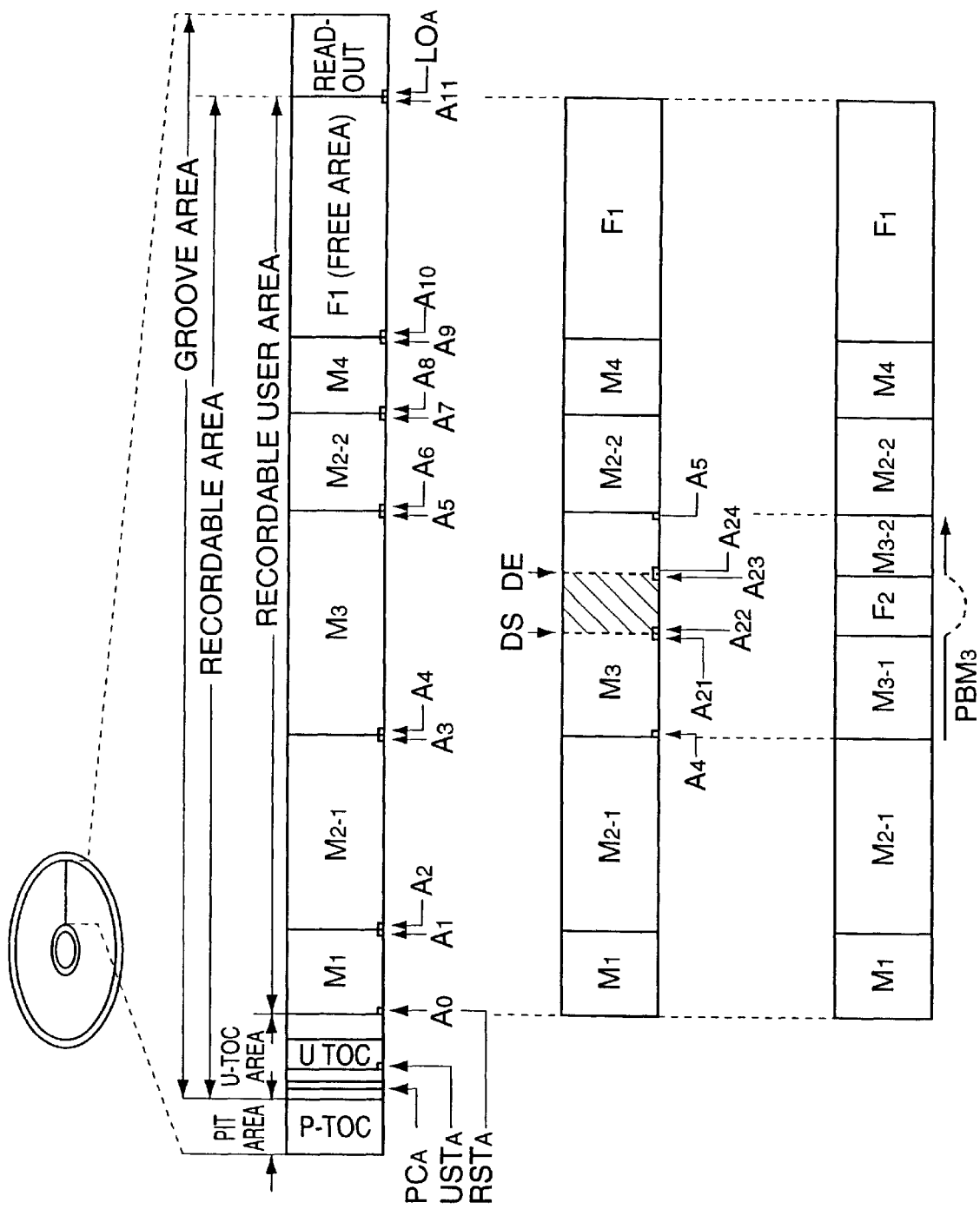
FIG. 9A is a schematic view of the case where a plurality of programs are recorded on the recording medium to which the present invention is applied.
FIG. 9B is a schematic view of programs on the recording medium while a delete operation of a prescribed period is being designated for prescribed programs of a plurality of programs on the recording medium to which the present invention is applied.
FIG. 9C is a schematic view of programs on the recording medium after editing work of designating delete operations of a prescribed period with respect to prescribed programs of a plurality of programs is carried out for a recording medium to which the present invention is applied.

FIG. 9A schematically shows the area structure of the disc 1 in the radial direction.

In the case of a magneto-optical disc, this can be largely divided into a P-TOC area recorded with data using embossed pits shown as the pit area in FIG. 9A and a groove area provided as a groove (channel) taken as a so-called magneto-optical area.

A P-TOC is repeatedly recorded as a pit area. At this P-TOC, the U-TOC position is displayed as a U-TOC start address $UST_A$ and addresses such as the read out start address $LO_A$, recordable user area start address $RST_A$, power calibration area start address $PC_A$, etc. are shown for each position shown in FIG. 9A.

A groove area is formed after the pit area on the side of the innermost periphery of the magneto-optical disc 1. Within this groove area, the area up to the address shown as the lead out start address $LO_A$ within the P-TOC is taken as the recordable area, with the area thereafter being taken as the lead out area.

A recordable user area that is actually recorded with programs of the recordable area is taken as being from the recordable user area start address $RST_A$ to the position directly before the lead out start address $LO_A$.

Within the groove area, the area previous to the recordable user area start address $RST_A$ is taken as the management area for the recording/playback operation and is recorded with the aforementioned U-TOC. Further, one cluster portion from the position shown as the power calibration area start address $PC_A$ is provided as a laser power calibration area.

The U-TOC then consecutively records three clusters (one cluster=36 sectors) from the position shown at the U-TOC start address $UST_A$ within the management area for the recording/playback operation.

The actual audio data is recorded at the recordable user area as shown in, for example, the example shown in FIG. 9A. In this example the case where four programs $M_1$ to $M_4$ are recorded is shown.

First, a program $M_1$ comprising the first program is recorded as parts for addresses $A_0$ to $A_1$, with program $M_2$ comprising a second program recorded so as to be divided between part $M_{2-1}$ for the preceding half portion recorded at addresses $A_2$ to $A_3$ and part $M_{2-2}$ for the following half portion recorded at addresses $A_6$ to $A_7$. Further, the program $M_3$ comprising the third program is recorded as parts for addresses $A_4$ to $A_5$ and the program $M_4$ comprising the fourth program is recorded as parts for addresses $A_8$ to $A_9$.

Under these conditions, the free area $F_1$ that is not yet recorded with programs becomes parts for addresses $A_{10}$ to $A_{11}$.

An example of the data for the U-TOC sector 0 managing the conditions of FIG. 9A is shown in FIG. 10.

In FIG. 10, portions where one byte of data is taken as "00h" for table pointers and link information within the U-TOC and portions where three bytes of data are taken as "000000h" for start addresses and end addresses are shown by "-".

Corresponding parts/programs are shown on the right side of each parts table.

Further, it is taken that there are no defects in the recordable user area on the magneto-optical disc 1 and the table pointer P-DFA is taken to be "00h".

Under the recording conditions of FIG. 9A the table pointer P-FRA is managed as a free area. Therefore, in this case, when a parts table referred to as (06h) is shown at the table pointer P-TRA, information for the parts comprising the free area $F_1$ of FIG. 9A are shown at the parts table (06h) accordingly, i.e. address $A_{10}$ is shown as a start address and address $A_{11}$ is shown as an end address. The link information for the parts table (06h) is then taken to be "00h" because other free area parts do not exist in this case.

The start address $A_0$ and end address $A_1$ for the first program $M_1$ are shown by the parts table (01h) shown at the table pointer P-TN01. The link information for parts table (01h) is taken to be "00h" because the program $M_1$ is recorded as one part.

A start address $A_2$ and end address $A_3$ for the second program $M_2$ are shown in the parts table for "02h" shown at table pointer P-TN02. This is to say that program $M_2$ is recorded as two separate parts ($M_{2-1}$ and $M_{2-2}$) and that address $A_2$ and address $A_3$ are only shown at the part $M_{2-1}$ at the front half portion of the program $M_2$. The parts table (04h) is shown, for example, as the link information for the parts table (02h) and a start address $A_6$ and an end address $A_7$ are recorded as it is intended to show parts for the part $M_{2-2}$ of the following half portion at the parts table (04h). Links are not necessary thereafter and the link information for the parts table (04h) is therefore taken to be "00h".

The positions of the parts for the third program $M_3$ and fourth program $M_4$ are managed by parts tables obtained as the start points for the table pointers P-TN03 and P-TN04. The table pointers P-TN05 to P-TN0255 are then not used and taken as "00h" because a fourth program is not recorded.

Further, the table pointer P-EMPTY showing parts tables that are not used shows the parts table (07h) in this case and all of the parts tables that are not yet being used from parts table (07h) to parts table (FFh) are linked using link information.

5. Section Delete Process.

Each of the various editing operations are possible using updating of the U-TOC data as described above but this example makes the work of editing where portions within a program a deleted particularly easy by achieving editing processing known as section deleting.

The editing mode known as section delete editing is described in FIG. 9B, FIG. 9C and FIG. 11.

Under the recording conditions of FIG. 9A described above, the user intends to delete a section given diagonal lines in FIG. 9B as the part of program $M_3$.

The user performs a start point designation operation DS for designating the start point taken as the start position of the section comprising the target of the section delete processing and an end point designation operation DE for designating the end point that is the end position of the section comprising the target of the delete processing after the operation of adopting the section delete mode using, for example, the section delete point designation key 39 in FIG. 2, has been carried out.

The address (section delete start address) on the disc 1 designated by the start point designation operation DS is then taken to be address $A_{22}$. Further, the address (section delete end address) on the disc 1 designated using the end point designation operation is taken to be $A_{23}$.

The system controller 11 then updates the U-TOC so that the section from this section delete start address $A_{22}$ to the section delete end address $A_{23}$ is deleted.

As shown in FIG. 9C, program $M_3$ is a program comprising two parts of part $M_{3-1}$ from address $A_4$ to $A_{21}$ and part $M_{3-2}$ from address $A_{24}$ to $A_5$, with the section from section delete start address $A_{22}$ to section delete end address $A_{23}$ being taken as a free area.

As an example, from the conditions for FIG. 9A managed by the data example shown in FIG. 10, the U-TOC sector 0 is updated as shown in FIG. 11 in response to the start point designation operation DS and the end point designation operation DE and the conditions in FIG. 9C are realized.

The portion given inclined lines in FIG. 11 shows the portion updated from the conditions in FIG. 10.

Namely, in order to obtain the part $M_{3-1}$ comprising from address $A_4$ to $A_{21}$ of program $M_3$, the end address of the parts table (03h) has to be written to "$A_{21}$" and, for example, parts table (08h) is designated as link information for linking the part $M_{3-2}$. The start address "$A_{24}$" and end address "$A_5$" are then listed as the part $M_{3-2}$ at the parts table (08h) and the link information is taken to be "00h".

For example, the parts table (07h) is then designated as link information at the parts table (06h) managed by the free area $F_1$ in FIG. 10 in order to generate two free areas $F_1$ and $F_2$ as the free area. Start address "$A_{22}$" and end address "$A_{23}$" are then listed as the newly generated free area $F_2$ at the parts table (07h) and the link information is taken to be "00h".

Further, the new parts table (07h) (08h) is used, the value for the table pointer P-EMPTY is updated to "09h" and the parts tables (09h) to (FFh) are managed as un-used parts tables.

By updating the U-TOC sector 0 in this way, a part of the program $M_3$ is deleted in the way shown in FIG. 9C, i.e. the two parts of part $M_{3-1}$ and part $M_{3-2}$ are then played back consecutively with respect to time as the playback operation of the program $M_3$, as shown by the arrow $PBM_3$ at the lower part.

Namely, in this example, the complicated editing work described in FIG. 1 is no longer necessary as a result of carrying out this section delete process and a portion delete occurring at the desired program is possible via a simple operation where only the portion it is desired to delete is designated.

6. Rehearsal Function Occurring in Section Delete Processing.

In the above section delete mode the user carries out a start point designation operation DS for designating the start point that is the start position of the section that is to be the target of the section delete process and an end point designation operation DE for designating the end point that is the end position of the section taken as the target of the section delete process. However, pinpointing a specific point in music software etc. is not easy.

For example, when it is wished to only delete the second part of a program that is in the order of an introduction, first part, second part, third part and ending, a start point designation operation DS is carried out on the joint of the first and second parts and end point designation operation DE is carried out on the joint of the second and third parts. However, if the designation of the end point is not carried out in an accurate manner, the sound of the joint of the first and third part can sound un-natural and the rhythm is lost while the introduction—first part—third part—ending are being played back.

It is also, of course, difficult for the user to designate the start point and end point of the section delete at exactly the right timing while listening to the reproduced audio signal.

In this example, a rehearsal function is provided for executing the required playback operation taking the start points and end point as references while the operation of designating the start and end points is being carried out in section delete mode. The designated positions of the start and end points can then be adjusted backwards and forwards while listening to the rehearsal playback audio so that the most appropriate section delete can be easily achieved.

The operation of the rehearsal function will now be described using FIG. 12 and FIG. 13. A description is given here of the rehearsal operation while the user carries out the start point designation operation DS but the rehearsal operation during the end point designation operation DE is executed in a similar manner. Further, various examples can be considered for the rehearsal operation while the end point designation operation DE is carried out but in the following the an example of each section delete operation is given.

In FIG. 12, a section of a prescribed duration is repeatedly played back in rehearsal taking the designated address as a starting point while the user carries out the start point designation operation DS.

The user then carries out a start point designation operation DS where the user presses the delete point designation key 39 shown in FIG. 2 at the required timing while listening to the played-back sound. The address on the disc designated by this operation is then taken as the address $A_{X1}$ shown in FIG. 12A and the system controller 11 takes this address $A_{X1}$ in as the section delete start address Ads.

The system controller 11 then executes a playback operation of a duration T (for example, about 4 to 10 seconds) from the address $A_{X1}$. This is, for example, the rehearsal playback RH shown by the arrow in FIG. 12 and the user determines whether or not the point designated by the start point designation operation DS is appropriate while listening to the rehearsal playback sound.

If the point is not thought to be appropriate, the jog dial 27 is operated and the designated point is changed.

For example, if the jog dial 27 is rotated in the + direction, the designated point is changed in the forward direction with respect to time. Conversely, if the jog dial 27 is rotated in the − direction, the designated point is changed in a reverse direction with respect to time.

Figure 12A:
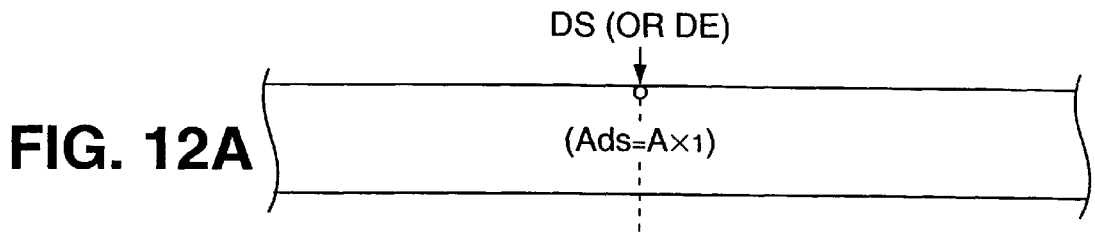
FIG. 12A is a schematic view showing rehearsal playback for a section positioned after the place of designation of the start address (or end address) while the start address (or end address) of the place to be section deleted is being designated.

For example, it is taken that the jog dial 27 is rotated in a − direction from the conditions of FIG. 12A. The system controller 11 then changes the position designated as the start point designation operation DS in the reverse direction with respect to time in the way shown in FIG. 12 in response to the extent of the rotation operation, i.e. the value of the section delete start address Ads is changed to the address $A_{X2}$.

The system controller 11 then executes rehearsal playback RH for just the period of time T from the address $A_{X2}$ and the user is made to determine whether or not the designated point is appropriate.

Figure 12B:
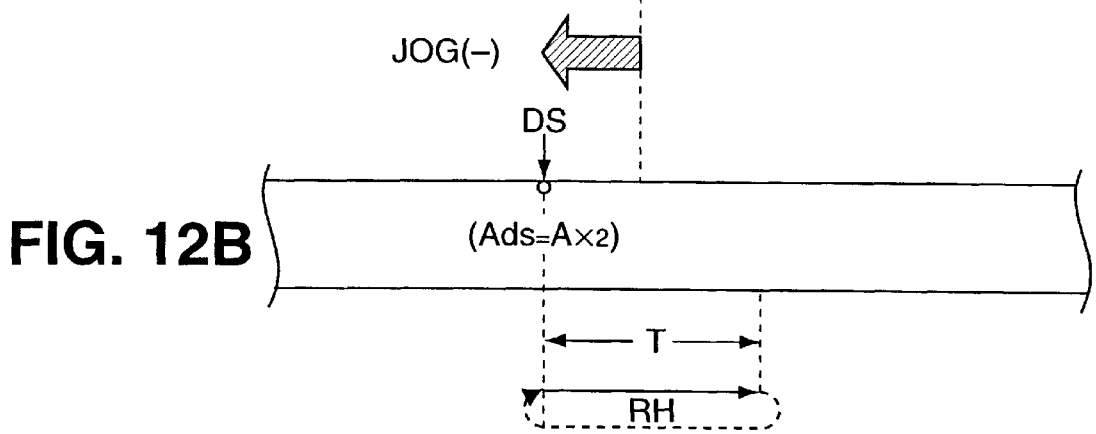
FIG. 12B is a first schematic view showing shifting conditions of the rehearsal section while changing the start address (or end address) designated after the start address designation for the place to be section deleted.
Figure 12C:
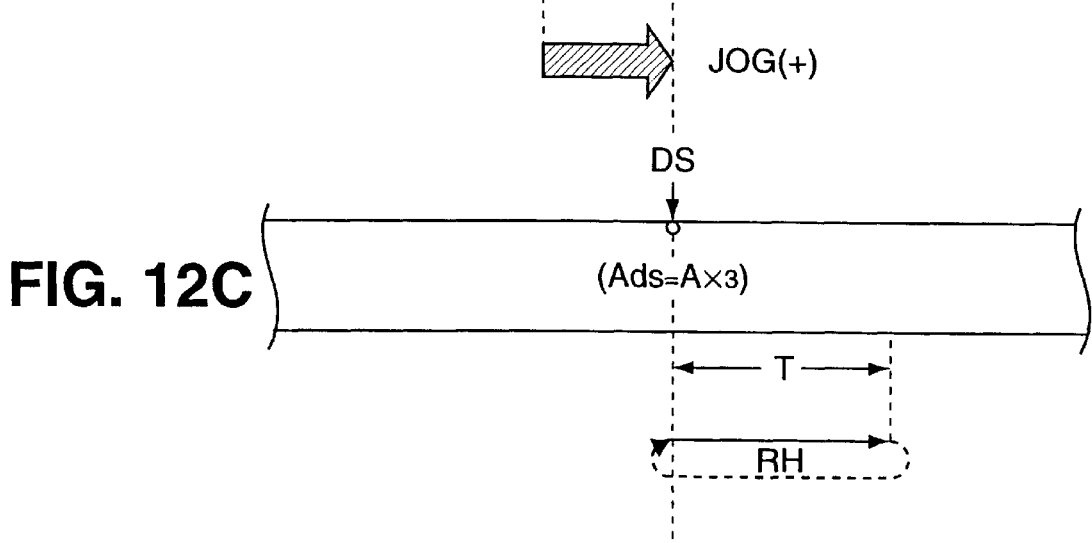
FIG. 12C is a second schematic view showing shifting conditions of the rehearsal section while changing the start address (or end address) designated after the start address (or end address) designation for the place to be section deleted.

Moreover, it is then taken that the jog dial 27 is rotated in the + direction from the conditions of the FIG. 12B. The system controller 11 then changes the position designated as the start point designation operation DS in the forward direction with respect to time in the way shown in FIG. 12 in response to the extent of the rotation operation, i.e. the value of the section delete start address Ads is changed to the address $A_{X3}$.

The system controller 11 then executes rehearsal playback RH for just the period of time T from the address $A_{X3}$ and the user is made to determine whether or not the designated point is appropriate.

In this way, the user can operate the jog dial 27 to adjust the designation point and therefore confirm the designation point using the rehearsal playback sound. If the point is designated to be appropriate, for example, the yes key 30 is pressed and an enter operation is carried out. The system controller 11 then confirms the section delete start address Ads for this point in time as the address for the start point of the section delete process.

Figure 13A:
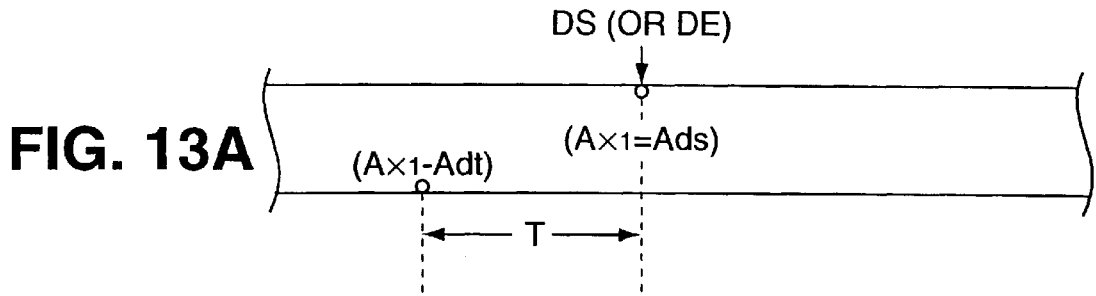
FIG. 13A is a schematic view showing rehearsal playback of a section positioned before the start address (or end address) designation place during designation of the start address (or end address) of the place to be section deleted.
Figure 13B:
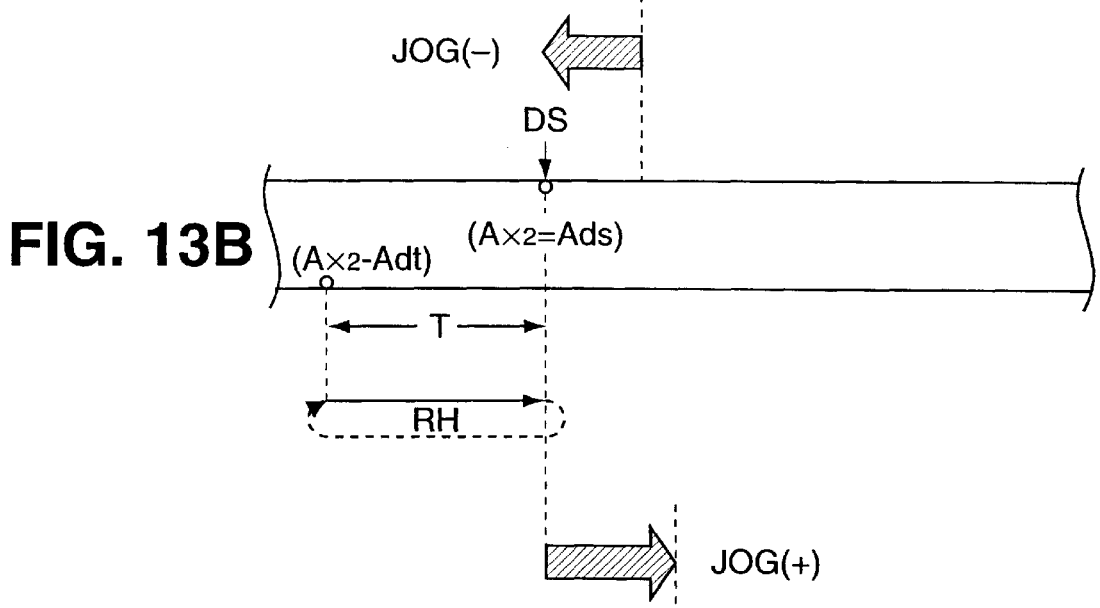
FIG. 13B is a first schematic view showing the shifting conditions for the rehearsal section during changing of the start address (or end address) designated after designation of the start address (or end address) for the place to be section deleted.
Figure 13C:
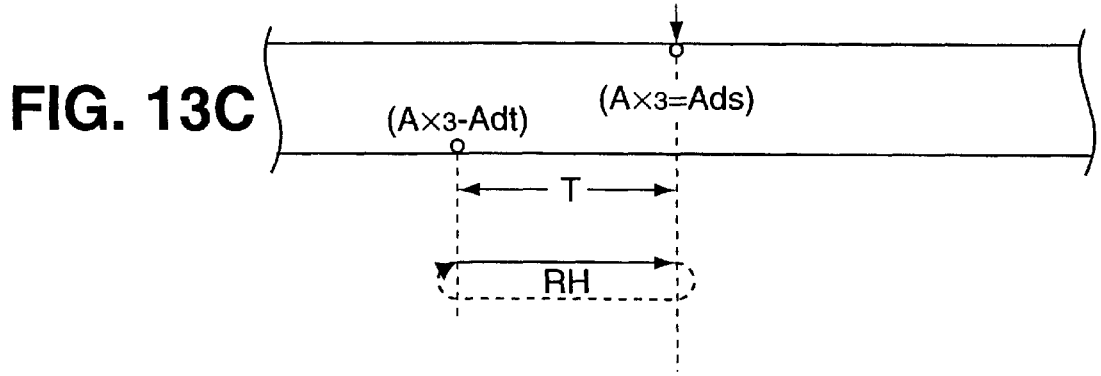
FIG. 13C is a second schematic view showing shifting conditions of the rehearsal section while changing the start address (or end address) designated after the start address (or end address) designation for the place to be section deleted.

In the example in FIG. 13A to FIG. 13C, rehearsal playback is repeatedly carried out for a section from a prescribed period of time previous with respect to a designated address while the user carries out a start point designation operation DS (or end point designation operation DE).

The user then carries out a start point designation operation DS where the user presses the section delete point designation key 39 at the required timing while listening to the played-back audio. The address on the disc designated by this operation is then taken as the address $A_{X1}$ shown in FIG. 13A and the system controller 11 takes this address $A_{X1}$ in as the section delete start address Ads.

The system controller 11 then subtracts the address amount Adt corresponding to a certain specified time T of, for example, 4 to 10 seconds from the address $A_{X1}$ from the address $A_{X1}$ and obtains an address ($A_{X1}$−Adt) for a position T seconds previous to the address $A_{X1}$. Rehearsal playback RH is the repeatedly carried out from address ($A_{X1}$−Adt) to address $A_{X1}$ so as to correspond with the time T and the user is made to confirm whether or not the designated point is appropriate.

It is taken that the user rotates the jog dial 27 in a − direction. The system controller 11 then changes the position designated as the start point designation operation DS in the reverse direction with respect to time in the way shown in FIG. 13B in response to the extent of the rotation operation, i.e. the value of the section delete start address Ads is changed to the address $A_{X2}$.

The system controller 11 the subtracts the address amount Adt corresponding to the time T from the address $A_{X2}$ from the address $A_{X2}$ and the address ($A_{X2}$−Adt) of a position T seconds previous to the address $A_{X2}$ is obtained. Rehearsal playback RH from the address ($A_{X2}$−Adt) comprising the time T to the address $A_{X2}$ is then repeatedly carried out and the user is made to confirm whether or not the designation point is appropriate.

Further, the jog dial 27 is taken to be rotated in the + direction from the conditions of, for example, FIG. 13B. The system controller 11 then changes the position designated as the start point designation operation DS in the forward direction with respect to time in the way shown in FIG. 13 in response to the extent of the rotation operation, i.e. the value of the section delete start address Ads is changed to the address $A_{X3}$.

The system controller 11 then subtracts the adress amount Adt corresponding to the time T from the address $A_{X3}$ from the address $A_{X3}$ and obtains the address ($A_{X3}$−Adt) of a position T seconds previous to the address $A_{X3}$. The rehearsal playback RH that comprises the time T from the address ($A_{X3}$−Adt) to address $A_{X3}$ is then repeatedly executed and the user is made to confirm whether or not the designated point is appropriate.

In this case also, the user operates the jog dial 27 so as to adjust the designation point and the designation point can then be confirmed using the rehearsal playback audio. If this is considered to be an appropriate point, for example, the yes key 30 is pressed and an enter operation is carried out. The system controller 11 then confirms the section delete start point address Ads at this point in time as the address for the start point of the section delete process.

In the case of a minidisc system, there are cases where a single program is divided across a plurality of parts. In this case, the relationship between the position with respect to time from the point of view of the playback operation and the physical position on the disc must not coincide.

There are therefore cases where the address for a position T seconds previous to a certain address $A_X$ indicating the physical position on the disc cannot simply be obtained using $(A_X-Adt)$.

In reality, when the certain address $A_X$ is a point address within T seconds of the head of a predetermined part, it is necessary to find a return address from the end of the previous part to which said part is linked for times not fulfilling T seconds. This address calculation can be a calculation where conversion of the time amount and the address amount is carried out or a calculation where each parts address occurring in the U-TOC is referred to and the start address of parts included in the address $A_X$ and the end addresses of preceding parts are used.

Specifically, the start address for the parts including the address $A_X$ is taken to be APlST and when the address amount $(A_X-A_XST)$ from the start address $A_XST$ to the address $A_X$ does not fulfill the address amount Adt for the T second portion the audio data for the audio data T seconds previous is recorded at the previous part linked to said parts. Therefore, within the parts, there is not enough time to return and it is therefore necessary to return from the end address of the previous parts. Within the parts, not enough time to return means that the address amount $(A_X-A_XST)$ is not an amount that fulfills the address amount Adt for the T second portion and becomes the address amount $(Adt-(A_X-A_XST))$.

Therefore, when the end address of the previous part is taken to be $A_{PO}ED$, the point address for T seconds previous from address $A_X$ can be obtained from $A_{PO}ED-(Adt-(A_X-A_XST))$ In the example in FIG. 12A to FIG. 12C and FIG. 13A to FIG. 13C, while the user performs the start point or end point designation operation, whether or not the designation point is appropriate is confirmed using a section rehearsal playback of sound from the designation point or sound played back up to the designation point taking a designation point as a reference, with the designation point then being revised as necessary. In this way appropriate sections are designated and section delete processing is executed and the deleting of sections appointed inappropriately is prevented.

Units for the amount of adjustment made using the jog dial 27 can be, for example, carried out using fine adjustments of sector units and can also be executed using finer sound group units.

Further, in this example a jog dial 27 is used but other operating means such as operating keys can of course be used.

7. Section Delete Process Accompanying Rehearsal Operation.

(a. Section delete operation example 1).

In the following, operating examples 1 to 8 will be described as examples of section delete processing operations accompanying the rehearsal operation.

First, operating example 1 will be described using the image 13 of FIG. 14 and the flowcharts of FIG. 15 and FIG. 16.

Figure 15:
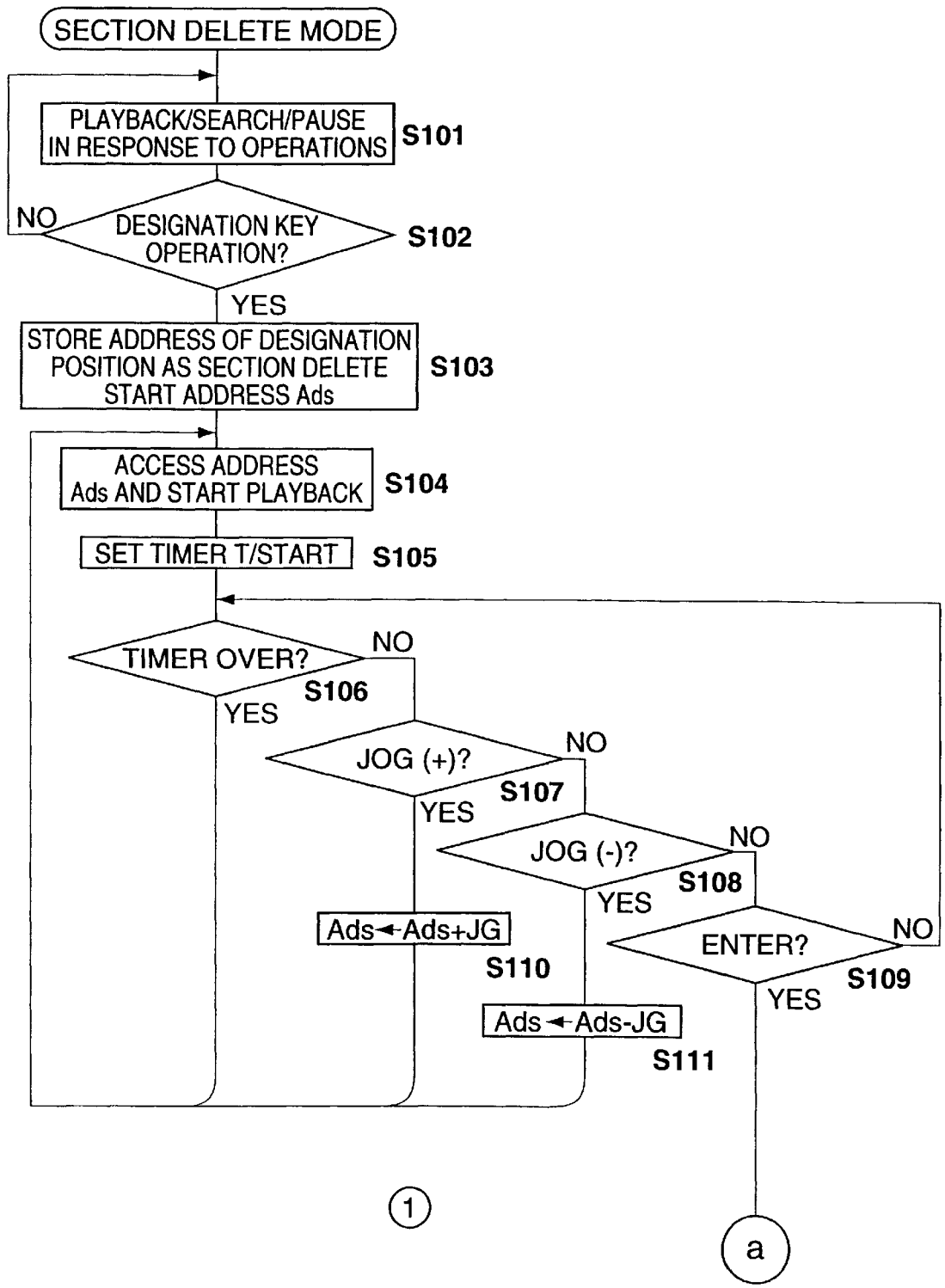
FIG. 15 shows a flowchart of the rehearsal operation during section delete designation of the first embodiment.

When the user adopts section delete mode by operating the edit key 29, the system controller starts the process of FIG. 15.

In this section delete mode it is first necessary for the user to carry out the start point designation operation DS but in order to do this a point for carrying out the start point designation operation DS (namely the operation of the designation key 39) has to be found.

In order to do this, the user first executes a playback operation or search operation or pause operation etc. as necessary and the desired point to be taken as a start point for executing the section delete is searched for. Therefore, in step S101, the system controller 11 executes operations such as playback or search (access, fast forward, or rewind) or playback pause etc. so as to correspond with these kind of user operations.

The user then searches for the desired point so as to press the section delete point designation key 39 in line with the timing of the playback output for the audio of the point taken as the point for starting execution of the section delete, i.e. the start point designation operation DS is carried out. The process of the system controller 11 then proceeds from step S102 to step S103 and the address of the pointer designated in the start point designation operation DS is stored in an internal RAM 11a as the section delete start address Ads.

Next, in step S104, the optical head 3 is made to access the section delete start address Ads and a playback operation is made to start from this address Ads. In step S105 the timer that counts the time T (for example, 4 to 10 seconds) is installed as the internal timer and the count is made to start.

Figure 14:
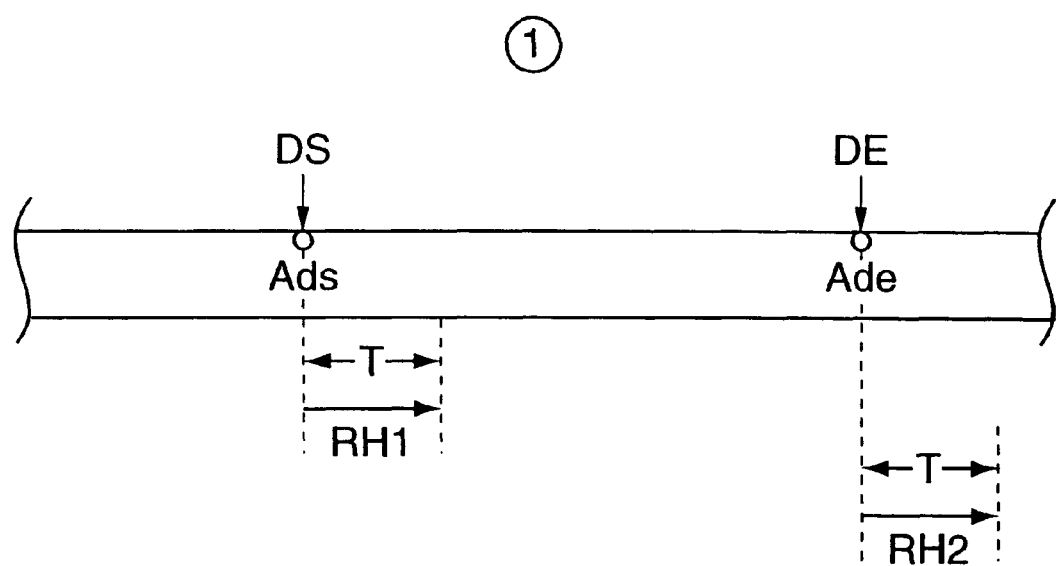
FIG. 14 shows a first embodiment of a rehearsal operation during section delete designation.

Namely, the operation for the rehearsal playback RH1 occurring in FIG. 14 is made to start. The operation of this rehearsal playback RH1 is an operation corresponding to the example described in FIG. 12.

A loop is then entered of step S106, S107, S108 and S109 that monitors time over of the time T, operations of the jog dial 27 and enter operations due to the yes key 30, etc.

The rehearsal playback RH1 is repeated until there is an operation of the jog dial 27 or an enter operation, i.e. the time when a time over is detected in step S106 is the time when playback of time T taken as the rehearsal playback RH1 of FIG. 14 has finished. At this time step S104 is returned to, an optical head 3 is made to access the section delete start address Ads and the playback operation is made to start. In step S105, the timer that counts the time T (for example, 4 to 10 seconds) as an internal timer is set and the count is made to start, i.e. the rehearsal playback RH1 is re-started.

When the user rotates the jog dial 27 in the +direction during execution of the rehearsal playback RH1, the process proceeds from step S107 to S110 and the system controller 11 updates the value of the section delete start address Ads stored in the RAM 11a. Namely, the address amount JG is calculated in response to the extent of the operation of rotating the jog dial 27 in the + direction. This is then added to the stored value for the section delete start address Ads so as to give a new section delete start address Ads. Step S104 and S105 are then returned to and rehearsal playback is made to start taking the new section delete start address Ads as a reference. Namely, as described in FIG. 12C, the designation pointer of the start point designation operation DS is changed in the forward direction with respect to time and rehearsal playback is carried out taking this value as a reference.

When the user rotates the jog dial 27 in the − direction during execution of the rehearsal playback RH1, the process proceeds from step S108 to S111 and the system controller 11 updates the value of the section delete start address Ads stored in the RAM 11a. Namely, the address amount JG is calculated in response to the extent of the operation of rotating the jog dial 27 in the − direction. The address amount JG is then subtracted from the stored value for the section delete start address Ads so as to give a new section delete start address Ads. Step S104 and S105 are then returned to and rehearsal playback is made to start taking the new section delete start address Ads as a reference. Namely, as described in FIG. 12B, the designation pointer of the start point designation operation DS is changed in the reverse direction with respect to time and rehearsal playback is carried out taking this value as a reference.

As described above, when one program is divided between a plurality of parts, the position with respect to time from the point of view of the playback operation and the physical position on the disc do not coincide.

In order to ease the complexity of the description, changing process of the section delete start address Ads occurring in step S110 and step S111 has been shown as the processing involving simple adding or subtracting has been shown when the extent of the change caused exceeds the parts partition point arithmetic processing for the adress calculation is required as a result. For example, when the section delete start address Ads is in the vicinity of the parts start address, in the case of an operation for updating the section delete start address Ads so as to return with respect to time, updating of the return address value by just a required portion of time from the previous parts end address is carried out to give a new section delete start address Ads.

This kind of situation is the same for step S122 and S123 occurring in FIG. 16 and is the same for processing steps of the same contents occurring the operation examples 2 to 8 to be described later, although in this description this is described for just adding and subtracting processing for the sake of simplicity.

When the user listens to the rehearsal playback sound and determines that the point designated for the start point designation operation DS is appropriate, the user carries out an enter operation. At this time, the process for the system controller 11 proceeds from step S109 to step S112 of FIG. 16 and a playback operation from the section delete start address Ads confirmed at this time is made to start. This playback operation is therefore an operation for finding a point for the user to carry out an end point designation operation DE (operation of designation key 39) from.

The user then executes search operations/pause operations/playback operations etc. as necessary while listening to the playback sound and the desired point for ending execution of the section delete is searched for. The system controller 11 then executes searches (access, fast forward, rewind)/playback pauses/playback operations etc. in step S113 in response to these user operations.

The user then searches for the desired point so as to press the section delete point designation key 39 in line with the timing of the playback output for the sound of the point taken as the point for ending execution of the section delete, i.e. the end point designation operation DE is carried out. The process of the system controller then proceeds from step S114 to step S115 and the address of the pointer designated in the end point designation operation DE is stored in an internal RAM 11*a* as the section delete end address Ade.

Next, in step S116, the optical head 3 is made to access the section delete end address Ade and a playback operation is made to start from this address Ade. In step S117 the timer that counts the time T (for example, 4 to 10 seconds) is set as the internal timer and the count is made to start. The time T that the timer counts for can be made to be the same as or different from the time in step S105 of FIG. 15.

The operation of the rehearsal playback RH2 occurring in FIG. 14 is made to start using the process of step S116 and S117. The operation of this rehearsal playback RH2 corresponds to the example described in FIG. 12A.

A loop is then entered of step S118, S119, S120 and S121 that monitors time over of the time T, operations of the jog dial 27 and enter operations due to the yes key 30, etc.

The rehearsal playback RH2 is also repeated until there is an operation of the jog dial 27 or an enter operation, i.e. the time when a time over is detected in step S118 is the time when playback of time T taken as the rehearsal playback RH2 of FIG. 14 has finished. At this time step S116 is returned to, an the optical head 3 is made to access the section delete end address Ade and the playback operation is made to start. In step S117, the timer that counts the time T as an internal timer is set and the count is made to start, i.e. the rehearsal playback RH2 is re-started.

When the user rotates the jog dial 27 in the + direction during execution of the rehearsal playback RH2, the process proceeds from step S119 to S122 and the system controller 11 updates the value of the section delete end address Ade stored in the RAM 11*a*. Namely, the address amount JG is calculated in response to the extent of the operation of rotating the jog dial 27 in the + direction. This is then added to the stored value for the section delete end address Ade so as to give a new section delete end address Ade. Step S116 and S117 are then returned to and rehearsal playback is made to start taking the new section delete end address Ade as a reference. Namely, as described in FIG. 12C, the designation pointer of the end point designation operation DE is changed in the forward direction with respect to time and rehearsal playback is carried out taking this value as a reference.

When the user rotates the jog dial 27 in the − direction during execution of the rehearsal playback RH2, the process proceeds from step S120 to S123 and the system controller 11 updates the value of the section delete end address Ade stored in the RAM 11*a*. Namely, the address amount JG is calculated in response to the extent of the operation of rotating the jog dial 27 in the − direction. The address amount JG is then subtracted from the stored value for the section delete end address Ade so as to give a new section delete end address Ade. Step S116 and S117 are then returned to and rehearsal playback is made to start taking the new section delete end address Ade as a reference. Namely, as described in FIG. 12B, the designation pointer of the start point designation operation DS is changed in the reverse direction with respect to time and rehearsal playback is carried out taking this value as a reference.

When the user listens to the rehearsal playback sound and determines that the point designated for the end point designation operation DE is appropriate, the user carries out an enter operation. At this time, the process for the system controller 11 proceeds from step S121 to step S124. The system controller 11 then updates the U-TOC data for from the section delete start address Ads to the section delete end address Ade to be deleted based on the section delete start address Ads and the section delete end address Ade stored at the RAM 11*a* at this time, i.e. based on the section delete start address Ads and the section delete end address Ade decided as input. This is the updating process described in FIG. 11.

This updating process is first carried out with respect to the U-TOC data stored in the buffer memory 13. This data is then transferred as recording data and updating of the U-TOC area of the disc 1 is carried out.

When the updating process of step S124 ends, the section delete is complete and section delete mode ends.

The updating process in step S124 is only carried out with respect to the U-TOC data stored in the buffer memory 13. It is then preferable for updating of the U-TOC on the disc 1 to be carried out after a prescribed amount of time (for example, the time for the power off operation or the time for the disc eject operation).

In the above operation example 1, as shown in FIG. 14, rehearsal playback (RH1, RH2) of time T is carried out from the addresses of the section delete start address Ads and the section delete end address Ade designated and inputted in the start point designation operation DS and the end point designation operation DE (or changed using operations of the jog dial 27).

(b. Section delete operation example 2).

Figure 17:
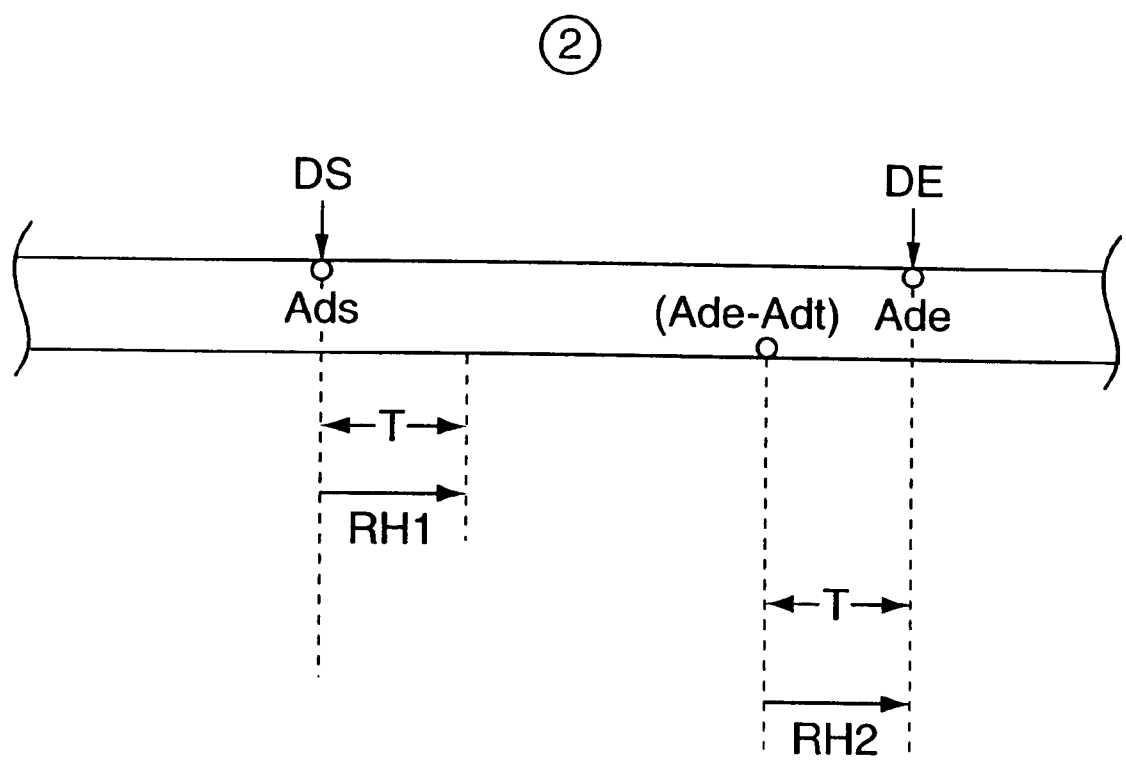
FIG. 17 shows a second embodiment of a rehearsal operation during section delete designation.
Figure 18:
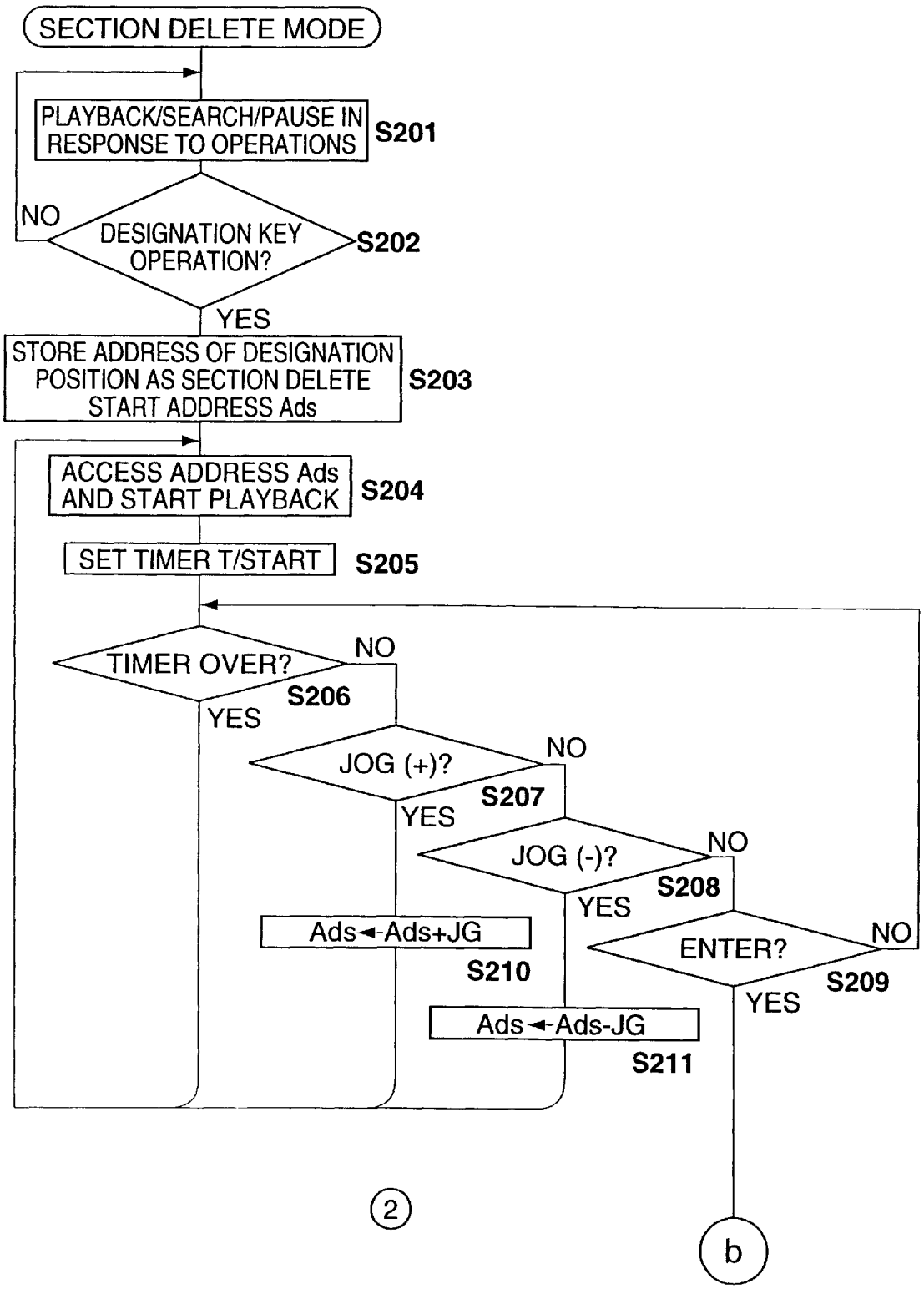
FIG. 18 shows a flowchart of the rehearsal operation during section delete designation of the second embodiment.
Figure 19:
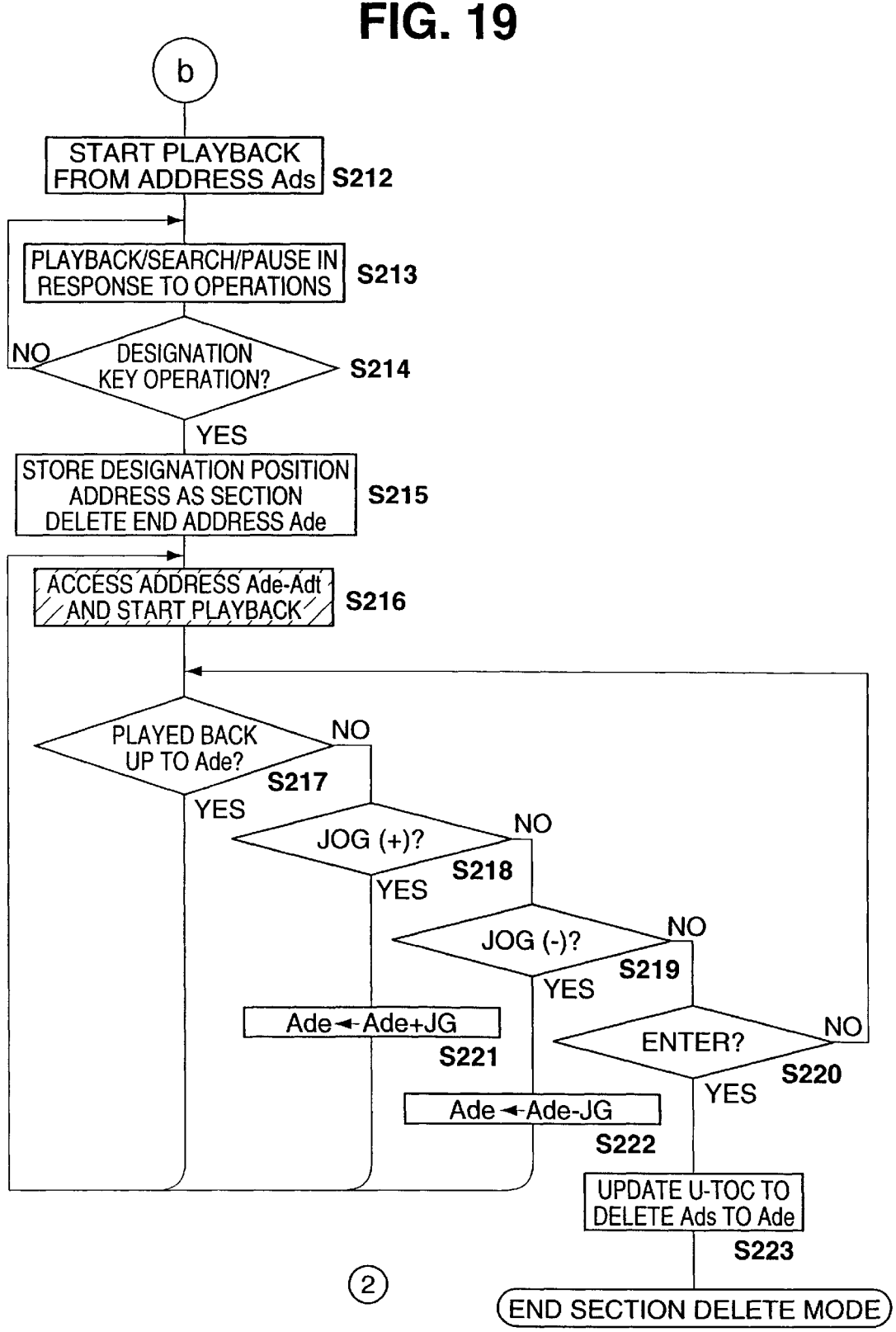
FIG. 19 shows a flowchart of the rehearsal operation during section delete designation of the second embodiment.

Next, the section delete operation example 2 is described using the image of FIG. 17 and the flowcharts FIG. 18 and FIG. 19.

In operation example 2, as shown in FIG. 17, the rehearsal playback RH1 of T seconds is carried out from a section delete start address Ads designated and inputted by the start point designation operation DS (or changed by operations of the jog dial 27). On the other hand, a rehearsal playback RH2 of T seconds is carried out taking the section delete end address Ade designated by the end point designation operation DE (or changed using operations of the jog dial 27) as the start address.

When the user adopts the section delete mode using an operation of the edit key 29, the system controller 11 starts the process of FIG. 18. In the process of FIG. 18, setting of the section delete start address Ads in response to the start point designation operation DS and rehearsal playing back for T seconds from this address, and changing of the section delete start address Ads in response to operations of the jog dial 27 carried out by the user as necessary and rehearsal playback for T seconds from this address is carried out and the section delete start address Ads is decided in response to the enter operation.

These processes are executed in step S201 to S211 but as this is the same as for the process of steps S101 to S111 shown in FIG. 15 as the process for the operation example in 1 a description is omitted.

If the section delete start address Ads is decided by the enter operation of step S209, the process for the system controller 11 proceeds to step S212 of FIG. 19. The playback operation is then made to start from the section delete start address Ads decided at this time as an operation for the user to search for a point to carry out an end point designation operation DE.

The user then executes search operations/pause operations/playback operations etc. as necessary while listening to the playback sound and the desired point for ending execution of the section delete is searched for. The system controller 11 then executes searches (access, fast forward, rewind)/playback pauses/playback operations etc. in step S213 in response to these user operations.

The user then searches for the desired point so as to press the designation key 39 in line with the timing of the playback output for the audio of the point taken as the point for ending execution of the section delete, i.e. the end point designation operation DE is carried out. The process of the system controller 11 then proceeds from step S214 to step S215 and the address of the pointer designated in the end point designation operation DE is stored in an internal RAM 11a as the section delete end address Ade.

Next, in step S216, the address amount Adt corresponding to the time T that is, for example, 4 to 10 seconds, is subtracted from the section delete end address Ade and the address (Ade−Adt) for where audio data T seconds previous to the audio data at the section delete end address Ade is recorded is obtained. The optical head 3 is then made to access this address (Ade−Adt) and a playback operation is started from this address (Ade−Adt).

The operation for the rehearsal playback RH2 occurring in FIG. 17 is then started using the process for this step S216. The operation for the rehearsal playback RH2 is an operation corresponding to the example described in FIG. 13A. When parts are divided, the address of the T second portion return point for the audio playback from the section delete end address Ade cannot simply be obtained using the calculation (Ade−Adt). The necessity for a calculation for divided parts is as described above.

In step S217, rehearsal playback for one time ends, i.e. the rehearsal playback is seen to be different to the section delete end address Ade. Further, in step S218, S219 and S220, operations of the jog dial 27 and enter operations using the yes key 30 etc. are monitored.

The rehearsal playback RH2 is also repeated until there is a jog dial operation or an enter operation, i.e. when the end of rehearsal playback for one time is detected in step S217, step S216 is returned to. The optical head 3 is then again made to access the address (Ade−Adt) and a playback operation is made to start from this address (Ade−Adt), i.e. a rehearsal playback RH2 of T seconds again starts.

When the user rotates the jog dial 27 in the + direction during execution of the rehearsal playback RH2, the process proceeds from step S218 to S221 and the system controller 11 updates the value of the section delete end address Ade stored in the RAM 11a, i.e. the address amount JG is calculated in response to the extent of the rotation operation of the jog dial 27 in the + direction and added to the stored value of the section delete end address Ade so as to give a new section delete end address Ade. Step S216 is then returned to and rehearsal playback is made to start from address (Ade−Adt) taking the new section delete end address Ade as a reference, i.e. as in the case described in FIG. 13C, the designation point in the end point designation operation DE is changed in a forward direction with respect to time and rehearsal playback is carried out taking this position as a reference.

When the user rotates the jog dial 27 in the − direction during execution of the rehearsal playback RH2, the process proceeds from step S219 to S222 and the system controller 11 updates the value of the section delete end address Ade stored in the RAM 11a, i.e. the address amount JG is calculated in response to the extent of the rotation operation of the jog dial 27 in the − direction and subtracted from the stored value of the section delete end address Ade so as to give a new section delete end address Ade. Step S216 is then returned to and rehearsal playback is made to start from address (Ade−Adt) taking the new section delete end address Ade as a reference, i.e. as in the case described in FIG. 13B, the designation point in the end point designation operation DE is changed in a reverse direction with respect to time and rehearsal playback is carried out taking this position as a reference.

When the user listens to the rehearsal playback sound and determines that the point designated for the end point designation operation DE is appropriate, the user carries out an enter operation. At this time, the process for the system controller 11 proceeds from step S220 to step S223. The system controller 11 then updates the U-TOC data for from the section delete start address Ads to the section delete end address Ade to be deleted based on the section delete start address Ads and the section delete end address Ade stored at the RAM 11a at this time, i.e. based on the section delete start address Ads and the section delete end address Ade decided as input. The updating process is first carried out with respect to the U-TOC data stored in the buffer memory 13. This U-TOC data is then transferred as recording data and updating of the U-TOC area of disc 1 is carried out. When the updating processing of step S223 has finished, the section delete is complete and section delete mode ends.

In the above process, as shown in FIG. 17, section delete is executed with an operating example 2 that takes the beginning and end portions of the section to be deleted as rehearsal playback targets.

(c. Section delete operation example 3).

Figure 20:
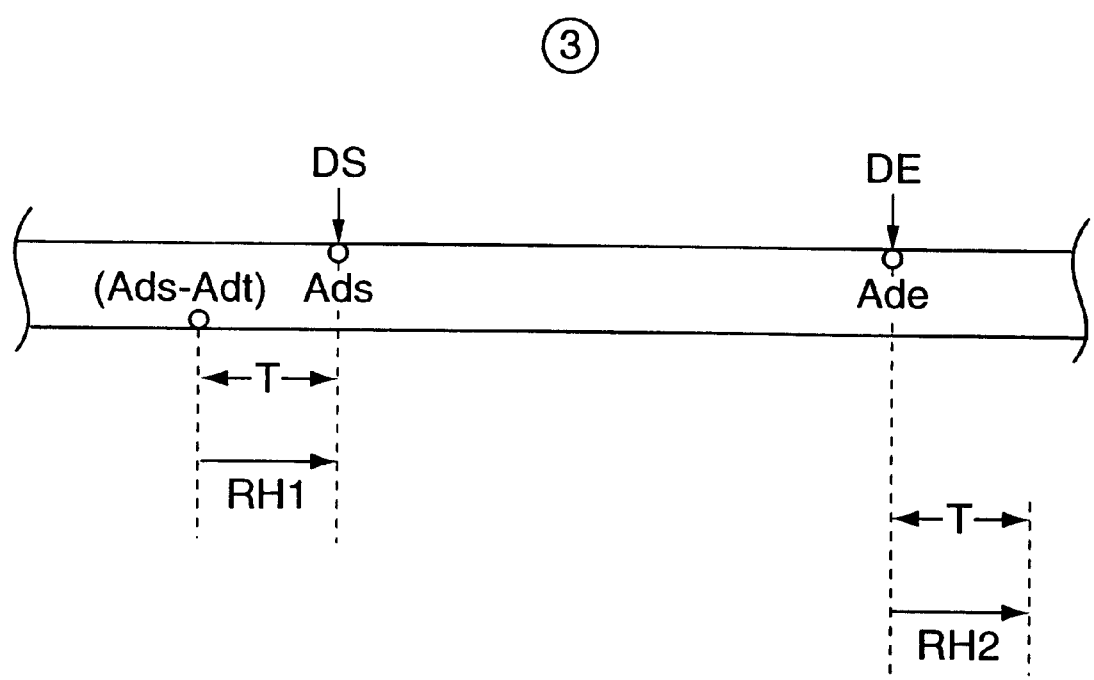
FIG. 20 shows a third embodiment of a rehearsal operation during section delete designation.
Figure 21:
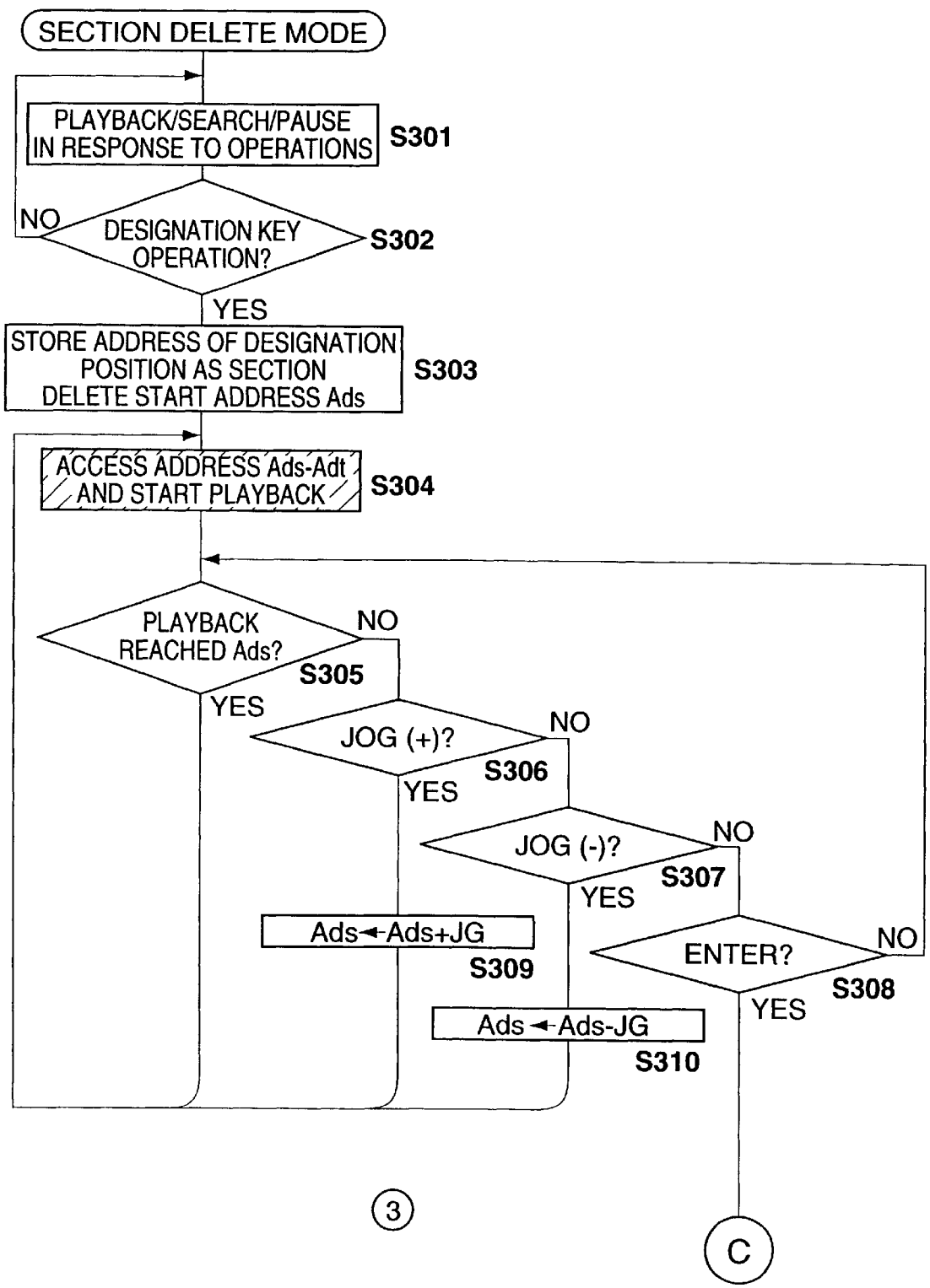
FIG. 21 shows a flowchart of the rehearsal operation during section delete designation of the third embodiment.
Figure 22:
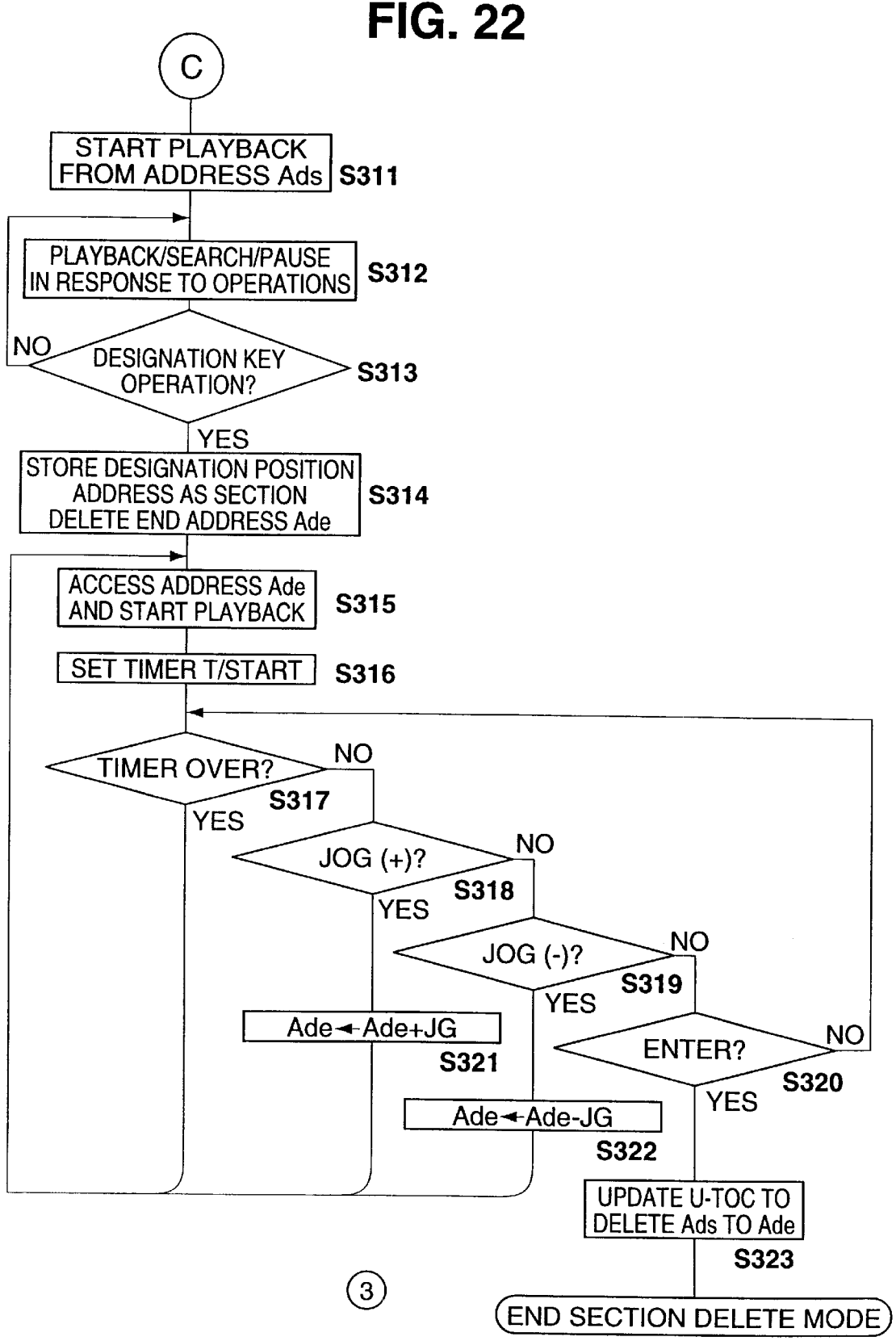
FIG. 22 shows a flowchart of the rehearsal operation during section delete designation of the third embodiment.

Next, the section delete operation example 3 is described using the image of FIG. 20 and the flowcharts FIG. 21 and FIG. 22.

In operation example 3, as shown in FIG. 20, the rehearsal playback RH1 of T seconds taking the following address as an end point is carried out from a section delete start address Ads designated and inputted by the start point designation operation DS (or changed by operations of the jog dial 27). On the other hand, a rehearsal playback RH2 of T seconds is carried out taking the section delete end address Ade designated by the end point designation operation DE (or changed using operations of the jog dial 27) as the start address.

When the user adopts the section delete mode using an operation of the edit key 29, the system controller 11 starts the process of FIG. 21.

The user executes playback operations/search operations/pause operations etc. for performing the start point designation operation DS as necessary and searches for the desired point to start executing the section delete from. The system controller 11 then executes operations such as playback/search (access, fast forward, rewind)/playback pause in step S301 in accordance with user operations.

The user then searches for the desired point so as to press the section delete position designation key 39 in line with the timing of the playback output for the audio of the point taken as the point for starting execution of the section delete, i.e. the start point designation operation DS is carried out. The process of the system controller 11 then proceeds from step S302 to step S303 and the address of the pointer designated in the start point designation operation DS is stored in an internal RAM 11a as the section delete start address Ads.

Next, in step S304, the address amount Adt corresponding to the time T that is, for example, 4 to 10 seconds, is subtracted from the section delete start address Ads and the address (Ads–Adt) for where audio data T seconds previous to the audio data at the section delete start address Ads is recorded is obtained. The optical head 3 is then made to access this address (Ads–Adt) and a playback operation is started from this address (Ads–Adt).

The operation for the rehearsal playback RH1 occurring in FIG. 20 is then started using the process for this step S304. The operation for the rehearsal playback RH1 is an operation corresponding to the example described in FIG. 13A. When parts are divided, the address of the T second portion return point for the audio playback from the section delete start address Ads cannot simply be obtained using the calculation (Ads–Adt). The necessity for a calculation for divided parts is as described above.

In step S305, rehearsal playback for one time ends, i.e. the rehearsal playback is seen to be different to the section delete start address Ads. Further, in step S306, S307 and S308, operations of the jog dial 27 and enter operations using the yes key 30 etc. are monitored.

The rehearsal playback RH1 is repeated until there is a jog dial 27 operation or an enter operation, i.e. when the end of rehearsal playback for one time is detected in step S305, step S304 is returned to. The optical head 3 is then again made to access the address (Ads–Adt) and a playback operation is made to start from this address (Ads–Adt), i.e. a rehearsal playback RH1 of T seconds again starts.

When the user rotates the jog dial 27 in the + direction during execution of the rehearsal playback RH1, the process proceeds from step S305 to S309 and the system controller 11 updates the value of the section delete start address Ads stored in the RAM 11a, i.e. the address amount JG is calculated in response to the extent of the rotation operation of the jog dial 27 in the + direction and added to the stored value of the section delete start address Ads so as to give a new section delete start address Ads. Step S306 is then returned to and rehearsal playback is made to start from address (Ads–Adt) taking the new section delete end address Ade as a reference, i.e. as in the case described in FIG. 13, the designation point in the end point designation operation DE is changed in a forward direction with respect to time and rehearsal playback is carried out taking this position as a reference.

When the user rotates the jog dial 27 in the – direction during execution of the rehearsal playback RH1, the process proceeds from step S307 to S310 and the system controller 11 updates the value of the section delete start address Ads stored in the RAM 11a, i.e. the address amount JG is calculated in response to the extent of the rotation operation of the jog dial 27 in the – direction and subtracted from the stored value of the section delete start address Ads so as to give a new section delete end address Ads. Step S304 is then returned to and rehearsal playback is made to start from address (Ads–Adt) taking the new section delete start address Ads as a reference, i.e. as in the case described in FIG. 13B, the designation point in the start point designation operation DS is changed in a reverse direction with respect to time and rehearsal playback is carried out taking this position as a reference.

When the user listens to the rehearsal playback sound and determines that the point designated for the start point designation operation DS is appropriate, the user carries out an enter operation. At this time, the process for the system controller 11 proceeds from step S308 to step S311 of FIG. 22. A playback operation is then made to start from the section delete start address Ads decided at this time as the operation for the user to search for the point for carrying out the end point designation operation DE.

Thereafter, in the process of FIG. 22, setting of the section delete end address Ade in response to the end point designation operation DE and rehearsal playing back for T seconds from this address, and changing of the section delete end address Ade in response to operations of the jog dial 27 carried out by the user as necessary and rehearsal playback for T seconds from this address is carried out as necessary and the section delete end address Ade is decided in response to the enter operation.

U-TOC data updating for the section to be deleted defined based on the inputted and decided section delete start address Ads and section delete end address Ade is then carried out and the section delete ends.

Figure 16:
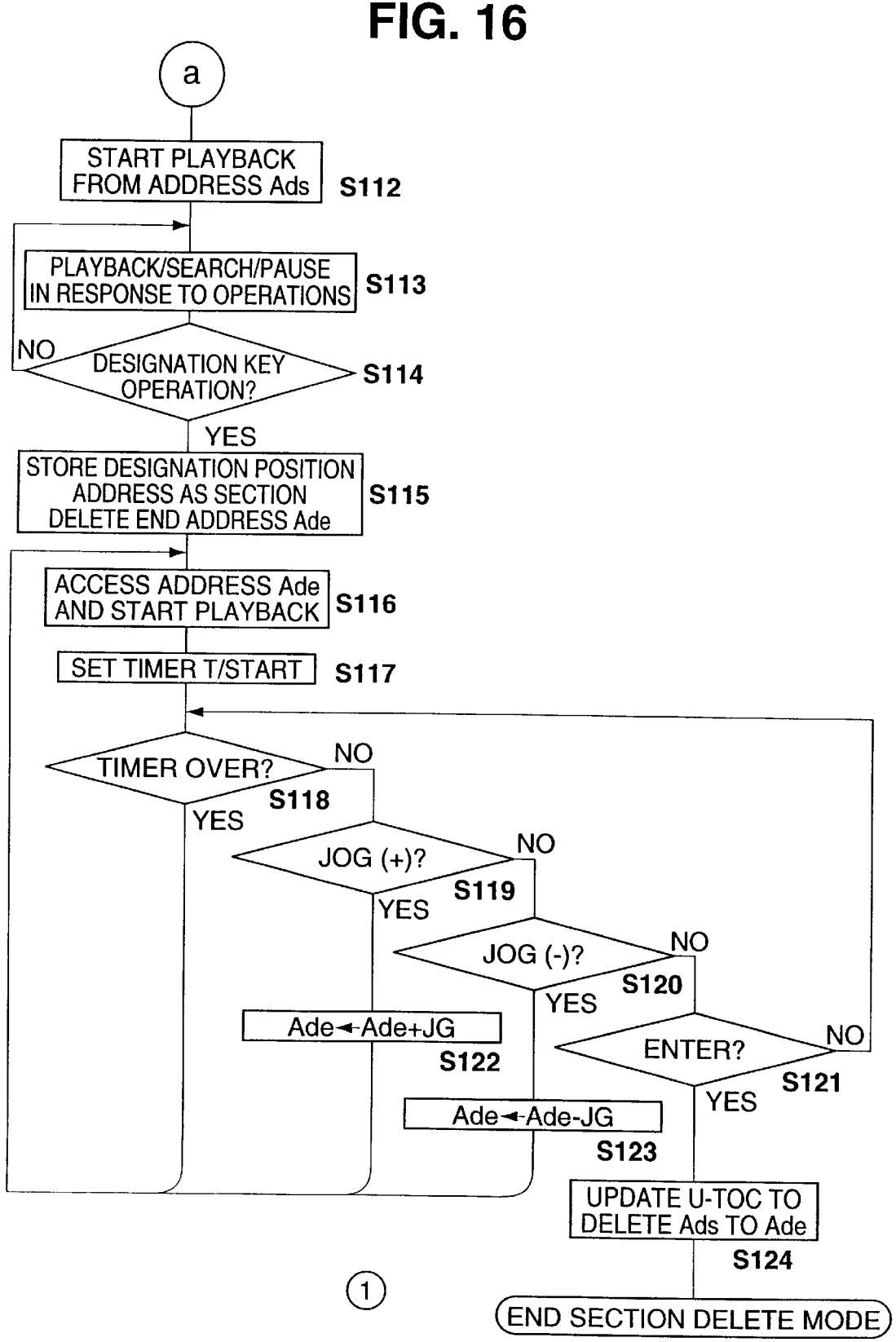
FIG. 16 shows a flowchart of the rehearsal operation during section delete designation of the first embodiment.

There processes are executed as steps S311 to S323 but a description of these processes is omitted as these are the same as the processes for steps S112 to S124 shown in FIG. 16 for the process for the operation example 1.

In the above process, as shown in FIG. 20, the section delete is executed as the third operation example taking the T second portion previous to the section to be deleted and the T section portion following the section to be deleted as the target of rehearsal playback.

(d. Section delete operation example 4).

Figure 23:
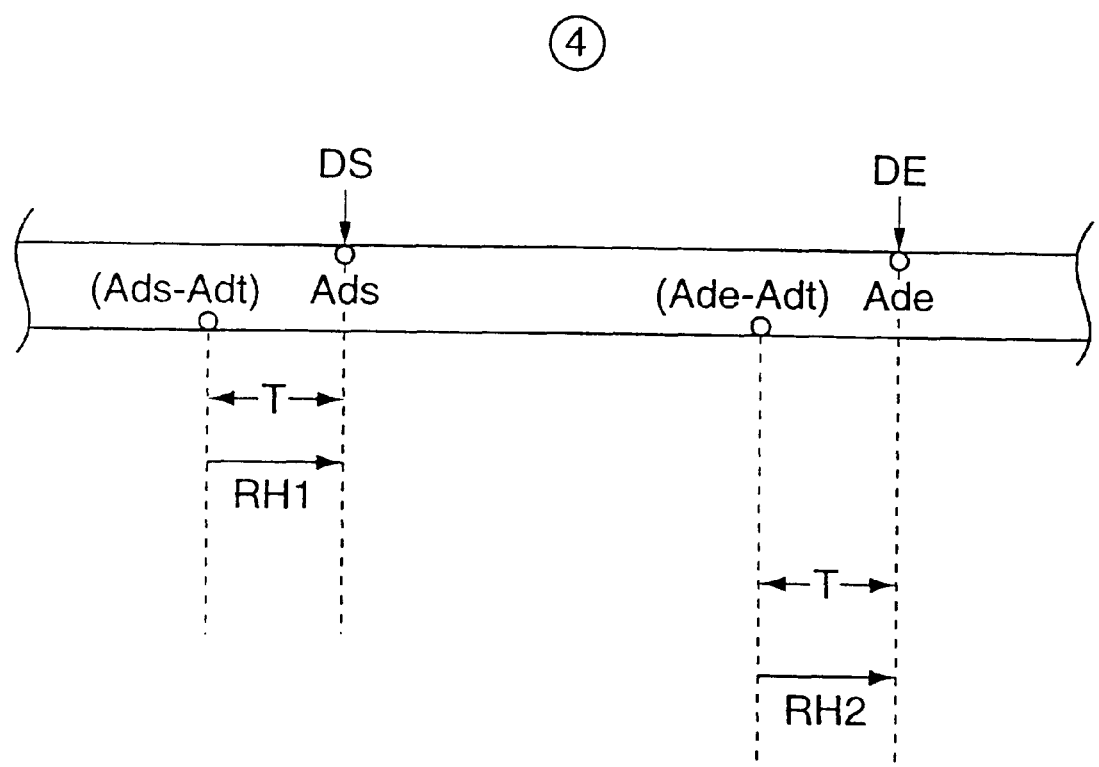
FIG. 23 shows a fourth embodiment of a rehearsal operation during section delete designation.
Figure 24:
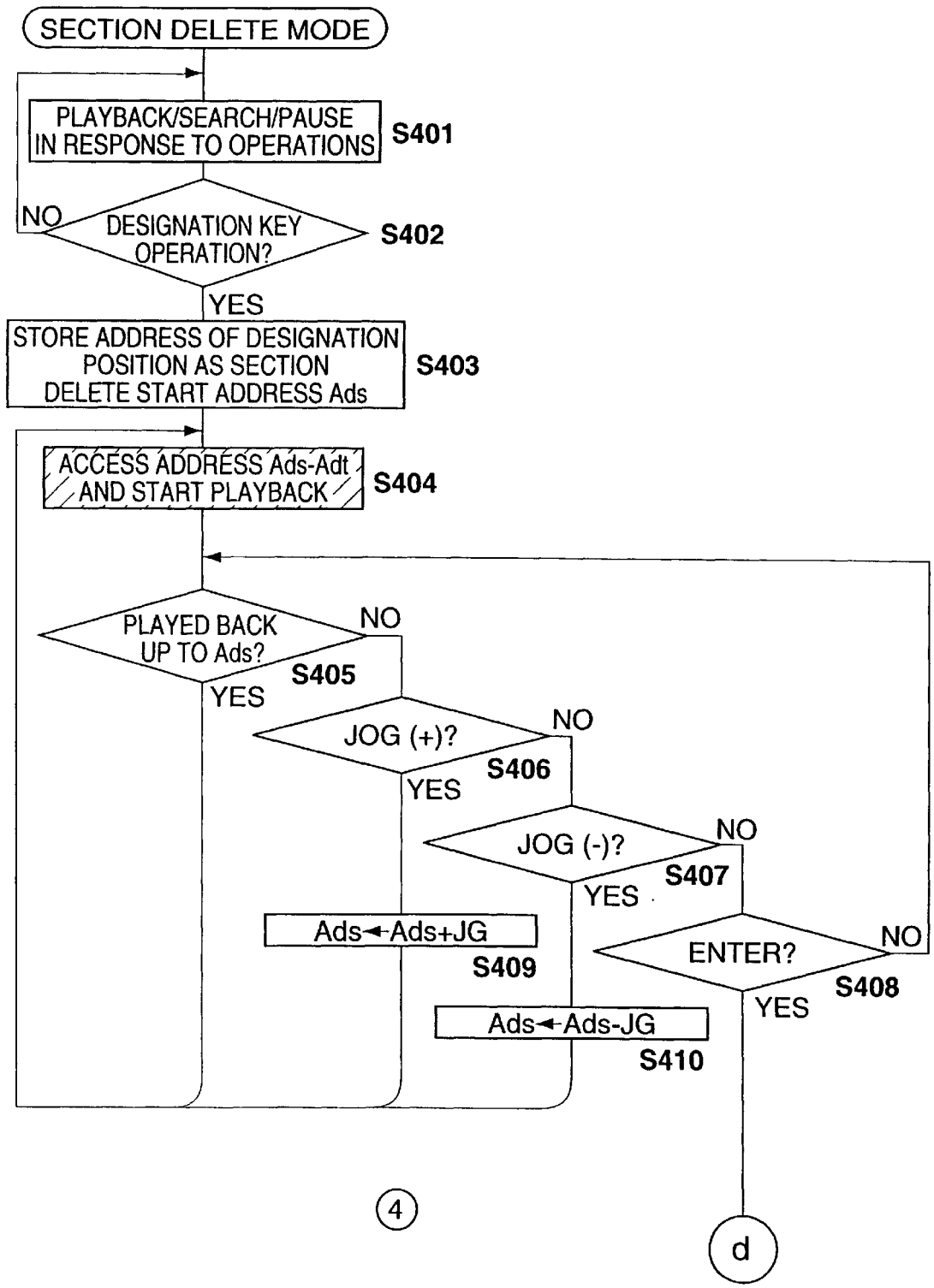
FIG. 24 shows a flowchart of the rehearsal operation during section delete designation of the fourth embodiment.
Figure 25:
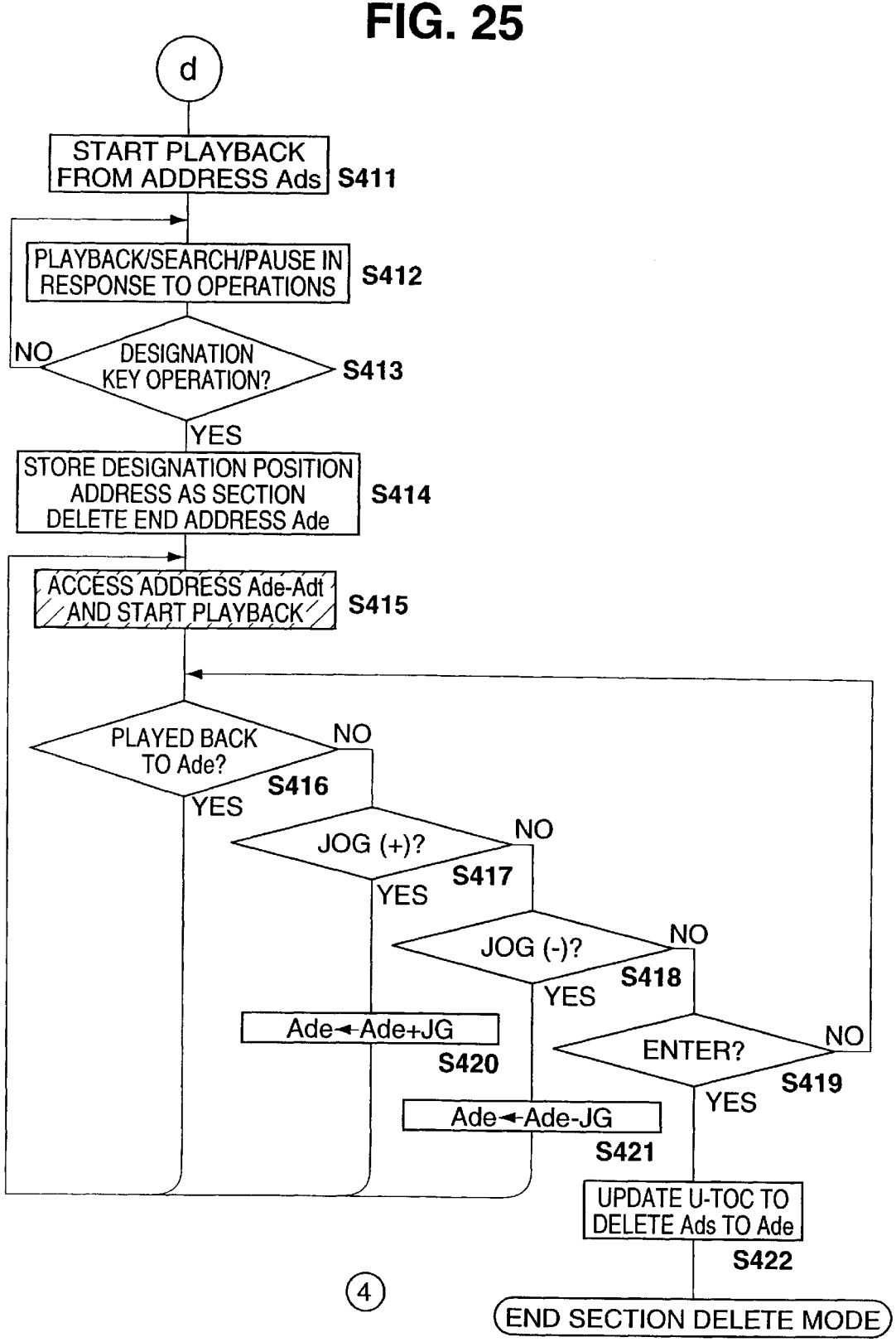
FIG. 25 shows a flowchart of the rehearsal operation during section delete designation of the fourth embodiment.

Next, the section delete operation example 4 is described using the image of FIG. 23 and the flowcharts FIG. 24 and FIG. 25.

In operation example 4, as shown in FIG. 23, the rehearsal playback RH1 of T seconds taking the following address as an end point is carried out from a section delete start address Ads designated and inputted by the start point designation operation DS (or changed by operations of the jog dial 27). Further, a rehearsal playback RH2 of T seconds is carried out taking the section delete end address Ade designated and inputted by the end point designation operation DE (or changed using operations of the jog dial 27) as the end address.

When the user adopts the section delete mode using an operation of the edit key 29, the system controller 11 starts the process of FIG. 24. In the process of FIG. 24, setting of the section delete start address Ads in response to the start point designation operation DS and rehearsal playing back for T seconds from this address, and changing of the section delete start address Ads in response to operations of the jog dial 27 carried out by the user as necessary and rehearsal playback for T seconds from this address is carried out and the section delete start address Ads is decided in response to the enter operation.

These processes are executed in step S401 to S410 but as this is the same as for the process of steps S301 to S310 shown in FIG. 21 as the process for the operation example 3.

If the section delete start address Ads is decided by the enter operation of step S408, the process for the system controller 11 proceeds to step S411 of FIG. 25. The playback operation is then made to start from the section delete start address Ads decided at this time as an operation for the user to search for a point to carry out an end point designation operation DE.

Thereafter, in the process of FIG. 25, setting of the section delete end address Ade in response to the end point designation operation DE and rehearsal playing back for T seconds from this address, and changing of the section delete end address Ade in response to operations of the jog dial 27 carried out by the user as necessary and rehearsal playback for T seconds from this address is carried out as necessary and the section delete end address Ade is decided in response to the enter operation.

U-TOC data updating for the section to be deleted defined based on the inputted and decided section delete start address Ads and section delete end address Ade is then carried out and the section delete ends.

There processes are executed as steps S411 to S422 but a description of these processes is omitted as these are the same as the processes for steps S212 to S223 shown in FIG. 19 for the process for the operation example 2.

In the above process of FIG. 24 and FIG. 25, as shown in FIG. 23, the section delete is executed as the fourth operation example taking the T second portion directly before the section to be deleted and the T section portion following the section to be deleted as the target of rehearsal playback.

(e. Section delete operation example 5).

Figure 26:
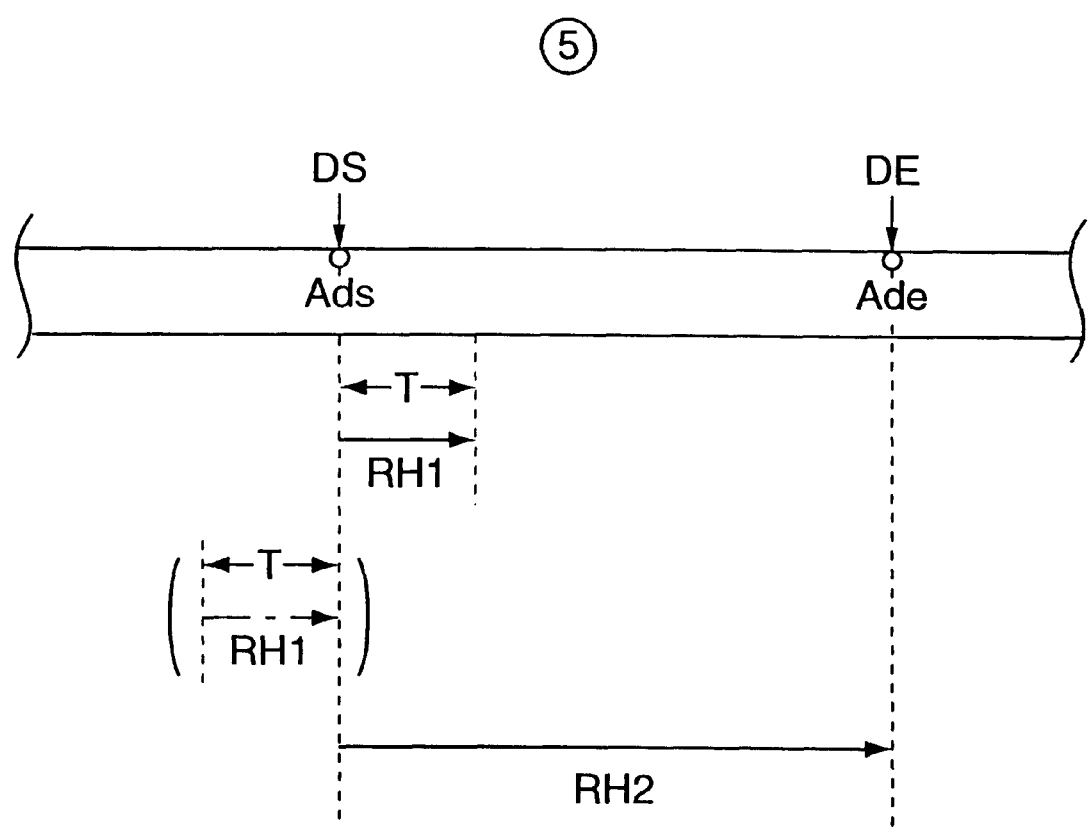
FIG. 26 shows a fifth embodiment of a rehearsal operation during section delete designation.
Figure 27:
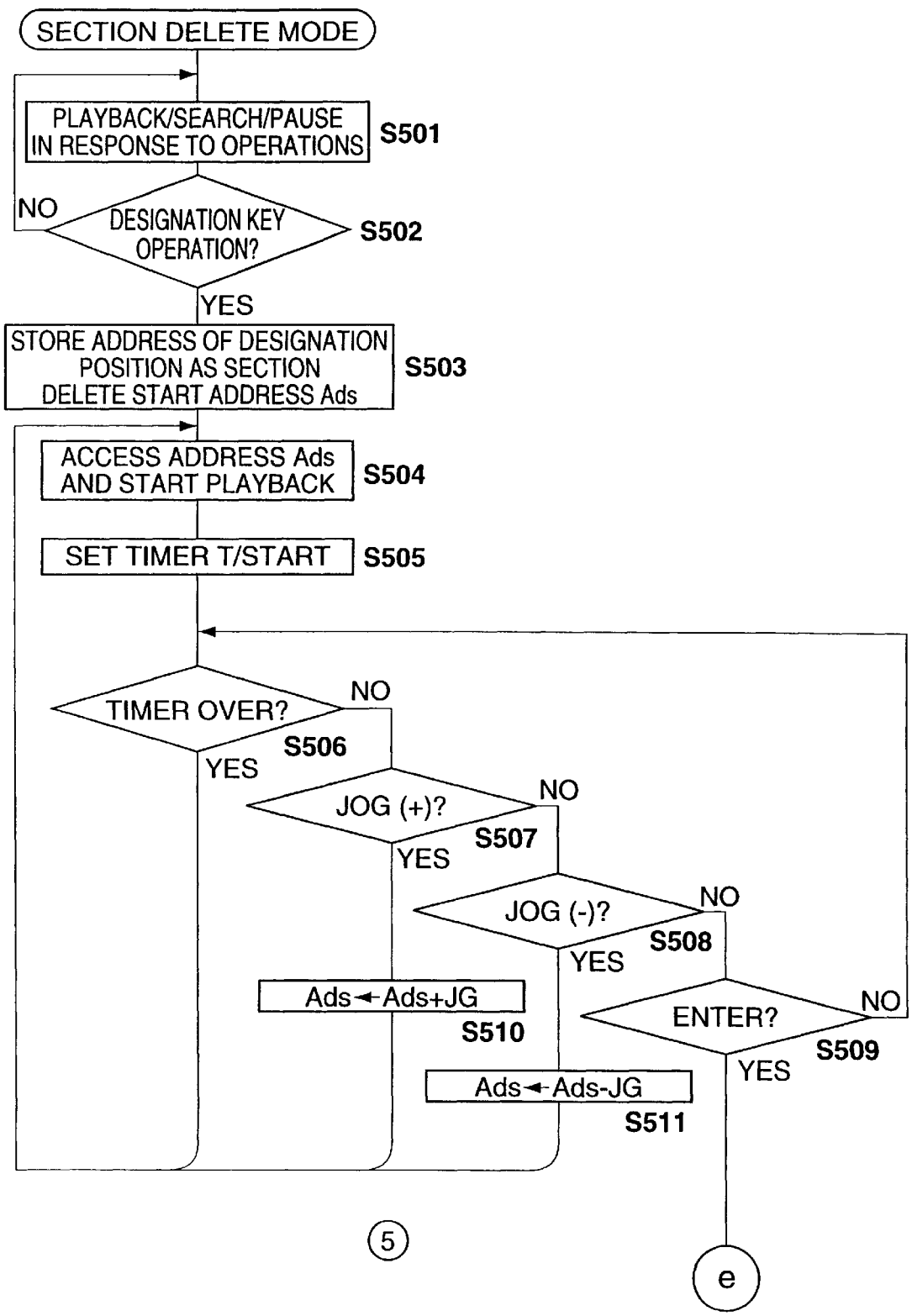
FIG. 27 shows a flowchart of the rehearsal operation during section delete designation of the fifth embodiment.
Figure 28:
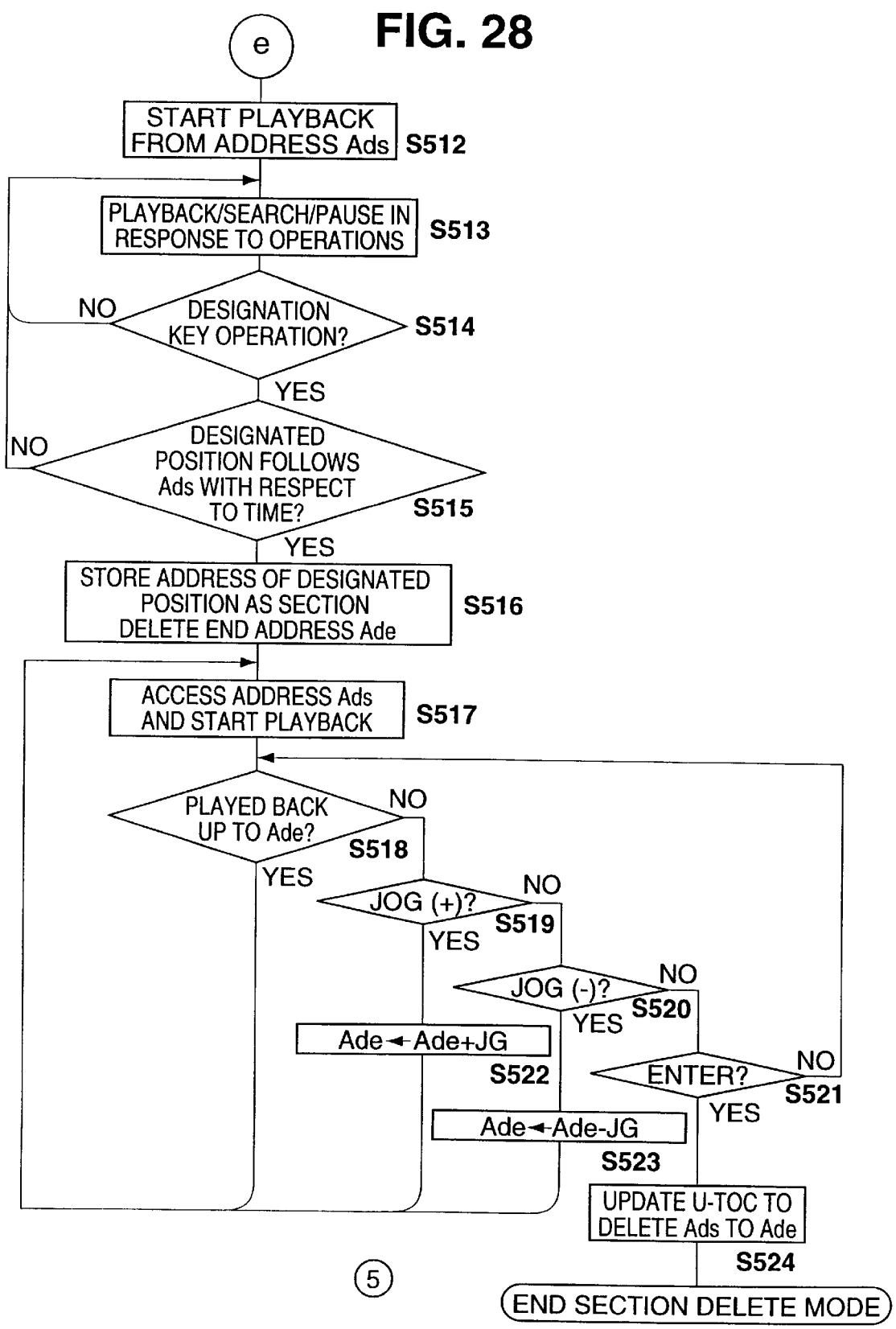
FIG. 28 shows a flowchart of the rehearsal operation during section delete designation of the fifth embodiment.

Next, the section delete operation example 5 is described using the image of FIG. 26 and the flowcharts FIG. 27 and FIG. 28.

In operation example 5, as shown in FIG. 26, the rehearsal playback RH1 of T seconds is carried out from a section delete start address Ads designated and inputted by the start point designation operation DS (or changed by operations of the jog dial 27). On the other hand, with the section delete end address Ade designated and inputted in the end point designation operation DE (or changed by operations of the jog dial 27), a rehearsal playback RH2 is carried out from the section delete start address Ads decided at this time up to the section delete end address Ade inputted at this time.

When the user adopts the section delete mode using an operation of the edit key 29, the system controller 11 starts the process of FIG. 27. In the process of FIG. 27, setting of the section delete start address Ads in response to the start point designation operation DS and rehearsal playing back for T seconds from this address, and changing of the section delete start address Ads in response to operations of the jog dial 27 carried out by the user as necessary and rehearsal playback for T seconds from this address is carried out and the section delete start address Ads is decided in response to the enter operation.

These processes are executed in step S501 to S511 but as this is the same as for the process of steps S101 to S111 shown in FIG. 16 as the process for the operation example 1, a description is omitted.

As shown within the parenthesis of FIG. 26, a modification of the operation example 5 can be considered where a T second rehearsal playback RH1 is carried out starting from the section delete start address Ads designated and inputted using the start point designation operation DS (or changes due to operations of the jog dial 27).

If the section delete start address Ads is decided by the enter operation of step S509, the process for the system controller 11 proceeds to step S512 of FIG. 28. The playback operation is then made to start from the section delete start address Ads decided at this time as an operation for the user to search for a point to carry out an end point designation operation DE.

The user searches for the desired point to be taken as the end point for executing the section delete while listening to the audio playback and while executing search operations/pause operations/playback operations etc. as necessary. The system controller 11 then executes operations such as playback/search (access, fast forward, rewind)/playback pause in step S513 in accordance with user operations.

The user then searches for the desired point so as to press the section delete position designation key 39 in line with the timing of the playback output for the audio of the point taken as the point for ending execution of the section delete, i.e. the end point designation operation DE is carried out. The process of the system controller 11 then proceeds from step S514 to step S515 and a determination is made as to whether or not the point designated by the end point designation operation DE is a point corresponding to a point in time later than the section delete start address Ads that has been decided upon when viewed from the playback time axis. If this does not follow with respect to time, this end point designation operation DE is ignored and step S513 is returned to. Namely, when an address for a point previous with respect to time to the point decided by the user as the section delete start address Ads, this operation is ignored and a correct end point designation operation DE for the section delete is waited for.

This process was not added to the aforementioned operation examples 1 to 4 but the same process as in step S515 can of course be added to operating examples 1 to 4. The absence of the same process as this step S515 in operation examples 1 to 4 in other words means that the user can designate the section to be deleted without considering the order of the start point and the end point, i.e. the section delete process corresponding to an operation where the end point is first designated and the start point is then designated is also possible. Namely, in the aforementioned operation examples 1 to 4, this kind of irregular procedure is also allowable.

If the end point designation operation DE is carried out for a point corresponding to a point in time following the section delete start address Ads with respect to time, the process proceeds to step S516. The address of the point designated in this end point designation operation DE is then stored in the internal RAM 11a as the section delete end address Ade.

Next, in step S517, the optical head 3 is made to access the section delete start address Ads and a playback operation starts from this address Ads.

The operation taken as the rehearsal playback RH2 in FIG. 26 is then made to start using the process of step S517, i.e. the rehearsal playback RH2 in this case is carried out for the sections from the decided section delete start address Ads to the inputted section delete end address Ade, i.e. for all of the sections to be erased.

In step S518, rehearsal playback for one time ends, i.e. the rehearsal playback is seen to be different to the section delete end address Ade. Further, in step S519, S520 and S521, operations of the jog dial 27 and enter operations using the yes key 30 etc. are monitored.

The rehearsal playback RH2 is repeated until there is a jog dial 27 operation or an enter operation, i.e. when the end of rehearsal playback for one time is detected in step S518, step S517 is returned to. The optical head 3 is then again made to access the section delete start address Ads and the playback operation is again started from this address Ads to the section delete end address Ade.

When the user rotates the jog dial 27 in the + or − direction during execution of the rehearsal playback RH2, the process proceeds from step S519 to S522 or from step S520 to S523 and the value for the section delete end address Ade stored in the RAM 11a is updated in response to operations in the same way as the case for each of the operation examples.

Step S517 is then returned to and the optical head 3 is made to access the section delete start address Ads again so that the playback operation is again made to start from the address Ads to the section delete end address Ade, i.e. when the section delete end address Ade is changed using the operation of the jog dial 27, the playback end point is changed with respect to the rehearsal playback RH2.

When the user listens to the rehearsal playback audio and determines that the point designated for the end point designation operation DE is appropriate, the user carries out an enter operation. At this time, the process for the system controller 11 proceeds from step S521 to step S524, and then updates the U-TOC data for from the defined section to be deleted based on the section delete start address Ads and the section delete end address Ade stored at the RAM 11a at this time. The updating process is first carried out with respect to the U-TOC data stored in the buffer memory 13. This U-TOC data is then transferred as recording data and updating of the U-TOC area of disc 1 is carried out. When the updating processing of step S524 has finished, the section delete is complete and section delete mode ends.

In the above process, as shown in FIG. 26, at the time of designating and inputting the end point of the section to be deleted, section delete is executed using the operation example 5 taking all of the sections to be deleted as the target of the rehearsal playback.

(f. Section delete operation example 6).

Figure 29:
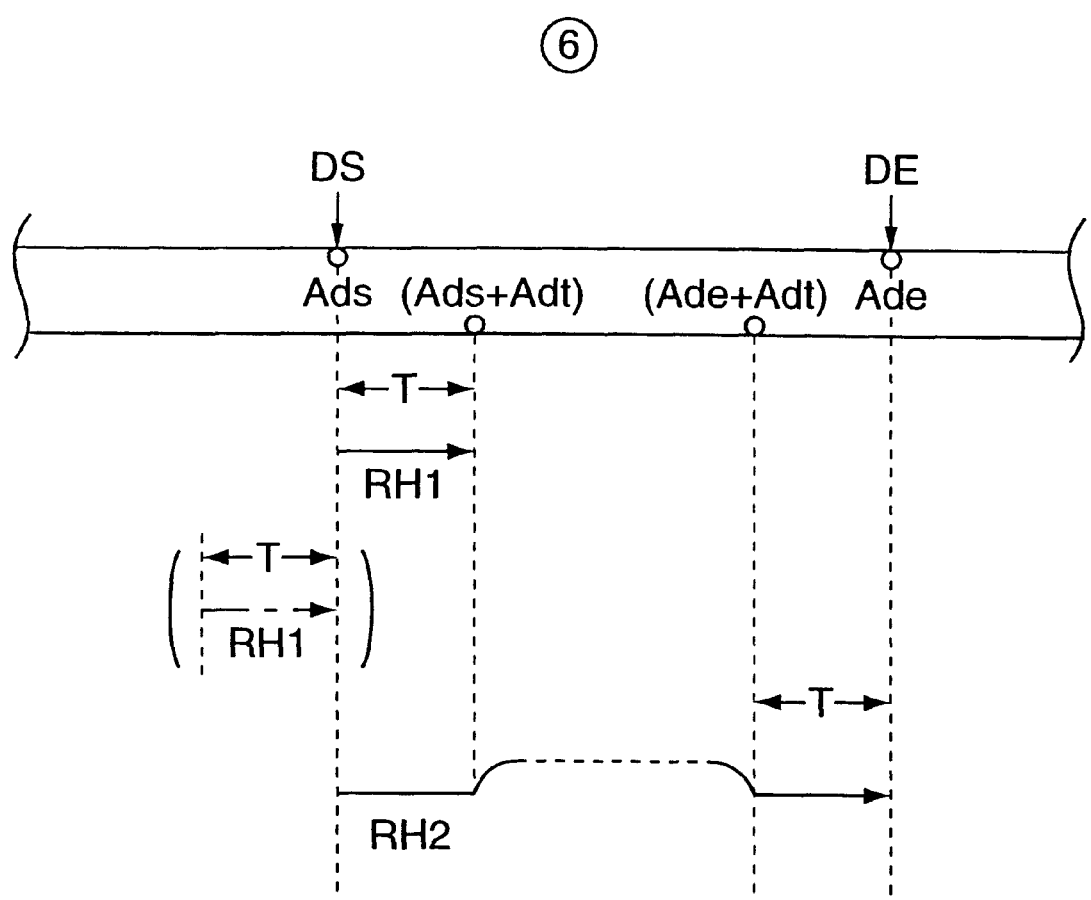
FIG. 29 shows a sixth embodiment of a rehearsal operation during section delete designation.
Figure 30:
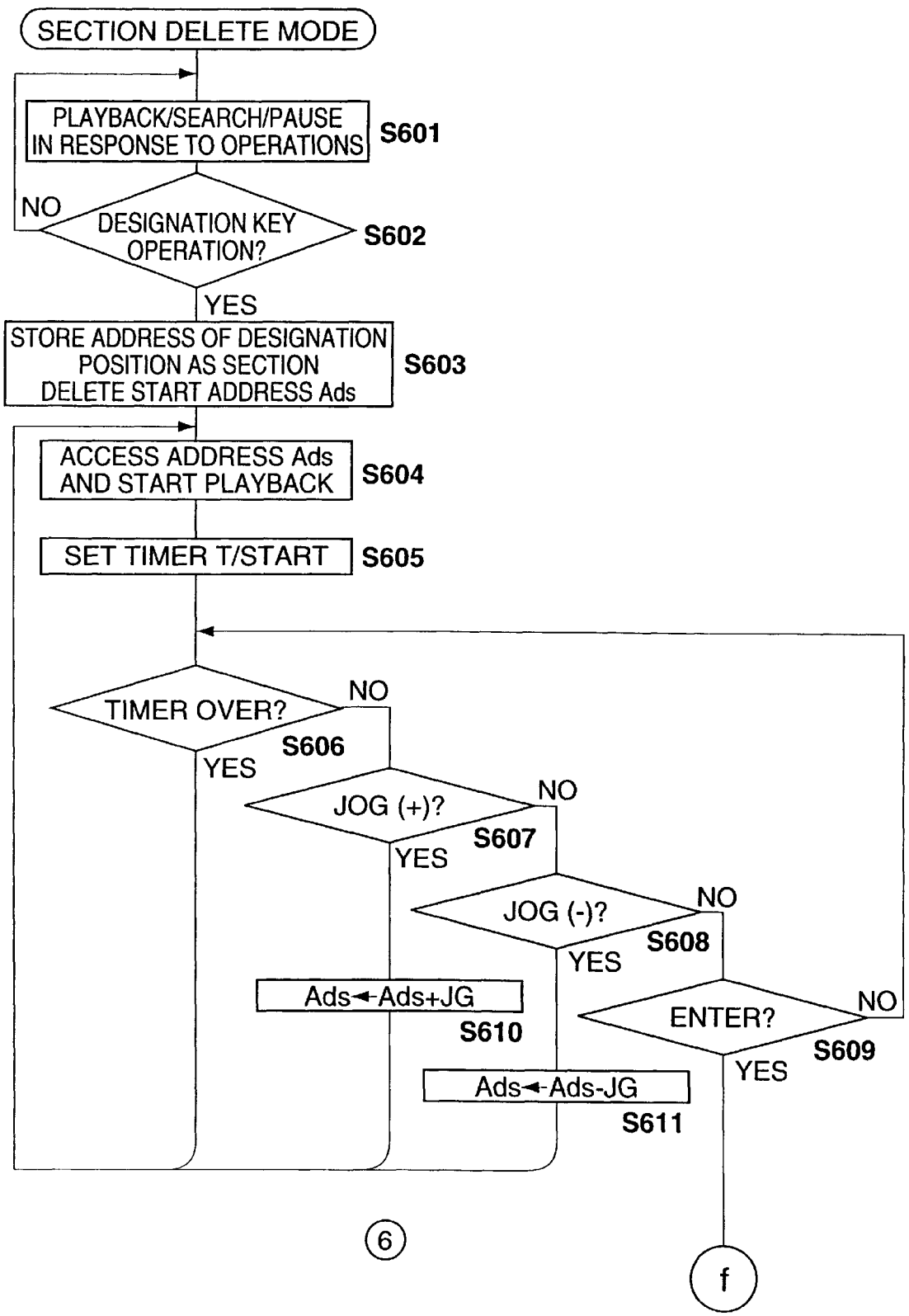
FIG. 30 shows a flowchart of the rehearsal operation during section delete designation of the sixth embodiment.
Figure 31:
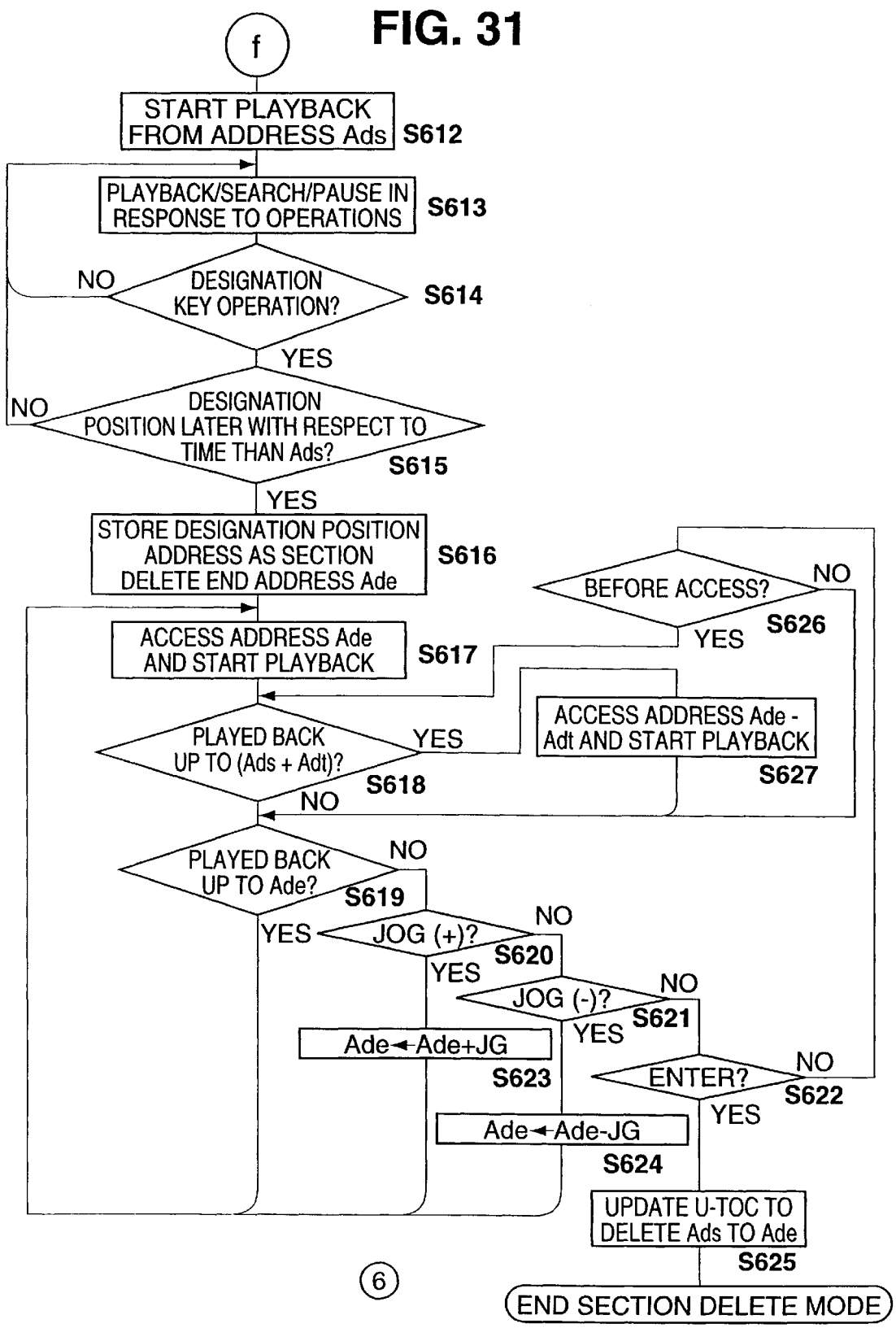
FIG. 31 shows a flowchart of the rehearsal operation during section delete designation of the sixth embodiment.

Next, the section delete operation example 6 is described using the image of FIG. 29 and the flowcharts FIG. 30 and FIG. 31.

In operation example 6, as shown in FIG. 29, the rehearsal playback RH1 of T seconds is carried out from a section delete start address Ads designated and inputted by the start point designation operation DS (or changed by operations of the jog dial 27). On the other hand, with the section delete end address Ade designated and inputted in the end point designation operation DE (or changed by operations of the jog dial 27), a rehearsal playback RH2 is carried out from the section delete start address Ads decided at this time up to the section delete end address Ade inputted at this time. Regarding the rehearsal playback RH2, only the portion, for example, of the T seconds from the section delete start address Ads and the T second up to the section delete end address Ade are adopted.

Namely, in the operation example 5, the rehearsal playback RH2 takes all of the sections to be deleted as the playback target but in the operation example 6, only the first and last portion of the sections to be deleted are taken as the playback target.

When the user adopts the section delete mode using an operation of the edit key 29, the system controller 11 starts the process of FIG. 30. In the process of FIG. 30, setting of the section delete start address Ads in response to the start point designation operation DS and rehearsal playing back for T seconds from this address, and changing of the section delete start address Ads in response to operations of the jog dial 27 carried out by the user as necessary and rehearsal playback for T seconds from this address is carried out and the section delete start address Ads is decided in response to the enter operation.

These processes are executed in step S601 to S611 but as this is the same as for the process of steps S501 to S511 shown in FIG. 27 as the process for the operation example 5.

As shown within the parenthesis of FIG. 29, a modification of the operation example 6 can be considered where a T second rehearsal playback RH1 is carried out starting from the section delete start address Ads designated and inputted using the start point designation operation DS (or changes due to operations of the jog dial 27).

If the section delete start address Ads is decided by the enter operation of step S609, the process for the system controller 11 proceeds to step S612 of FIG. 31. The playback operation is then made to start from the section delete start address Ads decided at this time as an operation for the user to search for a point to carry out an end point designation operation DE.

The system controller 11 then executes operations such as playback search (access, fast forward, rewind)/playback pause/playback in step S613 in accordance with user operations such as search, pause and playback operations, etc.

The user then searches for the desired point so as to press the section delete position designation key 39 in line with the timing of the playback output for the audio of the point taken as the point for ending execution of the section delete, i.e. the end point designation operation DE is carried out. The process of the system controller 11 then proceeds from step S614 to step S615 and a determination is made as to whether or not the point designated by the end point designation operation DE is a point corresponding to a point in time later than the section delete start address Ads that has been decided upon when viewed from the playback time axis. If this does not follow with respect to time, this end point designation operation DE is ignored and step S613 is returned to. The above is the same process as for step S515 of operating example 5.

If the end point designation operation DE is carried out for a point corresponding to a point in time following the section delete start address Ads with respect to time, the process proceeds to step S616. The address of the point designated in this end point designation operation DE is then stored in the internal RAM 11a as the section delete end address Ade.

Next, in step S617, the optical head 3 is made to access the section delete start address Ads and a playback operation starts from this address Ads.

The operation taken as the rehearsal playback RH2 in FIG. 29 is then made to start using the process of step S617.

In step S618, whether or not the rehearsal playback RH2 has reached an address (Ads+Adt) for which the time of T seconds has elapsed as playback time from the section delete start address Ads is monitored. Operations of the jog dial 27 are monitored in step S620 and step S621 and enter operations are monitored in step S622 even when the address (Ads+Adt) for which T seconds has elapsed has not been reached.

This monitoring loop continues while positive results are being obtained in step S626. The previous access of step S626 is the access shown by the dotted line in FIG. 29, i.e. determining whether or not there has been a previous execution of an access after an address (Ads+Adt) for which T seconds of time has elapsed has been reached.

When the user rotates the jog dial 27 in the + or − direction during this monitoring loop, the process proceeds from step S620 to S623 or from step S621 to S624 and the value for the section delete end address Ade stored in the RAM 11a is updated in response to operations in the same way as the case for each of the operation examples.

Step S617 is then returned to and the optical head 3 is made to access the section delete start address Ads again so that the rehearsal playback RH2 is again made to start from the address Ads, i.e. when the section delete end address Ade is changed using the operation of the jog dial 27, the playback end point for the rehearsal playback RH2 is changed.

If it is determined in step S618 that an address (Ads+Adt) for which T seconds has elapsed from the section delete start address Ads has been reached, step S627 is proceeded to. The reading position of the optical head 3 is then made to access the address (Ade−Adt) recorded with data for T seconds previous to the section delete end address Ade and playback output from this position is started.

Then, in step S619, monitoring is performed as to whether or not the rehearsal playback RH2 has reached the section delete end address Ade. When the address Ade has not been reached, operations of the jog dial 27 are monitored in step S620 and step S621 and enter operations are monitored in step S622.

This monitoring loop continues while indefinite results are obtained in step S626.

When the user listens to the rehearsal playback audio and determines that the point designated for the end point designation operation DE is appropriate, the user carries out an enter operation. At this time, the process for the system controller 11 proceeds from step S622 to step S625, and then updates the U-TOC data for from the defined section to be deleted based on the section delete start address Ads and the section delete end address Ade stored at the RAM 11a at this time. When the updating processing has finished, the section delete is complete and section delete mode ends.

In the above process, as shown in FIG. 29, at the time of designating and inputting the end point of the section to be deleted, section delete is executed using the operation example 6 taking the T second portion previous to the section to be deleted and the T second portion following sections to be deleted as the target of the rehearsal playback.

(g. Section delete operation example 7).

Figure 32:
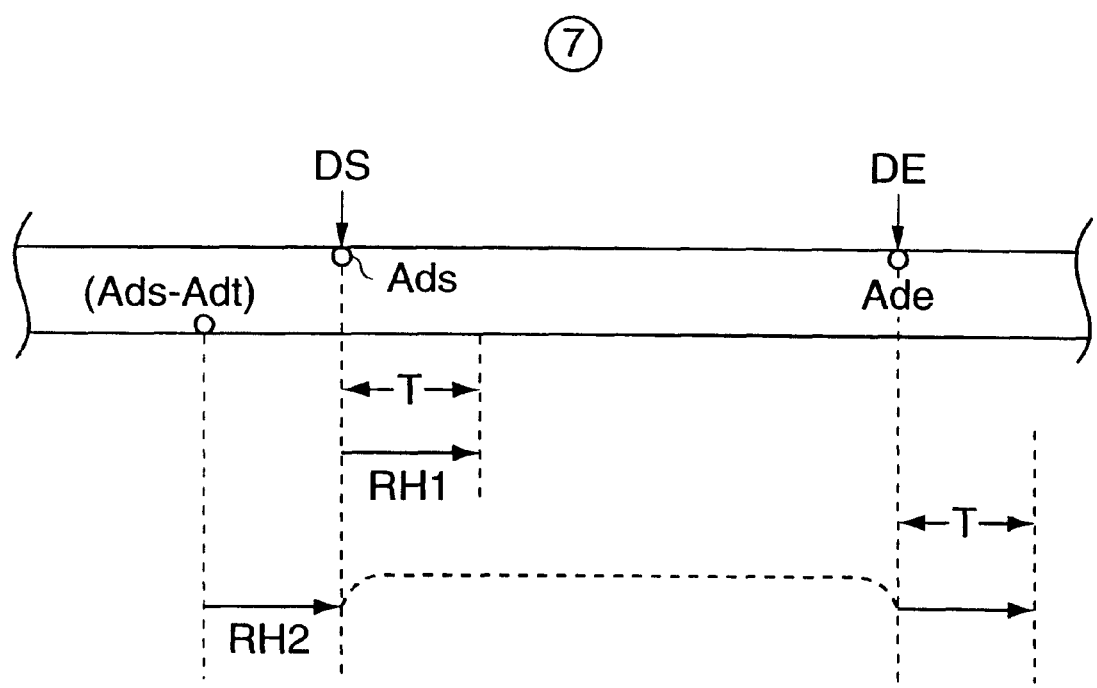
FIG. 32 shows a seventh embodiment of a rehearsal operation during section delete designation.
Figure 33:
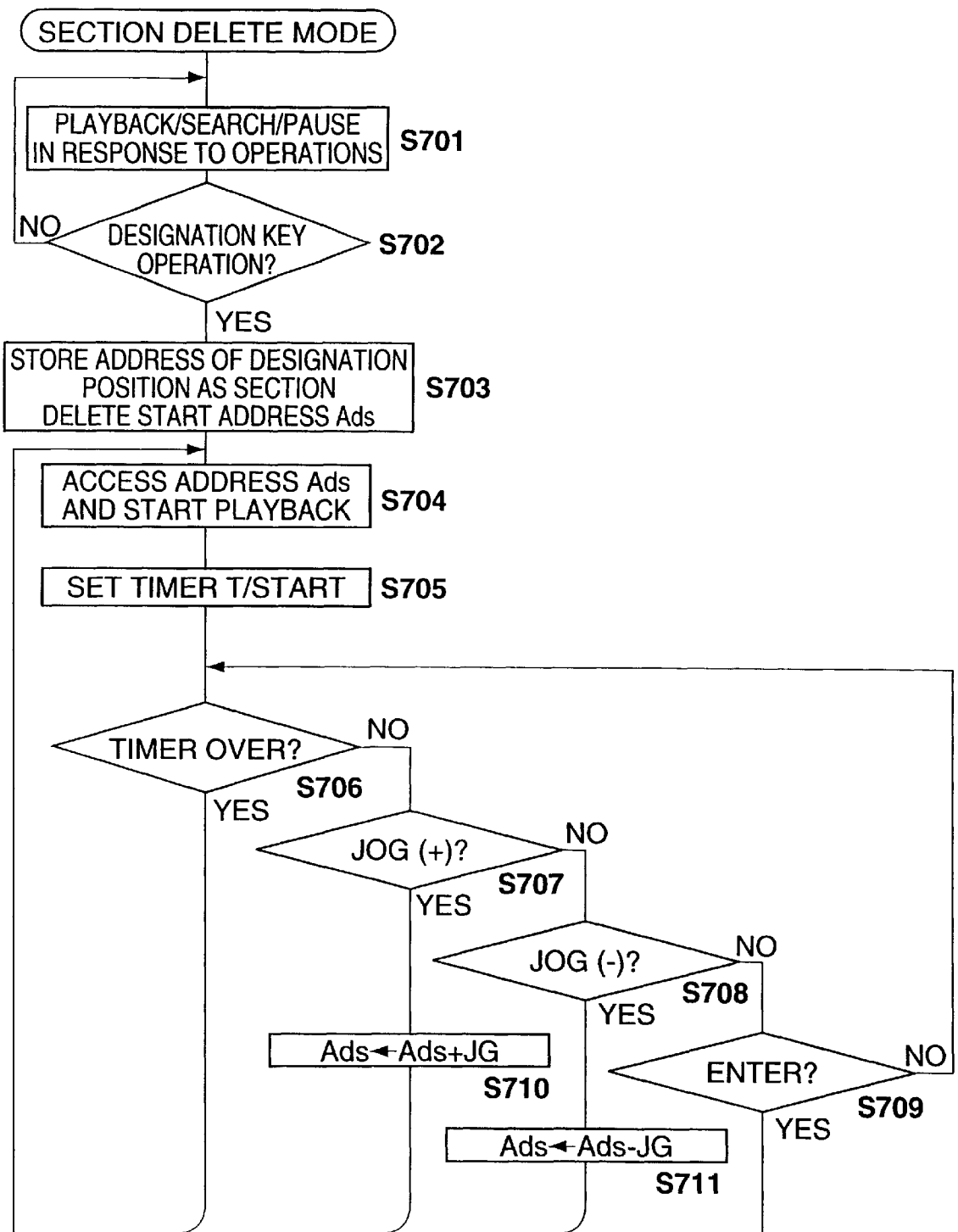
FIG. 33 shows a flowchart of the rehearsal operation during section delete designation of the seventh embodiment.
Figure 34:
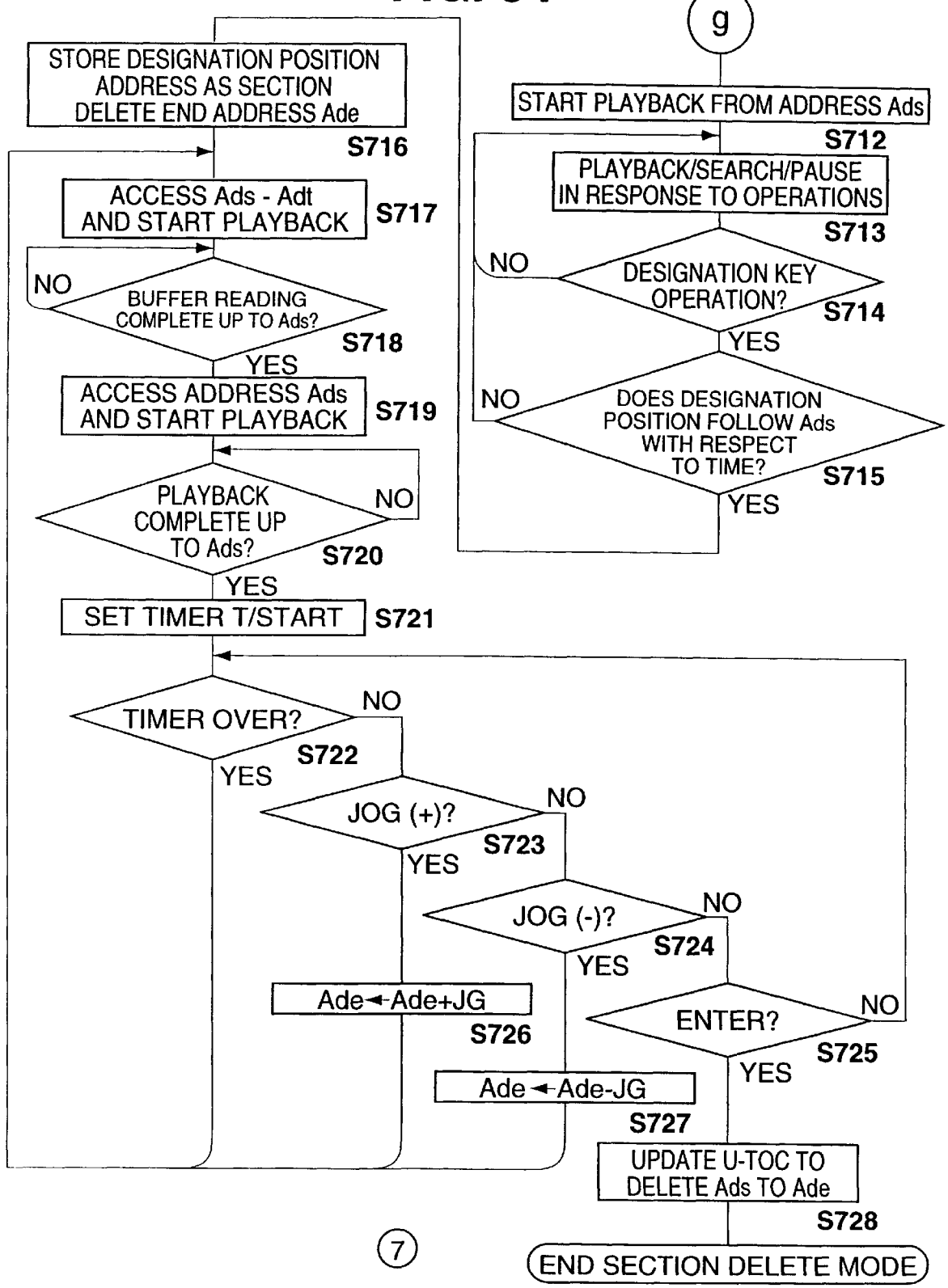
FIG. 34 shows a flowchart of the rehearsal operation during section delete designation of the seventh embodiment.

Next, the section delete operation example 7 is described using the image of FIG. 32 and the flowcharts FIG. 33 and FIG. 34.

In operation example 7, as shown in FIG. 32, the rehearsal playback RH1 of T seconds is carried out from a section delete start address Ads designated and inputted by the start point designation operation DS (or changed by operations of the jog dial 27). On the other hand, with the section delete end address Ade designated and inputted in the end point designation operation DE (or changed by operations of the jog dial 27), a rehearsal playback RH2 is carried out for T seconds up to the section delete start address Ads decided at this time and for T seconds from the section delete end address Ade inputted at this time.

When the user adopts the section delete mode using an operation of the edit key 29, the system controller 11 starts the process of FIG. 33. In the process of FIG. 33, setting of the section delete start address Ads in response to the start point designation operation DS and rehearsal playing back for T seconds from this address, and changing of the section delete start address Ads in response to operations of the jog dial 27 carried out by the user as necessary and rehearsal playback for T seconds from this address is carried out and the section delete start address Ads is decided in response to the enter operation.

These processes are executed in step S701 to S711 but as this is the same as for the process of steps S101 to S111 shown in FIG. 15 as the process for the operation example 1.

When the user listens to the played back audio in rehearsal playback RH1 and determines that the point designated for the start point designation operation DS is appropriate, the user carries out an enter operation. At this time, the process for the system controller 11 proceeds from step S709 to step S712 of FIG. 34. The playback operation is then started from the section delete start address Ads decided at this time as the operation for the user to search for a point from which to carry out the end point designation operation DE.

In step S714, the system controller 11 executes operations such as search (access, fast forward, high-speed rewind)/playback pause/playback etc. so as to correspond to the search/pause/playback operations of the user in step S713. Further, the end point designation operation DE is monitored in step S702.

If the point designated by the end point designation operation DE follows the decided section delete start address Ads with respect to time from the point of view of the playback time axis, the process proceeds from step S715 to step S716. The address of the point designated by the end point designation operation DE is then stored in the internal RAM 11a as the section delete end address Ade.

Next, in step S717, an address (Ads−Adt) T seconds previous on the playback timed axis from the section delete start address Ads is calculated. The optical head 3 is then made to access this address (Ads−Adt) and a playback operation is made to start from this address (Ads−Adt).

An operation that is the rehearsal playback RH2 of FIG. 32 is then made to start using the process of this step S717.

Reading of data at a high rate from the disc 1 and storing of this read data to the buffer memory 13, and reading from the buffer memory 13 at a low rate and reading and audio playback operations from the buffer memory 13 are started as the rehearsal playback RH2 from the time of step S717. However, whether or not the operations of reading data from the disc 1 and storing read data in the buffer memory 13 have reached the section delete start address Ads are monitored in step S718.

Step S719 is then proceeded to at the time when the audio data for up to the section delete start address Ads is written to the buffer memory 13 and the optical head 3 is made to access the section delete end address Ade. Data reading from the address Ade and writing to the buffer memory 13 then begins.

The actual playback audio has not yet reached the audio data for the section delete start address Ads at the time when the process of step S719 has finished due to the difference in the data transfer rate from the disc 1 to the buffer memory 13 and the data transfer rate from the buffer memory 13 to the audio output stage.

However, audio data from the section delete end address Ade is already stored in the buffer memory 13 as audio data following the audio data for the section delete start address Ads already read out from the disc 1 in step S719 onwards. The audio due to the audio data from the section delete end address Ade is therefore outputted without interruption so as to follow the audio due to the audio data for the section delete start address Ads by continuing the reading and playing back output from the buffer memory 13 as usual.

Step S721 is then proceeded to from step S720 when the audio data becomes the audio due to the audio data for the section delete start address Ads and the timer T for counting T seconds is set and started.

The time over of the timer T is then monitored in step S722, operations of the jog dial 27 are monitored in step S723 and step S724 and enter operations are monitored in step S725.

If a time over of the timer T is detected in step S722, step S717 is returned to and an operation is again started as the rehearsal playback operation RH2 from the address (Ads–Adt) T seconds previous to the section delete start address Ads.

When the user rotates the jog dial 27 in the + or – direction during execution of the rehearsal playback RH2, the process proceeds from step S723 to step S726 or from step S724 to step S727. Then, in the same way as the case for each of the operating examples, the value of the section delete end address Ade stored in the RAM 11a is updated in response to operations.

Step S717 is then returned to, the optical head 3 is made to access the address (Ads–Adt) T seconds previous to the section delete start address Ads again and rehearsal playback RH2 is made to start again from this address Ads.

When the section delete end address Ade is changed by operation of the jog dial 27, the access point for the rehearsal playback RH2 is changed in step S719.

When the user listens to the rehearsal playback output and determines that the point designated for the end point designation operation DE is appropriate, the user carries out an enter operation. At this time, the process for the system controller 11 proceeds from step S725 to step S728, and then updates the U-TOC data for from the defined section to be deleted based on the section delete start address Ads and the section delete end address Ade stored at the RAM 11a at this time. When the updating processing has finished, the section delete is complete and section delete mode ends.

From the above process, as shown in FIG. 32, a T second portion directly preceding and a T second portion directly following the section to be deleted are taken to be rehearsal playback targets at the time when the end point of the section to be deleted is designated and inputted. The section delete can, however, be executed as the operating example 7 that is played back without interruptions.

However, in this case, the rehearsal playback RH2 can be indicated to the user under the playback conditions occurring after execution of the section delete editing so that the user can confirm the conditions for after section delete editing execution before section delete editing execution.

(h. Section delete operation example 8).

Figure 35:
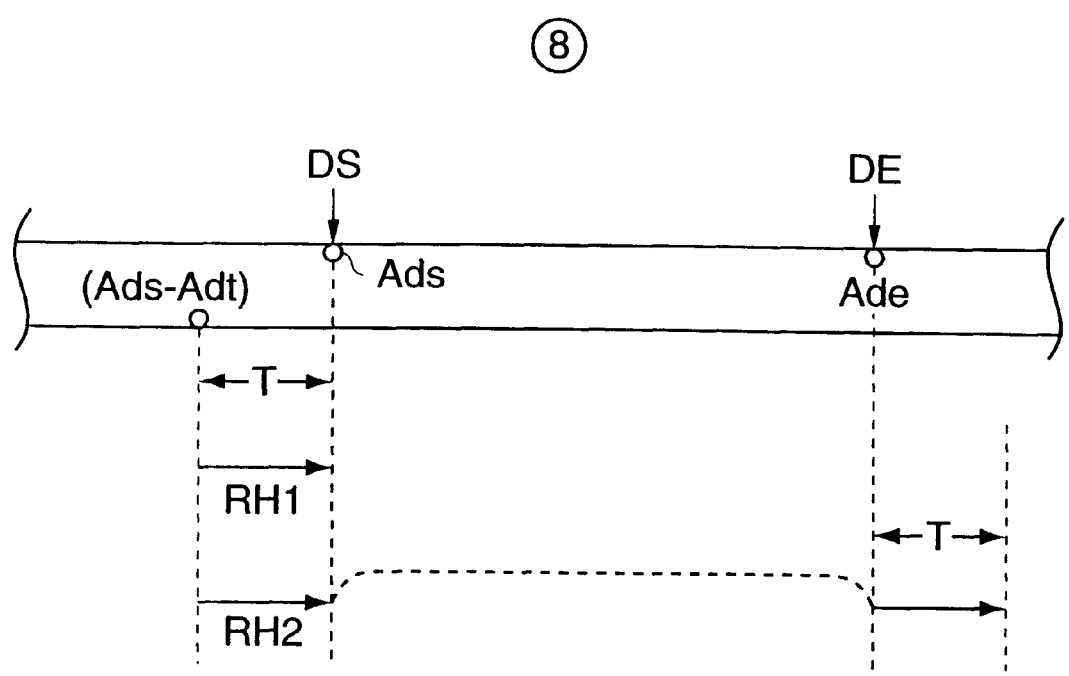
FIG. 35 shows an eighth embodiment of a rehearsal operation during section delete designation.
Figure 36:
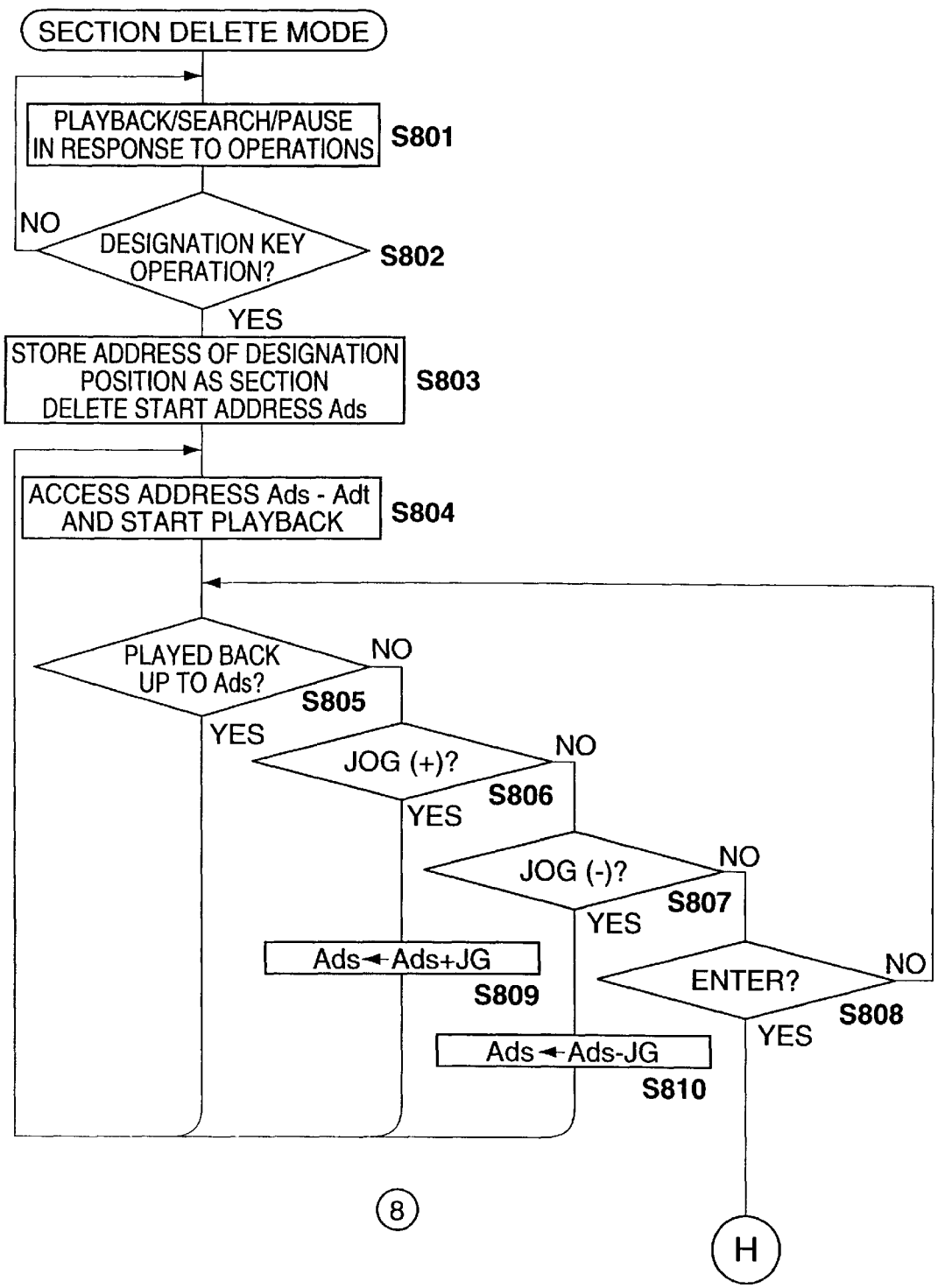
FIG. 36 shows a flowchart of the rehearsal operation during section delete designation of the eighth embodiment.
Figure 37:
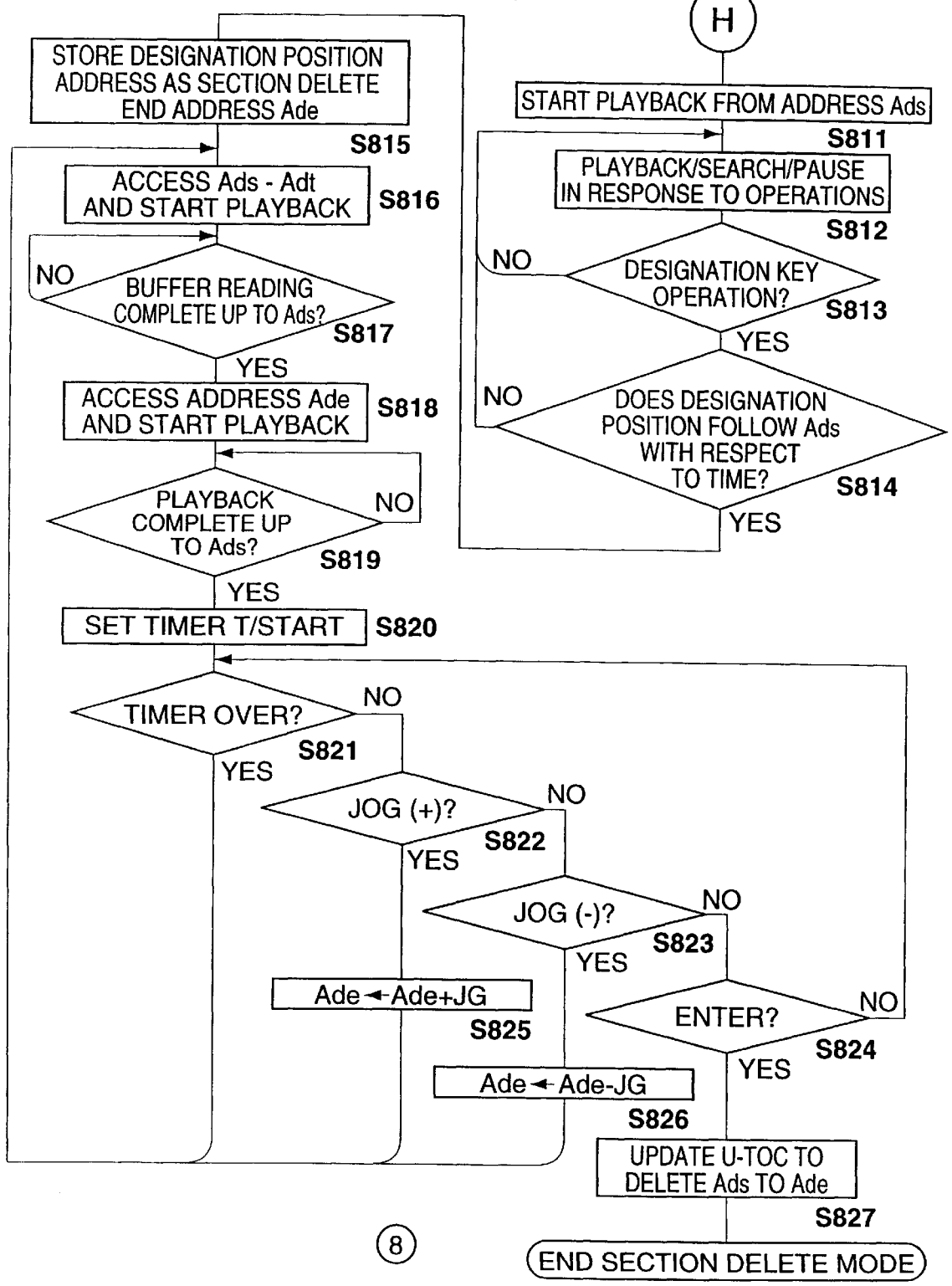
FIG. 37 shows a flowchart of the rehearsal operation during section delete designation of the eighth embodiment.

Next, the section delete operation example 8 is described using the image of FIG. 35 and the flowcharts FIG. 36 and FIG. 37.

In operation example 8, as shown in FIG. 35, the rehearsal playback RH1 of T seconds taking the address as an end point is carried out for the section delete start address Ads designated and inputted by the start point designation operation DS (or changed by operations of the jog dial 27). On the other hand, with the section delete end address Ade designated and inputted in the end point designation operation DE (or changed by operations of the jog dial 27), a rehearsal playback RH2 is carried out for T seconds up to the section delete start address Ads decided at this time and for T seconds from the section delete end address Ade inputted at this time.

When the user adopts the section delete mode using an operation of the edit key 29, the system controller 11 starts the process of FIG. 36. In the process of FIG. 36, setting of the section delete start address Ads in response to the start point designation operation DS and rehearsal playing back for T seconds taking this address as an end point, and changing of the section delete start address Ads in response to operations of the jog dial 27 carried out by the user as necessary and rehearsal playback for T seconds taking this address as an end point is carried out and the section delete start address Ads is decided in response to the enter operation.

These processes are executed in step S801 to S810 but as this is the same as for the process of steps S301 to S310 shown in FIG. 21 as the process for the operation example 3.

If the section delete start address Ads is decided by the enter operation of step S808, the process for the system controller 11 proceeds to step S811 of FIG. 37. The playback operation is then made to start from the section delete start address Ads decided at this time as an operation for the user to search for a point to carry out an end point designation operation DE.

In the process thereafter, monitoring of the end point designation operation DE (S813) or response (S812) to search/pause/playback operations etc. are carried out by the user.

If the point designated by the end point designation operation DE follows the decided section delete start address Ads with respect to time from the point of view of the playback time axis, the process proceeds from step S814 to step S815. The address of the point designated by the end point designation operation DE is then stored in the internal RAM 11a as the section delete end address Ade.

After this, in step S816 to S827, a rehearsal playback RH2 is carried out where a T second portion directly preceding and a T second portion directly following the section to be deleted are played back consecutively. The section delete end address Ade can then be changed in response to operations of the jog dial 27 and the rehearsal playback RH2 can be carried out in response to this. This is then stored in the RAM 11a at this point in time in response to enter operations carried out by the user and updating of U-TOC data for the section defined based on the inputted decided section delete start address Ads and the section delete end address Ade is carried out. When the update processing finishes, the section delete is complete and the section delete mode ends. The above processing is the same as the processing of step S712 to step S728 shown in FIG. 34 as the aforementioned operation example 7.

In the above process of FIG. 36 and FIG. 37, as shown in FIG. 35, at the time when the end point of the section to be deleted is designated and inputted a directly preceding T second portion and directly following T second portion are taken as the targets for rehearsal playback. The section delete is, however, executed without interruption as the played back as the operation example 7.

However, in this case also, the rehearsal playback RH2 can be indicated to the user under the playback conditions occurring after execution of the section delete editing so that the user can confirm the conditions for after section delete editing execution before section delete editing execution.

8. Other Section Delete Operation Examples.

In the above a description was given of a section delete process where an operating mode deletes one part occurring in a certain program. However, a section delete process where parts are deleted across a plurality of programs is also possible for each of the operation examples.

Figure 38A:
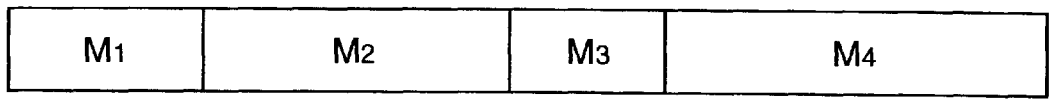
FIG. 38A is a schematic view of programs recorded consecutively on the recording medium.
Figure 38B:
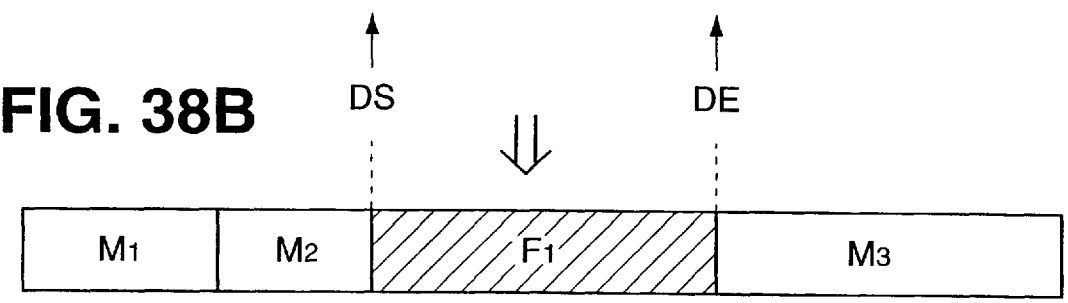
FIG. 38B is a schematic view of when section delete designation extends over a plurality of programs.

The situation for this section delete process is shown in FIG. 38A and FIG. 38B.

Figure 39A:
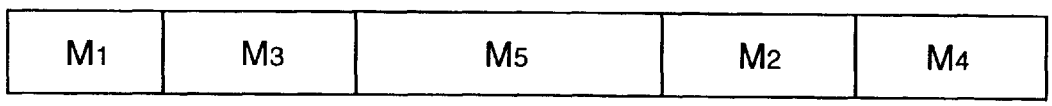
FIG. 39A is a schematic view of programs recorded discretely on the recording medium.

When a first program $M_1$ to fourth program $M_4$ are recorded as shown in FIG. 39A, the user performs a start point designation operation DS to the center of the second program $M_2$ and an end point designation operation DE to the center of the fourth program $M_4$. In this case it is preferable to delete from the point designated by the start point designation operation DS to the point designated by the end point designation operation DE when viewed from the playback time axis.

Namely, as shown in FIG. 38B, a section from the following half portion of the second program $M_2$, third program $M_3$ and to the center portion of the fourth program $M_4$ is deleted, with the data of the U-TOC sector 0 being updated so as to be handled as a free area $F_1$.

Efficiency of the editing workload placed on the user can therefore be realized because it is possible to perform section deletes across a plurality of programs.

Figure 39B:
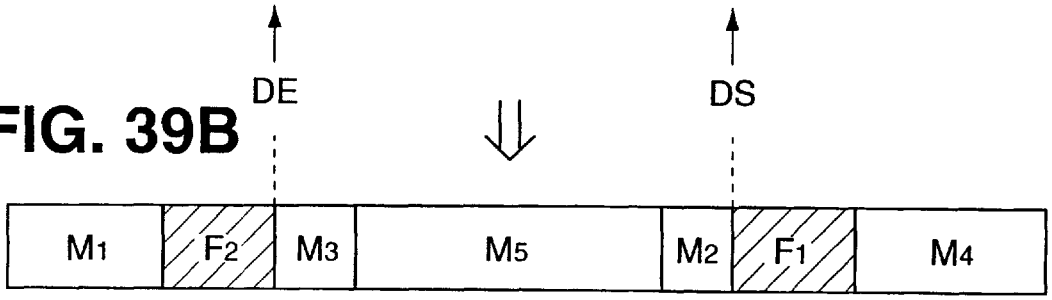
FIG. 39B is a schematic view of when section delete designation is carried out over a plurality of programs.

The situation for a section delete process across a plurality of programs are also shown in FIG. 39A and FIG. 39B. As shown in FIG. 39A, recording are carried out physically on the disc in the order of a first program $M_1$, third program $M_3$, fifth program $M_5$, second program $M_2$ and fourth program $M_4$. Playback is of course carried out in the order of the first program $M_1$, second program $M_2$, third program $M_3$, fourth program $M_4$ and fifth program $M_5$.

In this case, the user carries out a start point designation operation DS to the center of the second program $M_2$ and an end point designation operation DE to the center of the third program $M_3$. In doing so, as it is desirable to perform a delete from the point designated by the start point designation operation DS to the point designated by the end point designation operation DE, as shown by the portions given diagonal lines in FIG. 39B, the following half portion of the second program $M_2$ and the preceding half portion of the third program $M_3$ are deleted and the data of the U-TOC sector 0 is updated so as to handle these portions as free areas $F_1$ and $F_2$.

In the above, a description was given of erasing sections designated by the user but as well as this, rather than erasing designated sections by actually using a magnetic or optical head, a section delete operation can be carried out by listing the place to undergo a section delete as a recordable region on the U-TOC.

In these embodiments an example is given of the present invention applied to a minidisc system but the present invention can also be applied to editing apparatus for various recording medium systems where data such as audio data and video data etc. is recorded in a physically continuous manner and management information for managing recording and playback operations for this data is recorded.

As the editing apparatus of the present invention described above is equipped with designation operation means capable of arbitrarily inputting a first point and a second point for data being recorded, section setting means for setting a deletion section using the first point and second point inputted by said designation operation means and management information updating means for updating management information in such a manner that delete section data set by said section setting means is deleted, if a first and second point are designated in response to the section the user wishes to erase, the section defined by the first point and the second point, i.e. one or a plurality of sections recorded with data to be played back between the data playback time for data of the first point and the data playback time for the second point on the time axis is deleted. An editing operation where unnecessary portions are deleted can therefore be carried out in an extremely simple manner.

If a point designation operation is carried out for the first point or the second point, the section to be deleted can be exhibited to the user by executing a rehearsal playback where a prescribed section of data is repeatedly played back and outputted taking this point as a reference so that erroneous deletions can be avoided.

If a designation change operation is carried out during rehearsal playback, a rehearsal playback is carried out where a prescribed section of data is repeatedly played back taking the point changed in response to this designation change operation and this changed point as a reference. When there is a decision operation, the point designation operation up to this time or the point designated by the designation change operation are decided as the input values for the first point or the second point. The user can then adjust the section to be deleted while confirming the rehearsal playback output. A simple operation and easily understandable delete point presentation can then be carried out and simple and accurate delete editing is possible.

What is claimed is:

1. An editing apparatus for designating a predetermined period of a program data as a recordable area of a recording medium including a program region for recording a predetermined program and a management region for recording management data for managing the recorded program and said recordable area, comprising:

operation means for arbitrarily designating a start address and an end address of a predetermined period of a program data to be erased; and updating means for updating said management data for managing the recordable area which is designated by the operation means, and for editing at least one of a start address and an end address of a program if the start address and the end address of the predetermined period of the program data to be erased is positioned at the program.

2. The apparatus of claim 1, wherein said updating means updates said management region to link a part preceding said start address and a part following said end address when one program is included in a predetermined period designated by said operation means.

3. The apparatus of claim 1, wherein said updating means updates said management region to update a program number when three or more program numbers exist within a predetermined period designated by said operation means.

4. The apparatus of claim 1, further comprising playback means for performing a rehearsal operation.

5. The apparatus of claim 1, further comprising second operation means for updating said start address and said end address designated by said operation means.

6. The apparatus of claim 4, further comprising second operation means for updating said start address and said end address designated by said operation means.

7. An editing method for designating a predetermined period of a program data as a recordable area of a recording medium including a program region for recording a predetermined program and a management region for managing the recorded program and the recordable area, comprising the steps of:

arbitrarily designating a start address and an end address of a predetermined period of a program data to be erased;

updating said management data for managing the recordable area which is designated at said designating step; and editing at least one of a program if the start address and the end address of the predetermined period of the program data to be erased is positioned at the program.

8. The method of claim 7, wherein said management region is updated in such a manner as to link a part preceding said start address and a part following said end address when one program is included in a designated predetermined period.

9. The method of claim 7, wherein said step of updating includes updating said management region in such a manner as to update a program number when three or more program numbers exist within a designated predetermined period.

10. The method of claim 7, further including the step of performing a rehearsal playback for confirming a delete section designated based on the start address and the end address designated.

11. The method of claim 7, further comprising a fine adjustment step for fine adjusting a start address and an end address using a rotating dial taking the designated start and end addresses as temporary addresses.

12. The method of claim 11, further comprising a rehearsal playback step for repeatedly playing back in the reverse and forward directions starting from the designated start and end addresses, with fine adjustment of said start and end addresses being carried out using said rotating dial during rehearsal playback.

13. An editing apparatus for designating a prescribed section of a program data as a recordable region on a recording medium having a program region recorded with a prescribed program and a management region for managing a recorded program and said recordable region, comprising:

operation means for arbitrarily designating a start address and an end address of a prescribed section of a program data to be designated as a recordable region;

updating means for updating said management region to take a section defined by said start address and said end address designated by said operation means as said recordable region; and playback means for performing a rehearsal operation:
      wherein said rehearsal operation is carried out by repeating a playback of a section behind the start address designated by said operation means for a prescribed time with the start address being taken as a start point and by repeating a playback of a section behind the end address designated by said operation means for a prescribed time with the end address being taken as a start point.

14. The apparatus of claim 13 wherein said updating means updates said management region to link a part preceding said start address and a part following said end address when one program is included in a prescribed section designated by said operation means.

15. The apparatus of claim 14 wherein said updating means updates said management region to update a program number when three or more program numbers exist within a prescribed section designated by said operation means.

16. The apparatus of claim 15 further comprising a second operation means capable of updating said start address and said end address designated by said operation means.

17. The apparatus of claim 13 wherein said updating means updates said management region to update a program number when three or more program numbers exist within a prescribed section designated by said operation means.

18. The apparatus of claim 17 further comprising a second operation means capable of updating said start address and said end address designated by said operation means.

19. The apparatus of claim 13 further comprising a second operation means capable of updating said start address and said end address designated by said operation means.

20. An editing apparatus for designating a prescribed section of a program data as a recordable region on a recording medium having a program region recorded with a prescribed program and a management region for managing a recorded program and said recordable region, comprising:

operation means for arbitrarily designating a start address and an end address of a prescribed section of a program data to be designated as a recordable region;

updating means for updating said management region to take a section defined by said start address and said end address designated by said operation means as said recordable region; and playback means for performing a rehearsal operation;
      wherein said rehearsal operation is carried out by repeating a playback of a section behind the start address designated by said operation means for a prescribed time with the start address being taken as a start point and by repeating a playback of a section before the end address designated by being taken as a start point.

21. The apparatus of claim 20 wherein said updating means updates said management region to link a part preceding said start address and a part following said end address when one program is included in a prescribed section designated by said operation means.

22. The apparatus of claim 21 wherein said updating means updates said management region to update a program number when three or more program numbers exist within a prescribed section designated by said operation means.

23. The apparatus of claim 22 further comprising a second operation means capable of updating said start address and said end address designated by said operation means.

24. The apparatus of claim 20 wherein said updating means updates said management region to update a program number when three or more program numbers exist within a prescribed section designated by said operation means.

25. The apparatus of claim 24 further comprising a second operation means capable of updating said start address and said end address designated by said operation means.

26. The apparatus of claim 20 further comprising a second operation means capable of updating said start address and said end address designated by said operation means.

27. An editing apparatus for designating a prescribed section of a program data as a recordable region on a recording medium having a program region recorded with a prescribed program and a management region for managing a recorded program and said recordable region, comprising:

operation means for arbitrarily designating a start address and an end address of a prescribed section of a program data to be designated as a recordable region;

updating means for updating said management region to take a section defined by said start address and said end address designated by said operation means as said recordable region; and playback means for performing a rehearsal operation;
wherein said rehearsal operation is carried out by repeating a playback of a section before the start address designated by said operation means for a prescribed time with an address corresponding to the prescribed time before the start address being taken as a start point and by repeating a playback of a section behind the end address designated by said operation means for a prescribed time with the end address being taken as a start point.

28. The apparatus of claim 27 wherein said updating means updates said management region to link a part preceding said start address and a part following said end address when one program is included in a prescribed section designated by said operation means.

29. The apparatus of claim 28 wherein said updating means updates said management region to update a program number when three or more program numbers exist within a prescribed section designated by said operation means.

30. The apparatus of claim 29 further comprising a second operation means capable of updating said start address and said end address designated by said operation means.

31. The apparatus of claim 27 wherein said updating means updates said management region to update a program number when three or more program numbers exist within a prescribed section designated by said operation means.

32. The apparatus of claim 31 further comprising a second operation means capable of updating said start address and said end address designated by said operation means.

33. The apparatus of claim 27 further comprising a second operation means capable of updating said start address and said end address designated by said operation means.

34. An editing apparatus for designating a prescribed section of a program data as a recordable region on a recording medium having a program region recorded with a prescribed program and a management region for managing a recorded program and said recordable region, comprising:

operation means for arbitrarily designating a start address and an end address of a prescribed section of a program data to be designated as a recordable region;

updating means for updating said management region to take a section defined by said start address and said end address designated by said operation means as said recordable region; and playback means for performing a rehearsal operation;
wherein said rehearsal operation is carried out by repeating a playback of a section before the start address designated by said operation means for a prescribed time with an address corresponding to the prescribed time before the start address being taken as a start point and by repeating a playback of a section before the end address designated by said operation means for a prescribed time with an address corresponding to the prescribed time before the end address being taken as a start point.

35. The apparatus of claim 34 wherein said updating means updates said management region to link a part preceding said start address and a part following said end address when one program is included in a prescribed section designated by said operation means.

36. The apparatus of claim 35 wherein said updating means updates said management region to update a program number when three or more program numbers exist within a prescribed section designated by said operation means.

37. The apparatus of claim 36 further comprising a second operation means capable of updating said start address and said end address designated by said operation means.

38. The apparatus of claim 34 wherein said updating means updates said management region to update a program number when three or more program numbers exist within a prescribed section designated by said operation means.

39. The apparatus of claim 38 further comprising a second operation means capable of updating said start address and said end address designated by said operation means.

40. The apparatus of claim 38 further comprising a second operation means capable of updating said start address and said end address designated by said operation means.

41. An editing apparatus for designating a prescribed section of a program data as a recordable region on a recording medium having a program region recorded with a prescribed program and a management region for managing a recorded program and said recordable region, comprising:

operation means for arbitrarily designating a start address and an end address of a prescribed section of a program data to be designated as a recordable region;

updating means for updating said management region to take a section defined by said start address and said end address designated by said operation means as said recordable region;

playback means for performing a rehearsal operation; and second operation means capable of updating said start address and said end address designated by said operation means;

wherein said rehearsal operation is carried out by repeating a playback for a prescribed time with the start address being taken as a start point and, after said start address is changed by said second operation means, by repeating a playback of a section between the end address designated by said operation means and said changed start address or the address corresponding to the prescribed time before said changed start address.

42. The apparatus of claim 41 wherein said updating means updates said management region to link a part preceding said start address and a part following said end address when one program is included in a prescribed section designated by said operation means.

43. The apparatus of claim 42 wherein said updating means updates said management region to update a program number when three or more program numbers exist within a prescribed section designated by said operation means.

44. The apparatus of claim 41 wherein said updating means updates said management region to update a program number when three or more program numbers exist within a prescribed section designated by said operation means.

45. An editing apparatus for designating a prescribed section of a program data as a recordable region on a recording medium having a program region recorded with a prescribed program and a management region for managing a recorded program and said recordable region, comprising:

operation means for arbitrarily designating a start address and an end address of a prescribed section of a program data to be designated as a recordable region;

updating means for updating said management region to take a section defined by said start address and said end address designated by said operation means as said recordable region;

playback means for performing a rehearsal operation, and second operation means capable of updating said start address and said end address designated by said operation means;

wherein said rehearsal operation is carried out by repeating a playback for a prescribed time with the start address designated by said operation means or an address corresponding to the prescribed time before the start address being taken as a start point and, after said start address is changed by said second operation means, by repeating a playback which is carried out for a prescribed time with said changed start address being taken as a start point and is followed by a playback of a section before the end address designated by said operation means for a prescribed time with an address corresponding to the prescribed time before the end address being taken as a start point.

46. The apparatus of claim 45 wherein said updating means updates said management region to link a part preceding said start address and a part following said end address when one program is included in a prescribed section designated by said operation means.

47. The apparatus of claim 46 wherein said updating means updates said management region to update a program number when three or more program numbers exist within a prescribed section designated by said operation means.

48. The apparatus of claim 45 wherein said updating means updates said management region to update a program number when three or more program numbers exist within a prescribed section designated by said operation means.

49. An editing apparatus for designating a prescribed section of a program data as a recordable region on a recording medium having a program region recorded with a prescribed program and a management region for managing a recorded program and said recordable region, comprising:
   operation means for arbitrarily designating a start address and an end address of a prescribed section of a program data to be designated as a recordable region;
   updating means for updating said management region to take a section defined by said start address and said end address designated by said operation means as said recordable region;
   playback means for performing a rehearsal operation; and
   second operation means capable of updating said start address and said end address designated by said operation means;
      wherein said rehearsal operation is carried out by repeating a playback of a section behind the start address designated by address is changed by said second operation means, by repeating a playback which is carried out for a section before said changed start address for a prescribed time with an address corresponding to the prescribed time before said changed start address being taken as a start point and is followed by a playback of a section behind the end address designated by said operation means for a prescribed time with the end address being taken as a start point.

50. The apparatus of claim 49 said updating means updates said management region to link a part preceding said start address and a part following said end address when one program is included in a prescribed section designated by said operation means.

51. The apparatus of claim 50 wherein said updating means updates said management region to update a program number when three or more program numbers exist within a prescribed section designated by said operation means.

52. The apparatus of claim 49 wherein said updating means updates said management region to update a program number when three or more program numbers exist within a prescribed section designated by said operation means.

53. An editing apparatus for designating a prescribed section of a program data as a recordable region on a recording medium having a program region recorded with a prescribed program and a management region for managing a recorded program and said recordable region, comprising:
   operation means for arbitrarily designating a start address and an end address of a prescribed section of a program data to be designated as a recordable region;
   updating means for updating said management region to take a section defined by said start address and said end address designated by said operation means as said recordable region;
   playback means for performing a rehearsal operation; and
   second operation means capable of updating said start address and said end address designated by said operation means;
      wherein said rehearsal operation is carried out by repeating a playback of a section before the start address designated by said operation means for a prescribed time with an address corresponding to the prescribed time before the start address being taken as a start point and, after said start address is changed by said second operation means, by repeating a playback which is carried out for a section before said changed start address for a prescribed time with an address corresponding to the prescribed time before said changed start address being taken as a start point and is followed by a playback of a section behind the end address designated by said operation means for a prescribed time with the end address being taken as a start point.

54. The apparatus of claim 53 wherein said updating means updates said management region to link a part preceding said start address and a part following said end address when one program is included in a prescribed section designated by said operation means.

55. The apparatus of claim 54 wherein said updating means updates said management region to update a program number when three or more program numbers exist within a prescribed section designated by said operation means.

56. The apparatus of claim 54 wherein said updating means updates said management region to update a program number when three or more program numbers exist within a prescribed section designated by said operation means.

57. An editing method for designating a prescribed section of a program data as a recordable region on a recording medium having a program region recorded with a prescribed program and a management region for managing a recorded program and said recordable region, comprising the steps of:
   arbitrarily designating a start address and an end address of a prescribed section of a program data to be designated as a recordable region;
   updating said management region to take a section defined by said start address and said end address designated by said designating step as said recordable region; and
   performing a rehearsal operation;
      wherein said rehearsal operation includes repeating a playback of a section behind the start address designated by said designating step for a prescribed time with the start address being taken as a start point and by repeating a playback of a section behind the end address designated by said designating step for a prescribed time with the end address being taken as a start point.

58. The method of claim 57 wherein said updating step updates said management region to link a part preceding said start address and a part following said end address when one program is included in a prescribed section designated by said designating step.

59. The method of claim 58 wherein said updating step updates said management region to update a program number when three or more program numbers exist within a prescribed section designated by said designating step.

60. The method of claim 59 further comprising the step of updating said start address and said end address designated by said designating step.

61. The method of claim 57 wherein said updating step updates said management region to update a program number when three or more program numbers exist within a prescribed section designated by said designating step.

62. The method of claim 61 further comprising the step of updating said start address and said end address designated by said designating step.

63. The method of claim 57 further comprising the step of updating said start address and said end address designated by said designating step.

64. An editing method for designating a prescribed section of a program data as a recordable region on a recording medium having a program region recorded with a prescribed program and a management region for managing a recorded program and said recordable region, comprising steps of:
   arbitrarily designating a start address and an end address of a prescribed section of a program data to be designated as a recordable region;
   updating said management region to take a section defined by said start address and said end address designated by said designating step as said recordable region; and
   performing a rehearsal operation;
      wherein said rehearsal operation includes repeating a playback of a section behind the start address designated by said designating step for a prescribed time with the start address being taken as a start point and by repeating a playback of a section before the end address designated by being taken as a start point.

65. The method of claim 64 wherein said step of updating includes the step of updating said management region to link a part preceding said start address and a part following said end address when one program is included in a prescribed section designated by said designating step.

66. The method of claim 65 wherein said step of updating includes the step of updating said management region to update a program number when three or more program numbers exist within a prescribed section designated by said designating step.

67. The method of claim 66 further including the step of updating said start address and said end address designated by said designating step.

68. The method of claim 64 wherein said step of updating includes the step of updating said management region to update a program number when three or more program numbers exist within a prescribed section designated by said designating step.

69. The method of claim 68 further including the step of updating said start address and said end address designated by said designating step.

70. The method of claim 64 further including the step of updating said start address and said end address designated by said designating step.

71. An editing method for designating a prescribed section of a program data as a recordable region on a recording medium having a program region recorded with a prescribed program and a management region for managing a recorded program and said recordable region, comprising the steps of:
   arbitrarily designating a start address and an end address of a prescribed section of a program data to be designated as a recordable region;
   updating said management region to take a section defined by said start address and said end address designated by said designating step as said recordable region; and
   performing a rehearsal operation;
      wherein said step of performing said rehearsal operation includes repeating a playback of a section before the start address designated by said designating step for a prescribed time with an address corresponding to the prescribed time before the start address being taken as a start point and by repeating a playback of a section behind the end address designated by said designating step for a prescribed time with the end address being taken as a start point.

72. The method of claim 71 wherein said step of updating includes the step of updating said management region to link a part preceding said start address and a part following said end address when one program is included in a prescribed section designated by said designating step.

73. The method of claim 72 wherein said step of updating includes the step of updating said management region to update a program number when three or more program numbers exist within a prescribed section designated by said designating step.

74. The method of claim 73 further including the step of updating said start address and said end address designated by said designating step.

75. The method of claim 71 wherein said step of updating includes the step of updating said management region to update a program number when three or more program numbers exist within a prescribed section designated by said designating step.

76. The method of claim 75 further including the step of updating said start address and said end address designated by said designating step.

77. The method of claim 71 further including the step of updating said start address and said end address designated by said designating step.

78. An editing method for designating a prescribed section of a program data as a recordable region on a recording medium having a program region recorded with a prescribed program and a management region for managing a recorded program and said recordable region, comprising the steps of:
   arbitrarily designating a start address and an end address of a prescribed section of a program data to be designated as a recordable region;
   updating said management region to take a section defined by said start address and said end address designated by said designating step as said recordable region; and
   performing a rehearsal operation;
      wherein said step of performing said rehearsal operation includes repeating a playback of a section before the start address designated by said designating step for a prescribed time with an address corresponding to the prescribed time before the start address being taken as a start point and by repeating a playback of a section before the end address designated by said designating step for a prescribed time with an address corresponding to the prescribed time before the end address being taken as a start point.

79. The method of claim 78 wherein said step of updating includes the step of updating said management region to link a part preceding said start address and a part following said end address when one program is included in a prescribed section designated by said designating step.

80. The method of claim 79 wherein said step of updating includes the step of updating said management region to update a program number when three or more program numbers exist within a prescribed section designated by said designating step.

81. The method of claim 80 further including the step of updating said start address and said end address designated by said designating step.

82. The method of claim 78 wherein said step of updating includes the step of updating said management region to update a program number when three or more program numbers exist within a prescribed section designated by said designating step.

83. The method of claim 82 further including the step of updating said start address and said end address designated by said designating step.

84. The method of claim 78 further including the step of updating said start address and said end address designated by said designating step.

85. An editing method for designating a prescribed section of a program data as a recordable region on a recording medium having a program region recorded with a prescribed program and a management region for managing a recorded program and said recordable region, comprising the steps of:

arbitrarily designating a start address and an end address of a prescribed section of a program data to be designated as a recordable region;

updating said management region to take a section defined by said start address and said end address designated by said designating step as said recordable region;

performing a rehearsal operation; and updating said start address and said end address designated by said designating step;

wherein said step of performing said rehearsal operation includes the step of repeating a playback for a prescribed time with the start address being taken as a start point and, after said start address is changed by said step of updating said start address and said end address, by repeating a playback of a section between the end address designated by said designating step and said changed start address or the address corresponding to the prescribed time before said changed start address.

86. The method of claim 85 wherein said step of updating said management region includes the step of updating said management region to link a part preceding said start address and a part following said end address when one program is included in a prescribed section designated by said designating step.

87. The method of claim 86 wherein said step of updating said management region includes the step of updating said management region to update a program number when three or more program numbers exist within a prescribed section designated by said designating step.

88. The method of claim 85 wherein said step of updating said management region includes the step of updating said management region to update a program number when three or more program numbers exist within a prescribed section designated by said designating step.

89. An editing method for designating a prescribed section of a program data as a recordable region on a recording medium having a program region recorded with a prescribed program and a management region for managing a recorded program and said recordable region, comprising the steps of:

arbitrarily designating a start address and an end address of a prescribed section of a program data to be designated as a recordable region;

updating said management region to take a section defined by said start address and said end address designated by said designating step as said recordable region;

performing a rehearsal operation; and updating said start address and said end address designated by said designating step;

wherein said step of performing said rehearsal operation includes the step of repeating a playback for a prescribed time with the start address designated by said designating step or an address corresponding to the prescribed time before the start address being taken as a start point and, after said start address is changed by said step of updating said start address and said end address by repeating a playback which is carried out for a prescribed time with said changed start address being taken as a start point and is followed by a playback of a section before the end address designated by said designating step for a prescribed time with an address corresponding to the prescribed time before the end address being taken as a start point.

90. The method of claim 89 wherein said step of updating said management region includes the step of updating said management region to link a part preceding said start address and a part following said end address when one program is included in a prescribed section designated by said designating step.

91. The method of claim 90 wherein said step of updating said management region includes the step of updating said management region to update a program number when three or more program numbers exist within a prescribed section designated by said designating step.

92. The method of claim 89 wherein said step of updating said management region includes the step of updating said management region to update a program number when three or more program numbers exist within a prescribed section designated by said designating step.

93. An editing method for designating a prescribed section of a program data as a recordable region on a recording medium having a program region recorded with a prescribed program and a management region for managing a recorded program and said recordable region, comprising the steps of:

arbitrarily designating a start address and an end address of a prescribed section of a program data to be designated as a recordable region;

updating said management region to take a section defined by said start address and said end address designated by said designating step as said recordable region;

performing a rehearsal operation; and updating said start address and said end address designated by said designating step;

wherein said step of performing said rehearsal operation includes the step of repeating a playback of a section behind the start address designated by address is changed by said step of updating said start address and said end address, by repeating a playback which is carried out for a section before said changed start address for a prescribed time with an address corresponding to the prescribed time before said changed start address being taken as a start point and is followed by a playback of a section behind the end address designated by said designating step for a prescribed time with the end address being taken as a start point.

94. The method of claim 93 wherein said step of updating said management region includes the step of updating said management region to link a part preceding said start address and a part following said end address when one program is included in a prescribed section designated by said designating step.

95. The method of claim 94 wherein said step of updating said management region includes the step of updating said management region to update a program number when three or more program numbers exist within a prescribed section designated by said designating step.

96. The method of claim 93 wherein said step of updating said management region includes the step of updating said management region to update a program number when three or more program numbers exist within a prescribed section designated by said designating step.

97. An editing method for designating a prescribed section of a program data as a recordable region on a recording medium having a program region recorded with a prescribed program and a management region for managing a recorded program and said recordable region, comprising the steps of:

arbitrarily designating a start address and an end address of a prescribed section of a program data to be designated as a recordable region;

updating said management region to take a section defined by said start address and said end address designated by said designating step as said recordable region;

performing a rehearsal operation; and updating said start address and said end address designated by said designating step;

wherein said step of performing said rehearsal operation includes the step of repeating a playback of a section before the start address designated by said designating step for a prescribed time with an address corresponding to the prescribed time before the start address being taken as a start point and, after said start address is changed by said step of updating said start address and said end address, by repeating a playback which is carried out for a section before said changed start address for a prescribed time with an address corresponding to the prescribed time before said changed start address being taken as a start point and is followed by a playback of a section behind the end address designated by said designating step for a prescribed time with the end address being taken as a start point.

98. The method of claim 97 wherein said step of updating said management region includes the step of updating said management region to link a part preceding said start address and a part following said end address when one program is included in a prescribed section designated by said designating step.

99. The method of claim 97 wherein said step of updating said management region includes the step of updating said management region to update a program number when three or more program numbers exist within a prescribed section designated by said designating step.

100. The method of claim 97 wherein said step of updating said management region includes the step of updating said management region to update a program number when three or more program numbers exist within a prescribed section designated by said designating step.

101. An editing apparatus for designating a predetermined period of a program data as a recordable area of a recording medium including a program region for recording a predetermined program and a management region for recording a management data for managing the recorded program and the recordable area, comprising:

operation means for arbitrarily designating a start address and an end address of a predetermined period of a program data to be erased;

reproducing means for repeatedly reproducing the predetermined period of the program data to be erased to confirm the predetermined erase period by a user;

updating means for updating said management data for managing the recordable area which is designated by the operation means, and editing at least one of a start address and an end address of a program if the start address and the end address of the predetermined period of the program data to be erased is position at the program.

102. The apparatus of claim 101 further including second operation means for updating said start address and said end address designated by said operation means.

103. The apparatus of claim 102 wherein said reproducing means repeats a playback for a prescribed time with the start address being taken as a start point and, after said start address is changed by said second operation means, and repeats a playback of a section between the end address designated by said operation means and said changed start address or the address corresponding to the prescribed time before said changed start address.

104. The apparatus of 102 wherein said reproducing means repeats a playback for a prescribed time with the start address designated by said operation means or an address corresponding to the prescribed time before the start address being taken as a start point and, after said start address is changed by said second operation means, repeats a playback which is carried out for a prescribed time with said changed start address being taken as a start point and is followed by a playback of a section before the end address designated by said operation means for a prescribed time with an address corresponding to the prescribed time before the end address being taken as a start point.

105. The apparatus 102 wherein said reproducing means repeats a playback of a section behind the start address designated by address is changed by said second operation means and repeats a playback which is carried out for a section before said changed start address for a prescribed time with an address corresponding to the prescribed time before said changed start address being taken as a start point and is followed by a playback of a section behind the end address designated by said operation means for a prescribed time with the end address being taken as a start point.

106. The apparatus of claim 102 wherein said reproducing means repeats a playback of a section before the start address designated by said operation means for a prescribed time with an address corresponding to the prescribed time before the start address being taken as a start point and, after said start address is changed by said second operation means, and repeats a playback which is carried out for a section before said changed start address for a prescribed time with an address corresponding to the prescribed time before said changed start address being taken as a start point and is followed by a playback of a section behind the end address designated by said operation means for a prescribed time with the end address being taken as a start point.

107. The apparatus of claim 101 wherein said reproducing means repeats a playback of a section behind the start address designated by said operation means for a prescribed time with the start address being taken as a start point, and repeats a playback of a section behind the end address designated by said operation means for a prescribed time with the end address being taken as a start point.

108. The apparatus of claim 101 wherein said reproducing means repeats a playback of a section behind the start address designated by said operation means for a prescribed time with the start address being taken as a start point, and repeats a playback of a section before the end address designated by being taken as a start point.

109. The apparatus of claim 101 wherein said reproducing means repeats a playback of a section before the start address designated by said operation means for a prescribed time with an address corresponding to the prescribed time before the start address being taken as a start point, and repeats a playback of a section behind the end address designated by said operation means for a prescribed time with the end address being taken as a start point.

110. The apparatus of claim 101 wherein said rehearsal playback is carried out by repeating a playback of a section before the start address designated by said operation means for a prescribed time with an Address corresponding to the prescribed time before the start address being taken as a start point and by repeating a playback of a section before the end address designated by said operation means for a prescribed time with an address corresponding to the prescribed time before the end address being taken as a start point.

* * * * *